US010771692B2

(12) United States Patent
Alvarado-Moya et al.

(10) Patent No.: US 10,771,692 B2
(45) Date of Patent: Sep. 8, 2020

(54) IMAGING SYSTEMS AND METHODS

(71) Applicant: BOUNCE IMAGING, INC., Boston, MA (US)

(72) Inventors: Pablo Alvarado-Moya, Cartago (CR); Laura Cabrera, Delft (NL); Sietse Dijkstra, Hoogkarspel (NL); Francisco Aguilar, Dickerson, MD (US)

(73) Assignee: BOUNCE IMAGING, INC., Boston, MA (US)

( * ) Notice: Subject to any disclaimer, the term of this patent is extended or adjusted under 35 U.S.C. 154(b) by 0 days.

(21) Appl. No.: 16/118,303

(22) Filed: Aug. 30, 2018

(65) Prior Publication Data

US 2018/0376061 A1  Dec. 27, 2018

Related U.S. Application Data

(63) Continuation of application No. 14/921,865, filed on Oct. 23, 2015, now Pat. No. 10,091,418.
(Continued)

(51) Int. Cl.
*H04N 5/232* (2006.01)
*G06T 3/00* (2006.01)
(Continued)

(52) U.S. Cl.
CPC ....... *H04N 5/23238* (2013.01); *G06T 3/0018* (2013.01); *G06T 3/4038* (2013.01);
(Continued)

(58) Field of Classification Search
CPC ............. H04N 5/23238; H04N 5/2252; H04N 5/2256; H04N 13/0242; H04N 21/43637; G06T 3/0018; G06T 3/4038
See application file for complete search history.

(56) References Cited

U.S. PATENT DOCUMENTS 8,279,283 B2 * 10/2012 McCormack ........ G08B 13/196
  348/135
8,290,246 B1 * 10/2012 Schairer .................. G06T 7/246
  348/47
(Continued)

OTHER PUBLICATIONS

International Search Report issued in PCT/US2015/057183 dated Jul. 1, 2016.
(Continued)

*Primary Examiner* — Joseph Suh
(74) *Attorney, Agent, or Firm* — DLA Piper LLP US

(57) ABSTRACT

At least one combined image may be created from a plurality of images captured by a plurality of cameras. A sensor unit may receive the plurality of images from the plurality of cameras. At least one processor in communication with the sensor unit may correlate each received image with calibration data for the camera from which the image was received. The calibration data may comprise camera position data and characteristic data. The processor may combine at least two of the received images from at least two of the cameras into the at least one combined image by orienting the at least two images relative to one another based on the calibration data for the at least two cameras from which the images were received and merging the at least two aligned images into the at least one combined image.

46 Claims, 31 Drawing Sheets

Related U.S. Application Data

(60) Provisional application No. 62/068,054, filed on Oct. 24, 2014, provisional application No. 62/173,029, filed on Jun. 9, 2015.

(51) Int. Cl.
*H04N 5/225* (2006.01)
*G06T 3/40* (2006.01)
*H04N 13/243* (2018.01)
*H04N 13/261* (2018.01)
*H04N 21/4363* (2011.01)

(52) U.S. Cl.
CPC ......... *H04N 5/2252* (2013.01); *H04N 5/2256* (2013.01); *H04N 13/243* (2018.05); *H04N 13/261* (2018.05); *H04N 21/43637* (2013.01)

(56) References Cited

U.S. PATENT DOCUMENTS

| | | | | |
|---|---|---|---|---|
| 8,619,144 | B1* | 12/2013 | Chang | G06T 7/80 348/187 |
| 2007/0273760 | A1* | 11/2007 | Morrison | G06T 7/0004 348/51 |
| 2009/0048044 | A1* | 2/2009 | Oleson | A63B 24/0062 473/570 |
| 2010/0295926 | A1 | 11/2010 | Estrada et al. | |
| 2011/0035174 | A1* | 2/2011 | Lahiri | G01C 11/02 702/94 |
| 2011/0043620 | A1* | 2/2011 | Svanholm | G01C 1/04 348/135 |
| 2011/0110557 | A1* | 5/2011 | Clark | G01C 11/06 382/103 |
| 2011/0222757 | A1* | 9/2011 | Yeatman, Jr. | H04N 13/239 382/154 |
| 2012/0215358 | A1* | 8/2012 | Gettings | B25J 5/005 700/259 |
| 2013/0002832 | A1* | 1/2013 | Lasenby | A61B 5/0064 348/51 |
| 2013/0070048 | A1* | 3/2013 | Huang | G01B 11/16 348/36 |
| 2013/0208081 | A1* | 8/2013 | Xiong | G06T 3/60 348/36 |
| 2013/0210563 | A1 | 8/2013 | Hollinger | |
| 2013/0301908 | A1* | 11/2013 | Shim | G06T 5/005 382/154 |
| 2014/0071330 | A1 | 3/2014 | Zhang et al. | |
| 2014/0112574 | A1* | 4/2014 | Kim | G06T 7/80 382/154 |
| 2014/0168443 | A1 | 6/2014 | Aguilar et al. | |
| 2014/0176711 | A1* | 6/2014 | Kirchner | G01B 11/00 348/148 |
| 2014/0375784 | A1* | 12/2014 | Massetti | H04N 5/23229 348/74 |
| 2015/0094952 | A1* | 4/2015 | Moeglein | H04W 4/029 701/491 |
| 2015/0208041 | A1* | 7/2015 | Wang | H04N 7/183 348/148 |
| 2015/0248584 | A1* | 9/2015 | Greveson | G06T 7/73 382/113 |
| 2016/0014396 | A1* | 1/2016 | Glinec | A61C 9/0053 433/29 |
| 2016/0039094 | A1* | 2/2016 | Lundberg | B25J 9/1692 700/251 |
| 2016/0061654 | A1* | 3/2016 | Corwin | G01N 21/6458 702/104 |
| 2016/0176343 | A1* | 6/2016 | Sakano | G06T 7/80 348/148 |

OTHER PUBLICATIONS

Written Opinion issued in PCT/US2015/057183 dated Jul. 1, 2016.
Szeliski, "Image alignment and stitching: A tutorial," *Found. Trends. Comput. Graph. Vis.*, vol. 2, pp. 1-104, Jan. 2006.
Szeliski, *Computer Vision: Algorithms and Applications*. New York, NY, USA: Springer-Verlag New York, Inc., 1st ed., 2010.
Hughes et al, "Review of geometric distortion compensation in fish-eye cameras," *IET Irish Signals and Systems Conference (ISSC 2008)*, pp. 162-167, IEE, Jan. 2008.
Deng et al. "Automatic spherical panorama generation with two fisheye images," 2008, 7th World *Congress on Intelligent Control and Automation*, pp. 5955-5959, IEEE, 2008.
Ying et al. "Fisheye lenses calibration using straight-line spherical perspective projection constraint," *Computer Vision—ACCV 2006* (P. Narayanan, S. Nayar, and H.-Y. Shum, eds.), vol. 3852 of *Lecture Notes in Computer Science*, pp. 61-70, Springer Berlin Heidelberg, 2006.
Press et al., *Numerical Recipes. The Art of Scientific Computing*, Cambridge University Press, tercera edicion ed., 2007.
Everingham et al., "Evaluating image segmentation algorithms using the Pareto Front," *Proceedings of the 7th European Conference on Computer Vision* (A. Heyden, G. Sparr, M. Nielsen, and P. Johansen, eds.), vol. IV of *LNCS 2353*, pp. 34-48, Jun. 2002.
Corne et al., "The Pareto envelope-based selection algorithm for multiobjective optimization," *Proceedings of International Conference on Parallel Problem Solving from Nature*, pp. 839-848, 2000.
Alvarado, *Segmentation of color images for interactive 3D object retrieval. Dissertation*, Lehrstuhl fur Technische Informatik, RWTH-Aachen University, Aachen, Germany, Jul. 2004.

* cited by examiner

Distribution of fish-eye projection on the reference sphere. For clarity a wide angle of 100° is used.

Image coverage of the spherical FOV with 140° of HFOV and 89° of VFOV

| CS | $T_{s_0}r_1$ | $T_{s_0}r_2$ | $T_{s_0}r_3$ |
|---|---|---|---|
| 1 | − | − | − |
| 2 | + | − | − |
| 3 | − | + | − |
| 4 | + | + | − |
| 5 | − | − | + |
| 6 | + | − | + |
| 7 | − | + | + |
| 8 | + | + | + |

FIG. 26

IMAGING SYSTEMS AND METHODS

CROSS-REFERENCE TO RELATED APPLICATIONS

This application is a continuation of U.S. application Ser. No. 14/921,865 filed Oct. 23, 2015, which claims priority from U.S. Provisional Application No. 62/068,054, entitled "Image Processing," filed Oct. 24, 2014, and U.S. Provisional Application No. 62/173,029, entitled "Image Processing," filed Jun. 9, 2015, the entirety of each of which is incorporated by reference herein. U.S. Patent Application Publications US 2014/0168443, US 2014/0266773, and US 2014/0267586 are each incorporated by reference in their entirety herein as well.

BRIEF DESCRIPTION OF THE DRAWINGS

FIG. 26 is a table of signs of projections of the direction vector on the axes of the cage coordinate systems according to an embodiment of the invention.

DETAILED DESCRIPTION OF SEVERAL EMBODIMENTS

Figure 1:
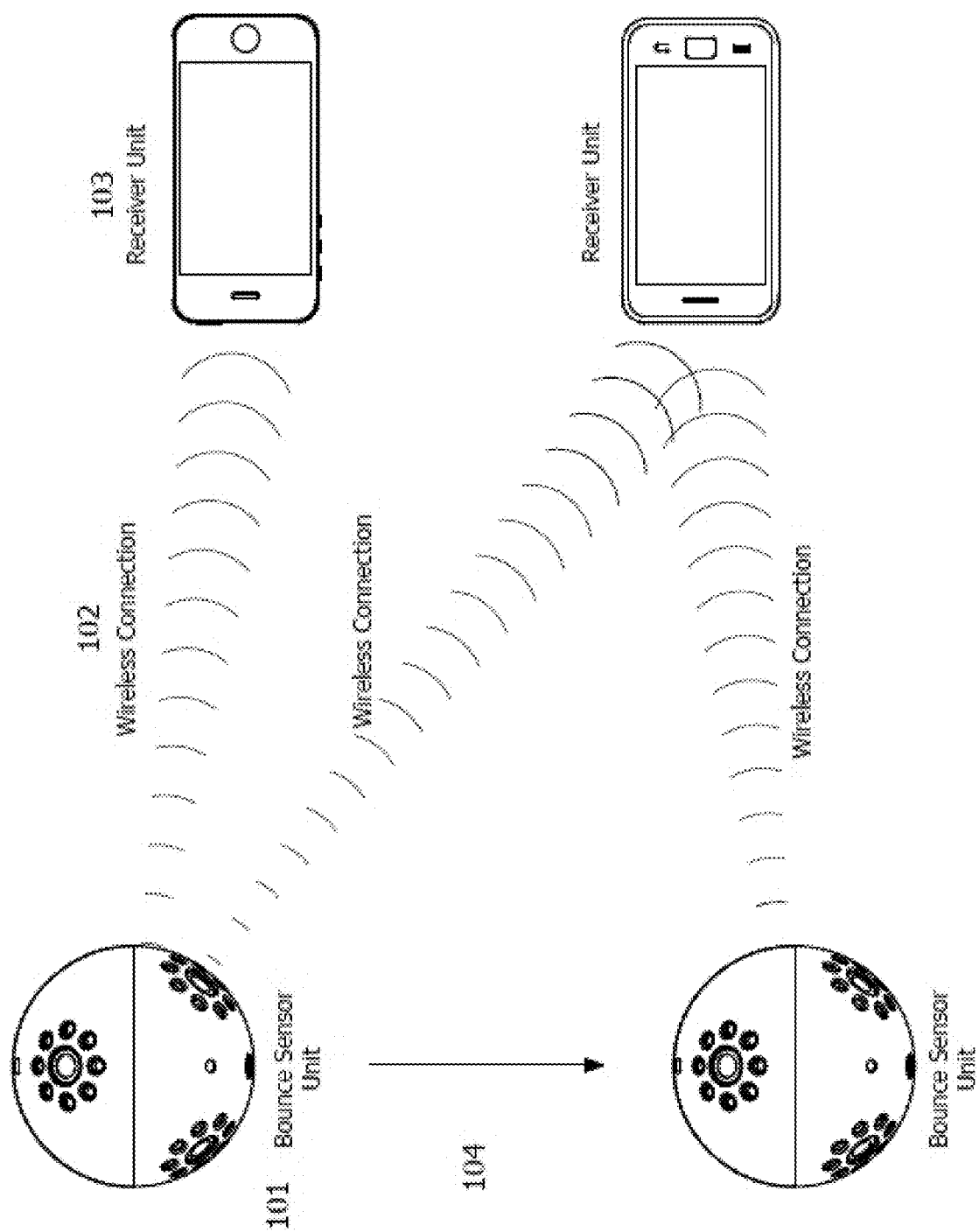
FIG. 1 is an imaging system according to an embodiment of the invention.

Systems and methods described herein may provide optimized capture, processing, and presentation of multiple still images and/or video frames (collectively referred to herein as "images") into a single, stitched panoramic (e.g., omnidirectional) scene or subset thereof that may be easily navigated by a user. In some example embodiments, the capture, processing, and presentation systems and methods may be used with a throwable panoramic camera system. However, it will be clear to those of ordinary skill in the art that the discussed throwable panoramic camera system is only one of many applications for the disclosed systems and methods.

The disclosed systems and methods may provide image capture, processing, and presentation while avoiding one or more assumptions about the images being processed and/or the equipment being used. For example, the disclosed systems and methods may stich single images into panoramic scenes even if one or more of the following assumptions are false:

1. Images have little to no noise or other image quality issues
2. Images are taken from a fixed center point, such as a tripod
3. Images are taken with standard lenses with minimal distortion
4. Substantial time and/or computational power are available (e.g., to perform computationally intensive operations such as de-noising and/or de-warping when fisheye or other distorted lenses are used)
5. Output is standard (e.g., a single planar panorama).

Systems and methods described herein may comprise one or more computers, which may also be referred to as processors. A computer may be any programmable machine or machines capable of performing arithmetic and/or logical operations. In some embodiments, computers may comprise processors, memories, data storage devices, and/or other commonly known or novel components. These components may be connected physically or through network or wireless links. Computers may also comprise software which may direct the operations of the aforementioned components. Computers may be referred to with terms that are commonly used by those of ordinary skill in the relevant arts, such as servers, PCs, mobile devices, routers, switches, data centers, distributed computers, and other terms. Computers may facilitate communications between users and/or other computers, may provide databases, may perform analysis and/or transformation of data, and/or perform other functions. It will be understood by those of ordinary skill that those terms used herein are interchangeable, and any computer capable of performing the described functions may be used.

Computers may be linked to one another via a network or networks. A network may be any plurality of completely or partially interconnected computers wherein some or all of the computers are able to communicate with one another. It will be understood by those of ordinary skill that connections between computers may be wired in some cases (e.g., via Ethernet, coaxial, optical, or other wired connection) or may be wireless (e.g., via Wi-Fi, WiMax, 4G, or other wireless connections). Connections between computers may use any protocols, including connection-oriented protocols such as TCP or connectionless protocols such as UDP. Any connection through which at least two computers may exchange data can be the basis of a network.

In some embodiments, the computers used in the described systems and methods may be special purpose computers configured specifically for image capture, processing, and presentation. For example, a device may be equipped with specialized processors, memory, communication components, sensors, etc. that are configured to work together to capture images, stitch captured images together into panoramic scenes, present the resulting panoramic scenes to a user, and/or perform other functions described herein.

Example Imaging System

There are many situations in which the assumptions above are deeply violated. One example is a throwable panoramic camera ball with six fisheye lenses covering all directions that may be paired with a smartphone. Such a system may be used by a search and rescue worker to quickly explore a collapsed air pocket after an earthquake or by a police officer to gain rapid intelligence about a hostage situation, for example. The system may take six fisheye images simultaneously every half-second and transmit them to a smartphone or tablet in some embodiments. In other embodiments, the system may capture video frames at 15 frames per second, 30 frames per second, or more. These embodiments may violate the aforementioned assumptions as follows:

- The little to no noise or image quality issues assumption may be violated because the camera ball may be often thrown into dark spaces at high speed with short exposures and significant digital gain compensation—all of which may introduce issues like noise, blur, etc.
- The fixed center point assumption may be violated because cameras may be displaced from the center of the ball by as many as several centimeters or more.
- The standard lenses, minimal distortion assumptions may be violated because the system may use radical (up to >180-degree) field-of-view "super-fisheye" lenses with highly non-linear distortions
- The ample time or computational power available assumption may be violated because first responders may need the image data nearly-instantly and have only the limited computational resources of a standard smartphone, tablet, or small low-powered processor on the device itself.

FIG. 1 is an imaging system according to an embodiment of the invention. Sensor unit 101 is a sensor platform that may include a reinforced housing, one or more cameras (e.g., wide-angle cameras), one or more infrared LEDs, one or more batteries, a processor, and/or additional sensors.

Sensor unit 101 may transmit data gathered by its cameras and sensors over a wireless connection 102 to a receiver unit 103. In some embodiments of the system, the wireless connection is under the WiFi 802.11b protocol. In other embodiments of the system, the wireless connection can be achieved via other WiFi protocols, Bluetooth, RF, or a range of other communications protocols including military and non-standard spectra.

Receiver unit 103 may receive and process data into a format usable to the user. For example, the unit may stitch images to provide panoramic views, overlay these images with data from the other sensors on the device, and play streamed audio from sensor unit 101's digital microphone over the receiver unit's speakers or headphones. In some embodiments, the receiver unit 103 may be an Android-based tablet or smartphone running a custom-developed app and/or comprising custom hardware. In other embodiments, receiver unit 103 may be an iOS, Windows-based, or other smartphone or tablet running a custom-developed app and/or comprising custom hardware. Such tablets may be hand-held or mounted, such as in some pouches that mount on the back of a partner's vest for the operator to view without having to hold the tablet. In other embodiments, the receiver unit 103 may be a laptop computer. In other embodiments, the receiver may be a heads-up or other display, allowing the user to view the omnidirectional scene in virtual reality, such as with a headset like Google Cardboard. In other embodiments, the receiver may be a server configured to stream captured images and/or video via a web-based platform such as Facebook360 or YouTube360.

The server-client architecture may be flexible, meaning that the server can exist on the sensor unit 101, on the receiver unit 103, or in a third station or device that serves as a router. In some embodiments, the receiver unit 103 may serve as the server, and the sensor unit 101 may serve as the client. In other embodiments the sensor unit 101 may function as the server, and the receiver unit 103 may function as the client. Receiver unit 103 may also forward the data to a server on the internet that may in turn serve the data to other receiver units.

Sensor unit 101 may be paired to one or many receiver unit(s) 103 via QR code, near-field/RFID communication, manual code entry, or other pairing method. Receiver units 103 may be paired with one or more sensor units. The pairing may allow the user to use a preexisting Android or other compatible smartphone or tablet device without the need to purchase a receiver unit. The user may pair their phone (e.g., via the app described below) to the system. In addition, if sensor unit 101 is lost or damaged, receiver unit 103 may be paired to one or more other sensor units 101. Similarly, if receiver unit 103 is lost, sensor unit 101 may be paired to one or more other receiver units 103. This pairing ability may allow multiple users to share the information from one or more sensor units or one or more receiver units. In some embodiments, several sensor units 101 may use a wireless connection 104 to "daisy chain" to each other and thus extend their range by serving as repeaters. This connection may allow more extensive processing by using the relative position of units for mapping or 3-D imaging. In addition, the unit may use a built-in cellular antenna, or re-transmit over via cellular or other antenna, to push real-time omnidirectional video to remote computers via a network.

At a higher level, the system may be extended by gathering data from many sensor units 101. For example, in search and rescue after earthquakes, a common problem is the lack of reliable maps (e.g., due to building collapses), often resulting in multiple searches of the same site. By aggregating location information from multiple sensor units 101, a map overlay may be generated to avoid such duplication. Similar applications incorporating multiple sensor units may assist in security and fire applications, among others.

In some embodiments, the sensor unit 101 may be deployed as part of a broader system, such as when employed with other sensor units 101 in a mesh network, when deployed along with robots or other remote sensing equipment, or when integrated into a broader communications system employed by first responders or the military.

In some embodiments, multiple images taken at different points in the travel of the sensor unit 101 may allow stereoscopic processing of images, allowing for the creation of three-dimensional representations of a space. In some embodiments, images from multiple sensor units 101 thrown into a space may provide stereoscopic perspective, again allowing for three dimensional representations of the space. In some embodiments, the use of several sensor units may can allow for effective "mapping" of a space using the communication among sensor units to establish their relative positions.

Figure 2:
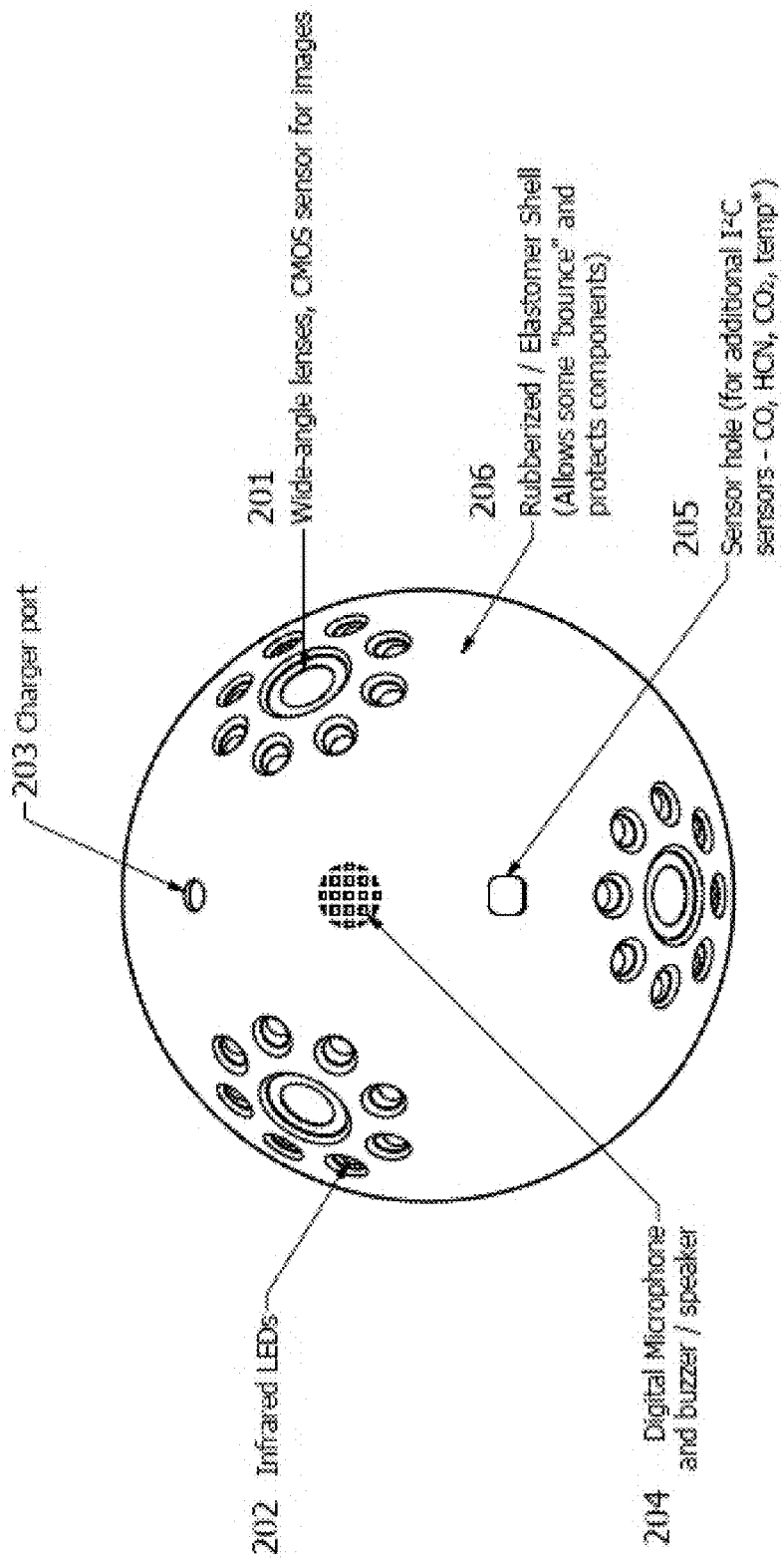
FIG. 2 is a remote sensor unit according to an embodiment of the invention.

FIG. 2 is a remote sensor unit according to an embodiment of the invention. The use of wide-angle lenses 201 (e.g., fisheye lenses in this example embodiment) may allow for fewer cameras than would otherwise be necessary to capture the scene, which may reduce cost and system complexity. CMOS sensors behind wide-angle lenses 201 may take short exposure (e.g., $1/2,000^{th}$, $1/10,000^{th}$, or $1/100,000^{th}$ of a second) images of the scene observed through the lenses in order to compensate for motion blur that might otherwise result from a camera unit being thrown or otherwise propelled into a space. To compensate for low-lighting conditions of a use environment and for the light loss from a fast exposure, near-infrared LEDs 202 may be triggered briefly before and during the exposure. The near-infrared light may be visible to the CMOS sensors, but may be outside the range of human vision (allowing for some degree of stealth and minimizing disturbance to bystanders). Monochrome sensors may be used in some embodiments, as monochrome sensors may be more light-sensitive than color sensors. However, in other embodiments, color CMOS sensors and/or sensors for sensing other areas of the light spectrum may be applied. In some embodiments, the lenses 201 may be reinforced to resist heat and damage from exposure to chemicals or radiation.

Aperture 203 in the sensor unit's housing may provide space for a charging port and for connecting a cable to update the system's firmware. In some embodiments, the charger and firmware-update functions may both be provided by a single port, such as a micro-USB port. In other embodiments, the connector may be mini-USB or any of a range of potential connectors.

Aperture 204 for a microphone and speaker may allow the microphone to be close to the surface of the sensor unit's housing and thus capture audio signals clearly. Additionally, aperture 204 may allow the system to project audio via a small speaker or buzzer, which may assist a user in locating the sensor unit once deployed and/or may create a loud sound as a diversion when employed by police or in similar settings. In some embodiments, the speaker may convey audio from the receiver unit to assist in communication between the person at the receiver unit and persons near the sensor unit (e.g., in hostage negotiations). In some embodiments, high-intensity LEDs in the unit may be triggered along with the speaker to create a more substantial diversion.

Aperture 205 may allow additional sensors to be exposed to the outside environment to gather additional readings that are overlaid on the information provided on the app on the receiver unit 103. This aperture 205 may be compatible with a wide array of sensors, many of which may communicate with the central processor via the simple I$^2$C format or some other format. In some embodiments, sensors may detect carbon monoxide, temperature, and/or hydrogen cyanide gas, for example. These gases in particular have been found to pose a hazard to firefighters in the aftermath of a blaze. However, the system may be compatible with a wide range of sensors and may be easily adapted to support the following sensors listed below and many others using I$^2$C and similar standard formats, protocols, or analog outputs: smoke, alcohol, temperature, thermometer, smoke, Geiger counter (radiation), CBRN (chemical/bio/nuclear/radiological), magnetic, humidity, water, barometric pressure, vibration detector, motion sensor, sonic rangefinder, laser rangefinder, stereo imaging, voltage, color/wavelength, spectrometers, depth, GPS, methane, carbon monoxide, carbon dioxide, propane and other flammable gas PIR, Hall effect, impact sensor, thermal imager, proximity, glass break, shock, RFID, compass, pH/acidity, gravity, electronic signals/RF, oxygen, nitrogen, hydrogen, other atmospheric gases, hazardous gases (HCN, H2S, etc.), coal dust, coal gas, biological compounds, etc.

A rubber or elastomer shell over a hard/reinforced inner shell may absorb much of the force of an impact as the unit enters a space and hits a wall, floor, ceiling, or other object, protecting the cameras and internal components of the sensor unit. The rubber or elastomer shell may also provide a degree of "bounce" to the sensor unit which allows the unit greater travel within a space. For example, a police operator may bounce the unit around a corner to get a view of a corridor before having to enter it, or a search and rescue worker may search deeper inside a collapsed building by having the unit bounce through crevices and pockets in the debris where a unit without the rubber or elastomer shell may be more likely to get stuck. In some embodiments, the outer shell may comprise an elastomer or rubber overmold simultaneously poured with an injection mold of a hard plastic inner shell. In other embodiments, the outer rubber or elastomer shell may be molded separately and attached to the hard internal metal, composite, or plastic shell by an adhesive, screw, or snap-fit mechanism. In some embodiments, the outer shell may be reinforced via elastomer, rubber, or other material to sustain harsh temperatures and chemical and radiological environments presented by firefighting and industrial inspection applications. In some embodiments, rubber/elastomer "bumpers" on the surface of the outer shell may provide greater impact resistance without blocking the field of view of the cameras.

Figure 3:
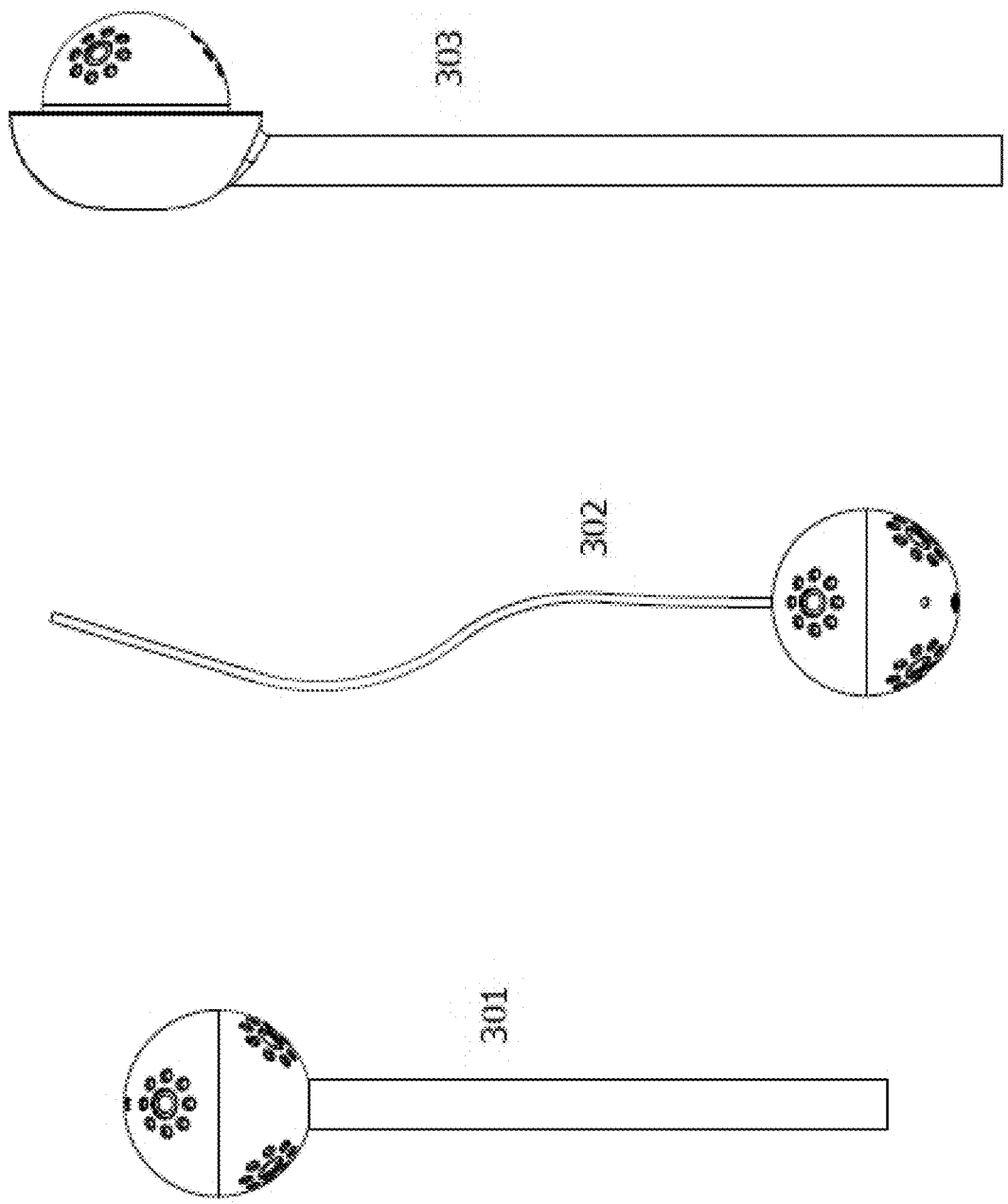
FIG. 3 shows remote sensor unit deployment systems according to an embodiment of the invention.

In some embodiments, the sensor unit may be deployed by an operator who throws or rolls the unit into a space to be inspected. FIG. 3 illustrates some examples of deployment systems for the sensor unit. Pole 301 may be attached to a hole in the housing of sensor unit 101 to allow the unit to be inserted slowly into a space. Tether 302 may be used to retrieve the sensor unit 101 from a space when it is difficult to retrieve manually, such as when searching for a victim inside a well or when inspecting a pipe. In some embodiments, this tether 302 may conduct power and act as a communications link for the unit, especially when continuous surveillance is required or adverse conditions limit wireless communications range. Optional unit 303 may be similar to a tennis-ball thrower and may be used to extend the range of the sensor unit 101 beyond where a standard human operator can throw. Other embodiments may be propelled via air-cannon or other propulsion system, for example.

In some embodiments, the sensor unit may be partially self-propelled, for example by one or more internal motors whose torque may cause the sensor unit to move, or by a series of counterweights which may be shifted to roll the sensor unit. In some embodiments, these movements may be random and may achieve greater coverage of the room in an unguided way or in a probabilistic fashion. In other embodiments, the propulsion may be guided via the receiver unit 103 and precise control of the motors and/or counterweights. Different applications may require different levels of guidance (e.g., industrial inspections may prefer a random and thorough sweep, security applications may prefer control).

Figure 4:
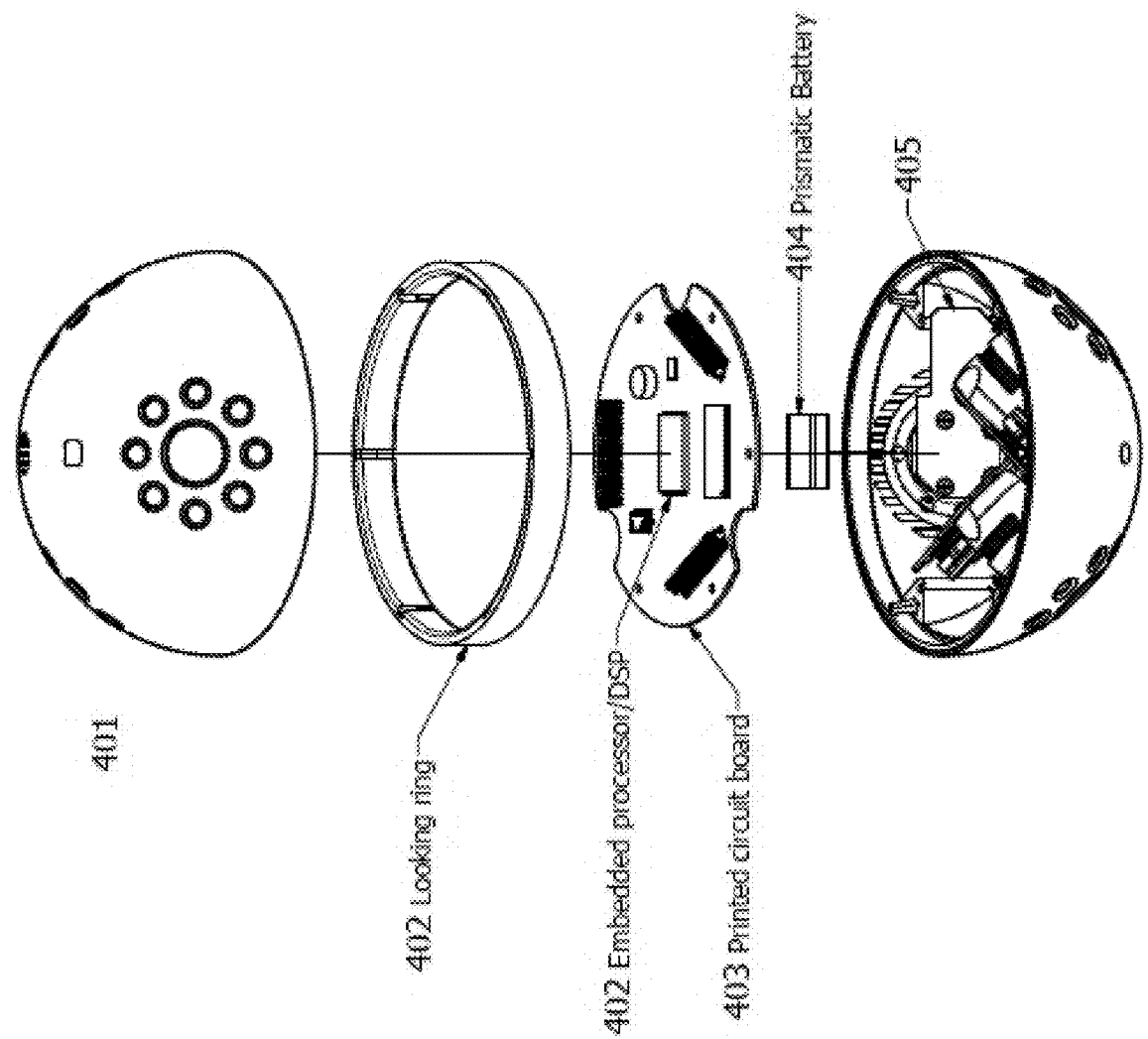
FIG. 4 is an exploded view of a remote sensor unit according to an embodiment of the invention.

FIG. 4 is an exploded view of a remote sensor unit according to an embodiment of the invention. In some embodiments, the shell may comprise two symmetrical halves 401 with equal numbers of apertures plus a central locking ring. This design may allow for lower manufacturing costs through injection molding using a single mold shape. As disclosed above, the hemispheres 401 themselves may comprise a hard inner structure (e.g., glass or fiber-reinforced composite plastic) and an elastomer or rubber outer layer for bounce and for impact-absorption. In some embodiments, each hemisphere may include three cameras with wide-angle lenses ringed with 8 near-infrared LEDs for illumination. Locking ring 402 may join the hemispheres to one another.

Printed circuit board (PCB) 403 may hold many of the components of the system, such as embedded processor and/or digital signal processor 402. In some embodiments, the processor 402 may be an Analog Devices BlackfinF548, though in other embodiments other processors may be employed. PCB 403 may also hold connectors (e.g., IDC ribbon cable connectors) for the cameras and connection points for the other sensors, microphone, and/or other components. A power supply board may also be included. In some embodiments, the need for connectors may be eliminated via a single rigid-flexible PCB for both the central processor and the cameras. In some embodiments, the power supply may be included on the central PCB 403. The wireless module, shown in figures that follow, may also be mounted to the PCB 403.

The central PCB 403 may be mechanically supported at six points once the sensor unit shell is closed, for example. This arrangement may provide support to the PCB 403 while allowing it some freedom of movement and flexion to survive impacts when the sensor unit is thrown. In addition, a rubber or foam insert at the support points may further cushion the PCB 403 and its components from shocks.

The sensor may include one or more batteries 404 that may power the central processor, wireless module, cameras, LEDs, and other sensors and components. In some embodiments, two batteries 404 may be housed symmetrically in the two hemispheres. This arrangement may balance the sensor unit, allowing for more predictable travel through the air, and may be mechanically advantageous from an impact/resilience perspective. In some embodiments, the batteries may run through the center of a "donut-shaped" central PCB, again for balance and mechanical reasons.

The camera boards 405 may house the imaging sensors (e.g., a CMOS sensor, a CCD, or other imaging sensor) and attach to each hemisphere 401. The position and orientation of the camera boards 405 may be optimized to maximize the overlap in field of view across all the sensors to ensure global coverage of the space being imaged. Standard CMOS sensors may be rectangular (e.g., WVGA is 752×480 pixels), and thus their vertical fields of view may be narrower than their horizontal fields of view with a standard lens. This may be further complicated by very wide-angle lenses. Thus, the orientation of the camera boards 405 may be set to ensure full coverage and sufficient overlap for image stitching (described below). For example, the six camera boards 405 may be equally spaced across the surface of the sensor unit and may be rotated approximately 90-degrees from an adjacent camera board 405. In other embodiments, other combinations of spacing and rotation may be used, but always with the objective of ensuring sufficient overlap across fields of view to ensure global coverage and enough overlap for image stitching.

Figure 5:
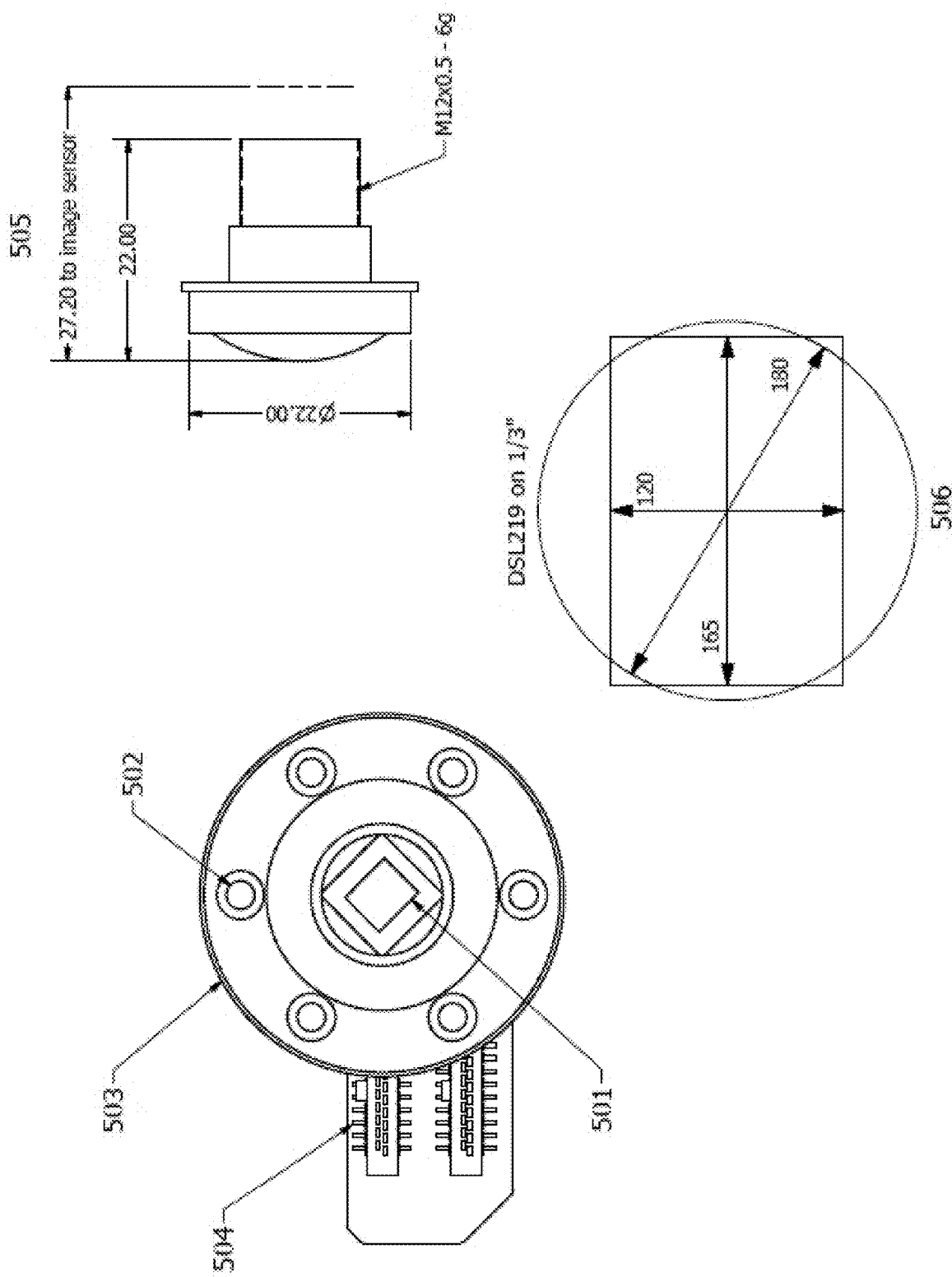
FIG. 5 is a camera board according to an embodiment of the invention.

FIG. 5 is a camera board according to an embodiment of the invention. The camera board may house the imaging sensor 501. In some embodiments, the imaging sensor 501 may be an Aptina V022MT9-series monochrome CMOS sensor. This sensor has very good low-light performance and dynamic range with low noise and can detect the wavelength of light the near-IR LEDs emit, which may be useful for the short-exposure, dark environment images the sensor unit may capture. In other embodiments, other CMOS or CCD sensors may be used, including sensors such as monochrome sensors, color sensors, and sensors in other ranges of the light spectrum, such as infrared and ultraviolet.

One or more LEDs 502 may provide illumination to both light dark environments and to compensate for the light loss associated with short exposures. In some embodiments, these LEDs 502 may be near-infrared, high-intensity LEDs with brightest light at around 850 nm. This light may be visible to imaging sensors 501 but not to the human eye. In other embodiments, the LEDs may emit light in the visible light spectrum (e.g., for color applications or when the LEDs serve a diversionary purpose). In other embodiments, LEDs may emit at other wavelengths appropriate to the imaging sensor being employed.

Lens holder 503 on the imaging board may hold the lens in place and at the proper focus above the CMOS sensor. In some embodiments, the lens holder may be incorporated into the sphere casing 401 itself. This may allow the parts to be injection molded in plastic and rubber and may protect the lenses from impacts. The lens 505 may be chosen to allow the sensor unit 101 to maximize the use of its imaging sensor 501. In the embodiment shown, the fisheye lens used may provide an effective image footprint that covers nearly entirely or entirely the CMOS sensor as shown in 506.

Ribbon cable connector 504 may connect the imaging board in FIG. 5 with the central PCB 403. In some embodiments, the imaging board in FIG. 5 may be connected to PCB 403 via a flexible printed circuit board layer, effectively making the central PCB and imaging boards a single printed circuit board. In some embodiments, other connectors may be used depending on requirements for data transfer rate and mechanical performance.

Figure 6:
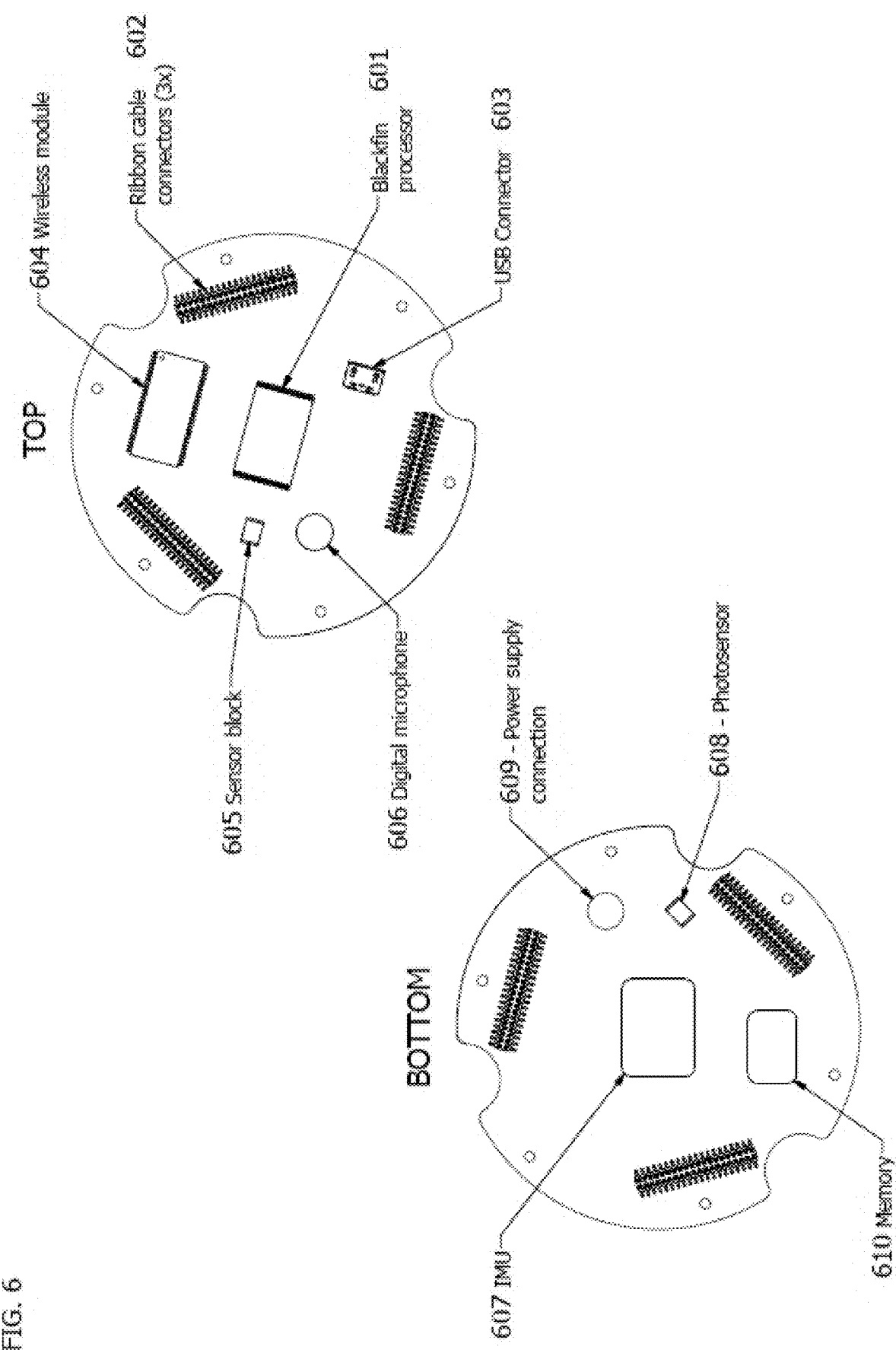
FIG. 6 is a central printed circuit board according to an embodiment of the invention.

FIG. 6 is a central PCB 403 according to an embodiment of the invention. FIG. 6 shows the top and bottom of the central printed circuit board. This board may house the microprocessor (MCU) and/or digital signal processor (DSP) 601. In the embodiment shown, the processor is an Analog Devices Blackfin 548BF DSP. This processor may handle the multiple streams of image and sensor data being captured by the sensor unit's imaging and other sensors at a reasonable component cost and power drain. In other embodiments, other microprocessors and/or digital signal processors may be used, including units with multiple cores. The multiple cores may allow Linux or other OS to be run on the processor, easing the implementation of networking protocols discussed below.

Ribbon cable connector 602 may connect to the cables running to the central PCB from the imaging boards described above in FIG. 5. In the embodiment shown, three of these connectors lie on each side of the central PCB. In other embodiments, other types of connectors may be used. In other embodiments, the central PCB may connect to the imaging boards via flexible layers of the printer circuit board, forming effectively one single board.

USB connector 603 may allow the central printed circuit board to connect to an external computer and external power sources. The USB connection may be used to load and update the firmware for the sensor unit and to allow for testing, debugging, and/or calibration of the unit.

Wireless module 604 may transmit image and other sensor data processed by the microprocessor 601 out of the sensor unit and to the receiver unit 103. In the embodiment shown, the wireless module is an Intel Edison 802.11b/g module running Linux with FTP and HTTPS client services and/or other network services. The module may include a processor capable of running stitching algorithms such as those described herein. In other embodiments, other wireless modules may be used, such as the Texas Instruments CC3300 module. In other embodiments, other types of wireless modules, incorporating Bluetooth transmitters or transmitters in other ranges of the spectrum (such as those for dedicated military or security communications channels) may be employed.

Sensor block 605 may include a connection point for the non-imaging sensors in the unit. In the embodiment shown, the sensor block 605 may connect to a digital temperature sensor, a carbon monoxide sensor, and/or a hydrogen cyanide sensor. In other embodiments, the sensor block may connect to any of the sensors listed above, or to any other sensors with which the processor and central PCB can interface. In some embodiments, a cable may connect the sensors on the surface of sensor unit 101, but in other embodiments other sensors (e.g. the Geiger counter) may not need to be surface-mounted.

Microphone port 606 may connect the microphone mounted on the surface of sensor unit 101 to the central PCB. In some embodiments, this microphone may be a mono MEMS microphone with digital output. In other embodiments, the microphone may be stereo or may comprise several microphones on the surface of the sensor unit 101. In some embodiments, the microphone is not surface mounted, but instead may be mounted inside the sensor unit.

An inertial measurement unit (IMU) 607 on the central printed circuit board may provide information about the orientation and direction in which the sensor unit 101 was thrown. This information may be useful for providing an image with reference points for the user, such as which direction is up and in which direction the sensor unit 101 was thrown or in which direction the user was "looking" before the ball was thrown, for example allowing a user to be focusing on the view to the right as a ball passes by rooms on the right as it rolls down a hallway perpendicularly to the direction being viewed. In some embodiments, the IMU allows the omnidirectional video to retain a steady orientation despite the rapid rotation of the unit by synchronizing image capture to the readings from the IMU via an internal clock. In the absence of such information, the images displayed on the receiver unit 103 might be disorienting. In the embodiment shown, the IMU is an Invensense MPU 6000, which is a 6-axis gyroscope-accelerometer module. In other embodiments, 9-axis IMUs may be used to compensate for IMU "drift" problems. In some embodiments, for more extreme motion, multiple IMUs may be used. In some embodiments, no IMU is used, and the embodiment may rely primarily on software to compensate for orientation as needed.

For example, the system may use OpenGL ES 2.0 to create a sphere model and map the equirectangular panorama in the sphere model. The IMU rotation may be applied by first transforming the quaternion values into a rotation matrix. This rotation matrix may be used in conjunction with an IMU-Explorer coordinate system alignment matrix to create the model part of the OpenGL's model-view-projection matrix. The coordinate system used to align the unit may be the same as that used in calibration and/or image stitching elsewhere in this disclosure.

Figure 31:
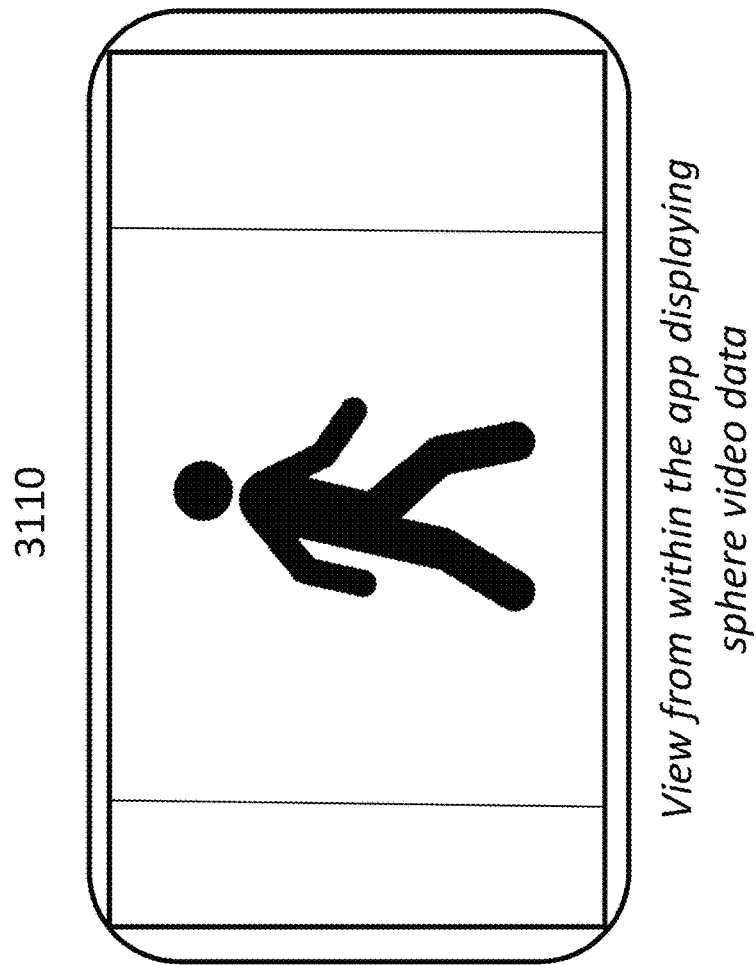
FIG. 31 is a remote sensor unit use case according to an embodiment of the invention.
Figure 31:
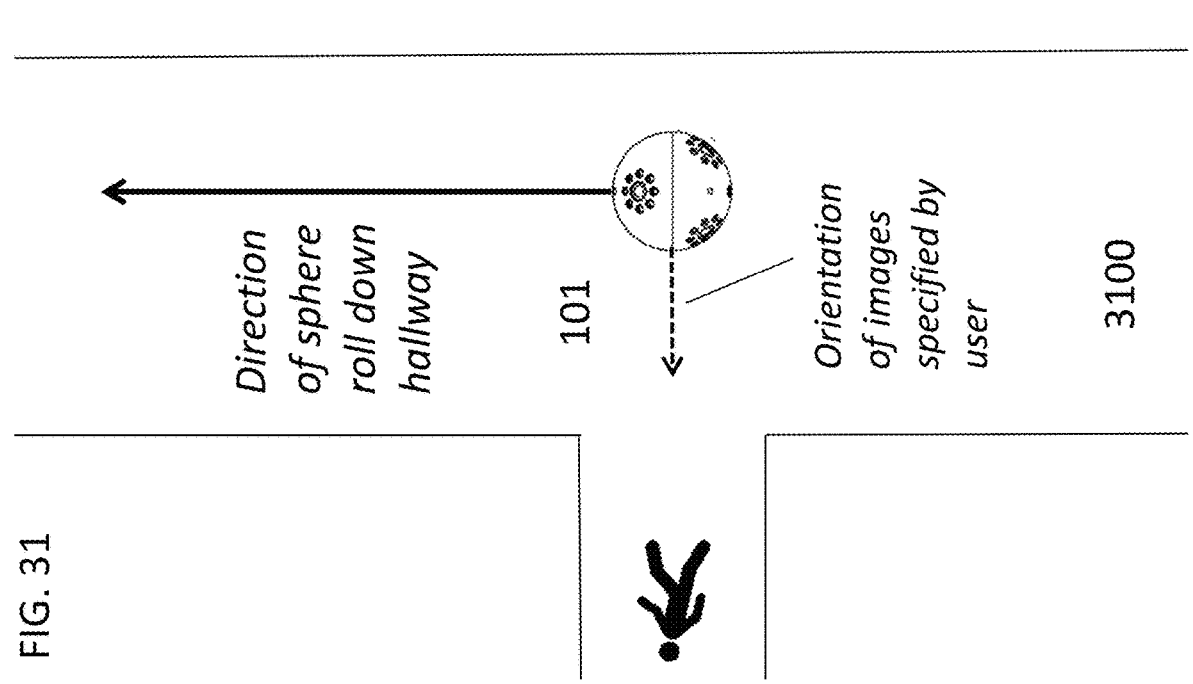

FIG. 31 is a remote sensor unit use case according to an embodiment of the invention. As shown, the sensor unit 101 may be thrown down a hallway 3100, and the user may request views of a side hallway the unit 101 passes. Using the aforementioned IMU 607 and related processing, the view 3110 within the user interface may show a stable and properly-oriented view down the side hallway.

A plurality of photo (light) sensors 608 may connect to the central PCB. These surface mounted sensors may provide information about ambient lighting that may allow the sensor unit 101 to modify shutter exposures and LED flash intensity. In some embodiments, these photo sensors are not included, and the sensor unit may use the CMOS sensors themselves milliseconds before capturing an image to calibrate lighting and exposure duration.

Power supply connection 609 may connect the central PCB to a power supply board or external power supply. In some embodiments, there may be a separate power supply PCB. In some embodiments, the power supply components may be mounted on the central PCB. The power supply components may connect either to internal batteries (in the embodiment shown, LiON batteries) or to an external power supply. In some embodiments, power may be supplied to this board via the tether 302, for example.

In some embodiments, additional memory 610 (e.g., SDRAM or, in other embodiments, a range of memory/flash memory types) may be included. This memory may enable buffering by the microprocessor 601 as needed. In some embodiments, no external memory may be provided, and the processor may use its own onboard memory.

Figure 7:
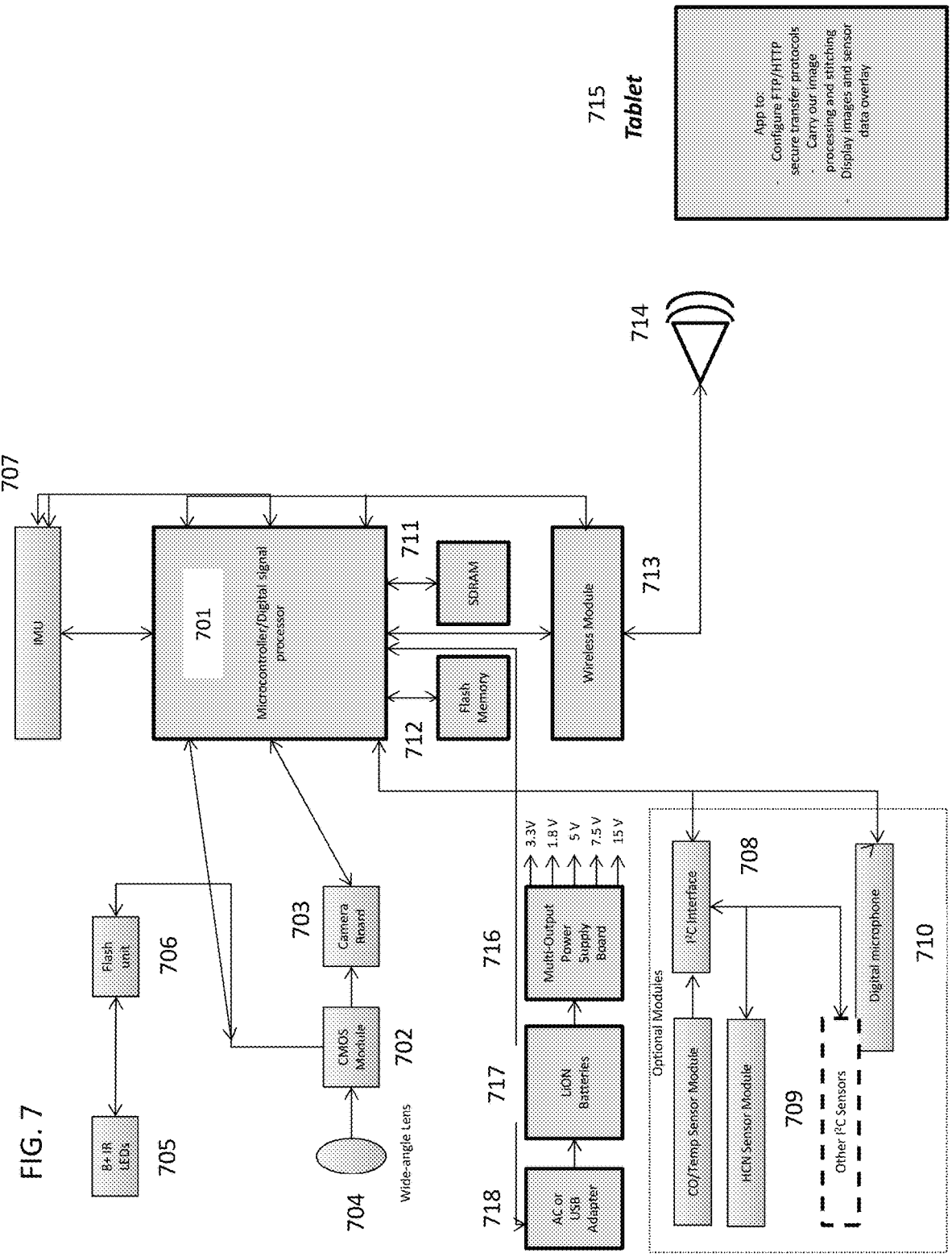
FIG. 7 is an imaging system according to an embodiment of the invention.

FIG. 7 is an imaging system according to an embodiment of the invention. FIG. 7 provides a high-level view of the hardware design and operation. Microprocessor and/or digital signal processor 701 may trigger imaging sensor 702, which may be mounted on camera board 703, to capture an image.

Imaging sensor 702 may take a quick calibration read to determine light conditions in the space being imaged, and based on these conditions may determine the appropriate exposure and whether (and how strongly) to trigger LEDs 705. In some embodiments, the calibration may be carried out using a photosensor 608. In some embodiments, high-intensity near-infrared LEDs 705 with max output at a wavelength of 850 nm may be used, in other embodiments other LEDs may be used (as discussed above) appropriate to the application. LEDs 705 may be mounted on an LED board 706 controlled in some embodiments by the CMOS sensor 702 and in some embodiments by the microprocessor 701.

IMU 707 may provide the microcontroller 701 with information about the orientation and acceleration of the sensor unit 101 as it is moving through its path of travel in the air and on the ground. The microcontroller 701 may associate this information with images and transmit it to the receiver unit. This data may allow the receiver unit 103 to provide information to the end user that allows that user to understand in which direction the sensor unit was thrown and what orientation the unit had when it took an image, whether that orientation is relative to gravity or relative to an orientation selected by the viewer. The data may also help determine how to display the images and position information on the receiver unit screen. In some embodiments, no IMU is used, and the unit may rely on software correction methods.

Sensor interface 708 may connect additional analog and digital sensors to the microprocessor 701. In the example embodiment shown, an I²C interface connects a carbon monoxide/temperature sensor and a hydrogen-cyanide sensor (both shown in 709) to the microprocessor. In other embodiments, a wide range of sensors may be employed, examples of which are listed above.

Microphone 710 may capture audio from the environment and transmit this information back to microprocessor 701, which in turn may make it available to receiver unit 103. In some embodiments, a speaker or buzzer may be connected to the microprocessor 701, as discussed above. In some embodiments, stereo microphones or other sound-gathering devices (e.g. hydrophones), both analog and digital, may be employed.

In some embodiments, microprocessor may employ memory 711, flash memory 712, or other forms of storage to buffer or store data or files. In some embodiments, all buffering and storage may be conducted onboard the microprocessor 701.

Microprocessor 701 may accept and process information from the imaging sensors 702 and/or the additional sensors 709 and/or the microphone 710 and/or IMU 707. Microprocessor 701 may then transmit data or files to onboard flash memory 712 or other memory and/or to the receiver unit 103 via a wireless module 713. Wireless module 713 may transfer data and communications back and forth between receiver unit 103 and sensor unit 101 over a wireless link with the aid of antenna 714. In some embodiments, the wireless module 713 may broadcast data without a link being established, as in cases when links are difficult to establish. In some embodiments, the wireless module 713 may perform some or all processing related to the image stitching and compression, in combination with and/or in place of other modules (e.g., microprocessor 701).

Receiver unit 715 (e.g., same as receiver unit 103), may receive data from the sensor unit 101 and may process and display this information to a user or users. In some embodiments, the receiver unit may be an Android-based tablet running an Android app. In other embodiments, the receiver unit may be another smart device such as an iPad, iPhone, Blackberry phone or tablet, Windows-based phone or tablet, etc., as discussed above. In some embodiments, the receiver unit may be a personal computer. In some embodiments, the receiver unit may be a second sensor unit 103 acting as a repeater for the receiver unit 715 or as part of a mesh network of units 103.

Power supply 716 may provide the electrical energy for the other hardware. The power supply may draw current from battery 717. In some embodiments, battery 717 is a prismatic lithium-ion battery. In some embodiments, battery 717 may be one or many alkaline batteries. In some embodiments, battery 717 may take another form of high-performance battery. In some embodiments, power supply 716 may connect directly to an external power supply 718. In some embodiments, tether 302 may provide a connection to an external power supply. In some embodiments, external power supply/adapter 718 may comprise an A/C or USB adapter that may supply power to the unit 101 and/or charge the battery 717.

Figure 8:
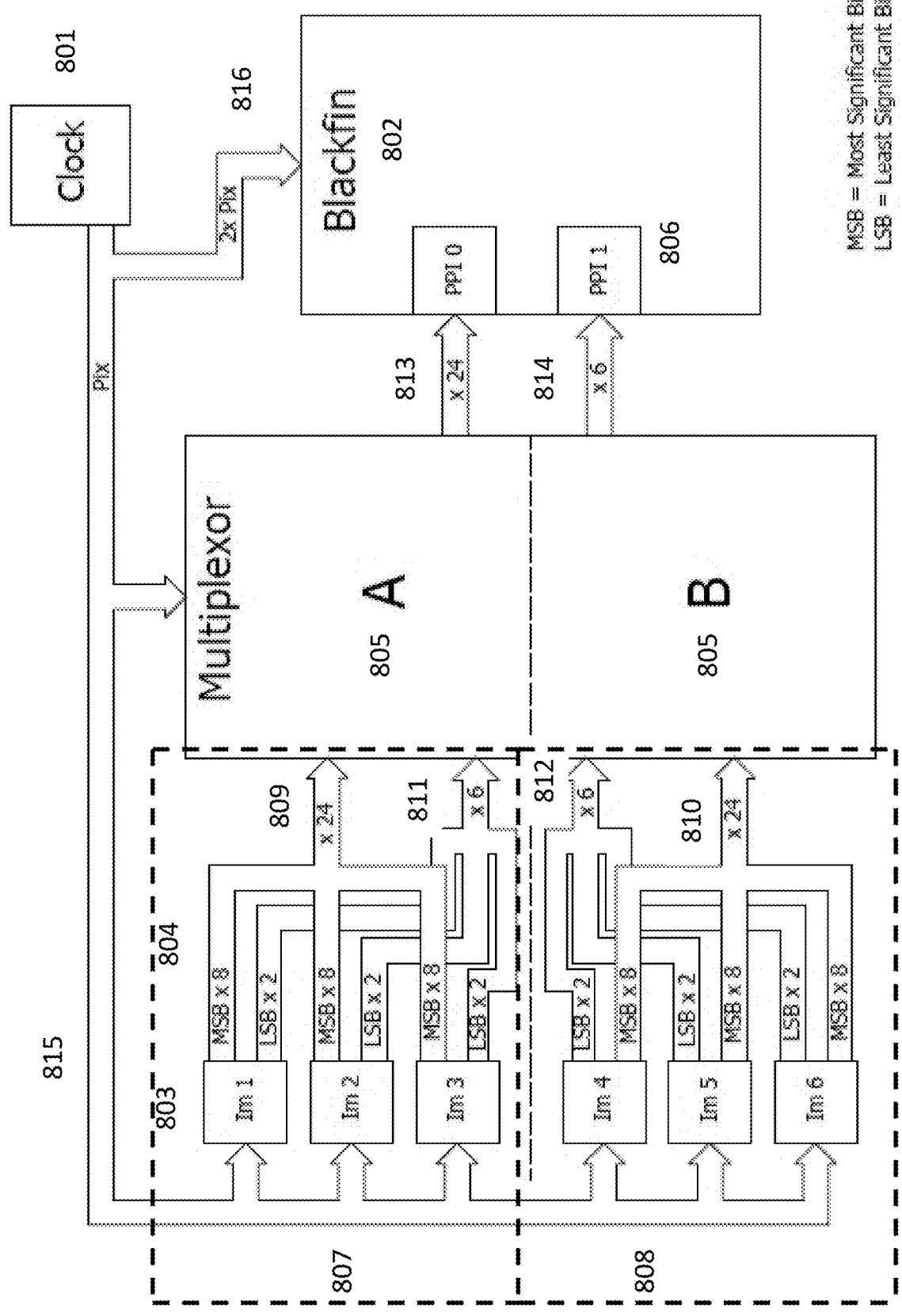
FIG. 8 is a circuit block diagram according to an embodiment of the invention.

FIG. 8 is a circuit block diagram according to an embodiment of the invention. Multiplexing may be used to allow the microprocessor 701 to accept data from a plurality of image sensors. In this example, a BlackfinBF548 microprocessor 802 may accept data from six imaging sensors 803 over two parallel peripheral interfaces (PPI) 806. Each of 6 image sensors 803 may be driven by same clock source 801, which may ensure that image data from the image sensors 803 is synchronized. Each of image sensors 803 may use a 10 bit data bus to transfer images. Six image sensors 803 may be separated into two groups of three image sensors 803 in each group—groups 807 and 808. Eight most significant bits from 3 image sensors 803 in each group may be placed sequentially, forming 24-bit signals 809 and 810. Two least significant bits from 3 image sensors 803 in each group may be placed sequentially, forming 6-bit signals 811 and 812. Two 24-bit signals 809 and 810 may be multiplexed by multiplexor 805A into single 24-bit signal 813. Two 6-bit signals 811 and 812 may be multiplexed by Multiplexor 805B into single 6-bit signal 814. The 24-bit signal 813 may be sent to PPI0 port of BF548 802. The 6-bit signal may be sent to PPI1 port of BF548 802. Multiplexor 805 may pass data from group 807 during high level of clock signal 815 and from group 808 during low level of clock signal 815, resulting in doubling data rate of the image data. In order to correctly receive this data, both of PPI ports 806 may use clock 816, which may be double the clock frequency used by the image sensors. In order to properly synchronize multiplexing of the image data 804, clock source 801 may allow phase control between clocks 815 and 816. In some embodiments, this combination of multiple image data streams may be achieved via the use of a Field-Programmable Gate Array (FPGA). In some embodiments, small microprocessors associated with each of the image sensors may buffer data and thus address the multiple-data-input problem solved through multiplexing above. This synchronization may enable some embodiments, wherein the rotation of the device requires very precise alignment of images in time that may not be required on a stationary camera platform, to function.

Figure 9:
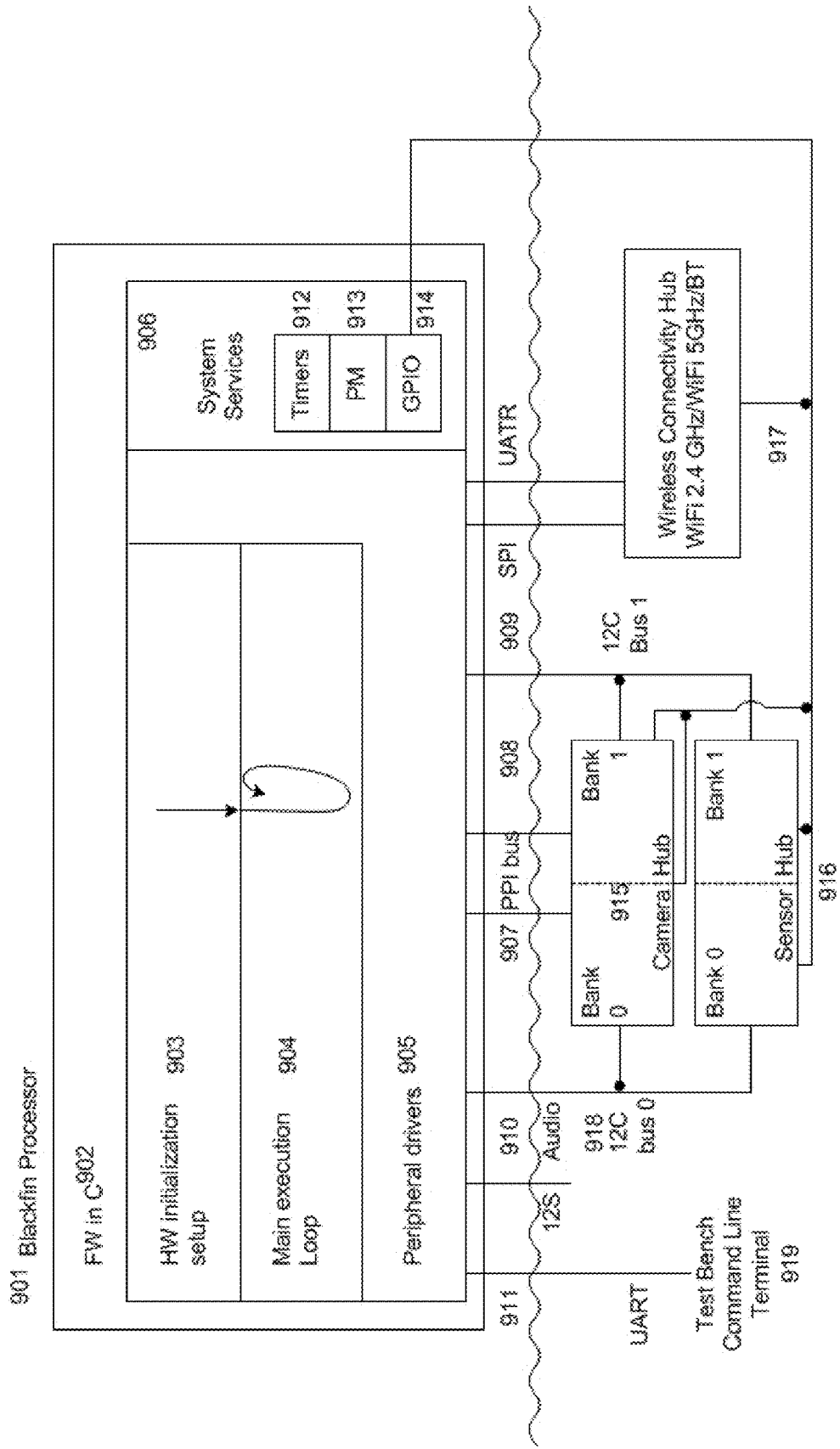
FIG. 9 is a sensor unit block diagram according to an embodiment of the invention.

FIG. 9 is a sensor unit block diagram according to an embodiment of the invention. FIG. 9 offers a high-level view of the hardware/software/firmware implementation on the sensor unit 101. In some embodiments, the on-board processor 901 may run a full operating system, such as Linux or Real Time OS. In FIG. 9, an embodiment is shown which does not rely on an operating system and instead uses a plain infinite main execution loop known as "bare metal" approach. The firmware 902 for microprocessor 901 may be written in C, a widely used programming language. In some embodiments, other programming languages might be utilized (e.g., interpreted scripting and/or assembly languages). The firmware may begin its executions upon reset and may run a one-time initialization of the hardware first, as illustrated in 903. From here, the main execution loop may begin and may run indefinitely as indicated in 904. Firmware initialization and main loop for the sensor unit 101 may use peripheral drivers 905 and system service 906 source and/or binary code. Peripherals and services may be specific to on-board processor 901 and may vary in other embodiments. Peripherals for 901 processor may include PPI bus 907 for imaging sensors, I²C bus 908 for additional non-imaging sensors control and data acquisition, SPI bus 909 for wireless connectivity, I²S bus 910 for audio, and/or UART channel 911 for auxiliary communication functionality. Services may include timers 912, power management facilities 913, and/or general purpose I/O 914 for various system needs.

Via peripheral drivers and system services, firmware 902 may control and utilize external devices attached to processor 901 by mechanical and electrical means. Set of cameras 915 may be controlled and utilized via PPI bus 907 and I²C bus 910. Audio functionality 918 may be controlled and utilized via I²S bus 910. Wireless connectivity module 917 may be controlled and utilized via SPI bus 909. Set of system sensors 916 (temperature, toxic gases, buzzer, IMU, etc.) may be controlled and utilized via I²C bus 918. UART channel 911 and its multiple instances may serve many auxiliary control and utilization needs, such as test bench command line terminal 919 or alternative access to wireless connectivity module 917. Some system devices external to the processor 901 may be controlled and utilized via GPIO 914 pins. Utilization and control for camera functionality in firmware may allow for proper acquisition of images into processor's 901 internal memory. Similarly, other data may be collected from other system sensors. To deliver collected information to user interface devices, firmware may use wireless connectivity functionality embedded in wireless connectivity module 917, which may provide 802.11 WiFi protocol communications along with higher level communication stacks (e.g., TCP/IP, BSD sockets, FTP, and/or HTTP). In some embodiments other protocols and/or communication stacks may be utilized (e.g., Bluetooth, 802.15 and custom and proprietary). In some embodiments, the wireless connectivity module 917 may perform some or all processing related to the image stitching and compression, in combination with and/or in place of other modules (e.g., processor 901). In some embodiments, a wired connection (e.g., USB) may be provided in addition to or instead of the wireless connection. In the latter case, the wireless connectivity module 917 may be replaced with a wired connectivity module, for example.

Figure 10:
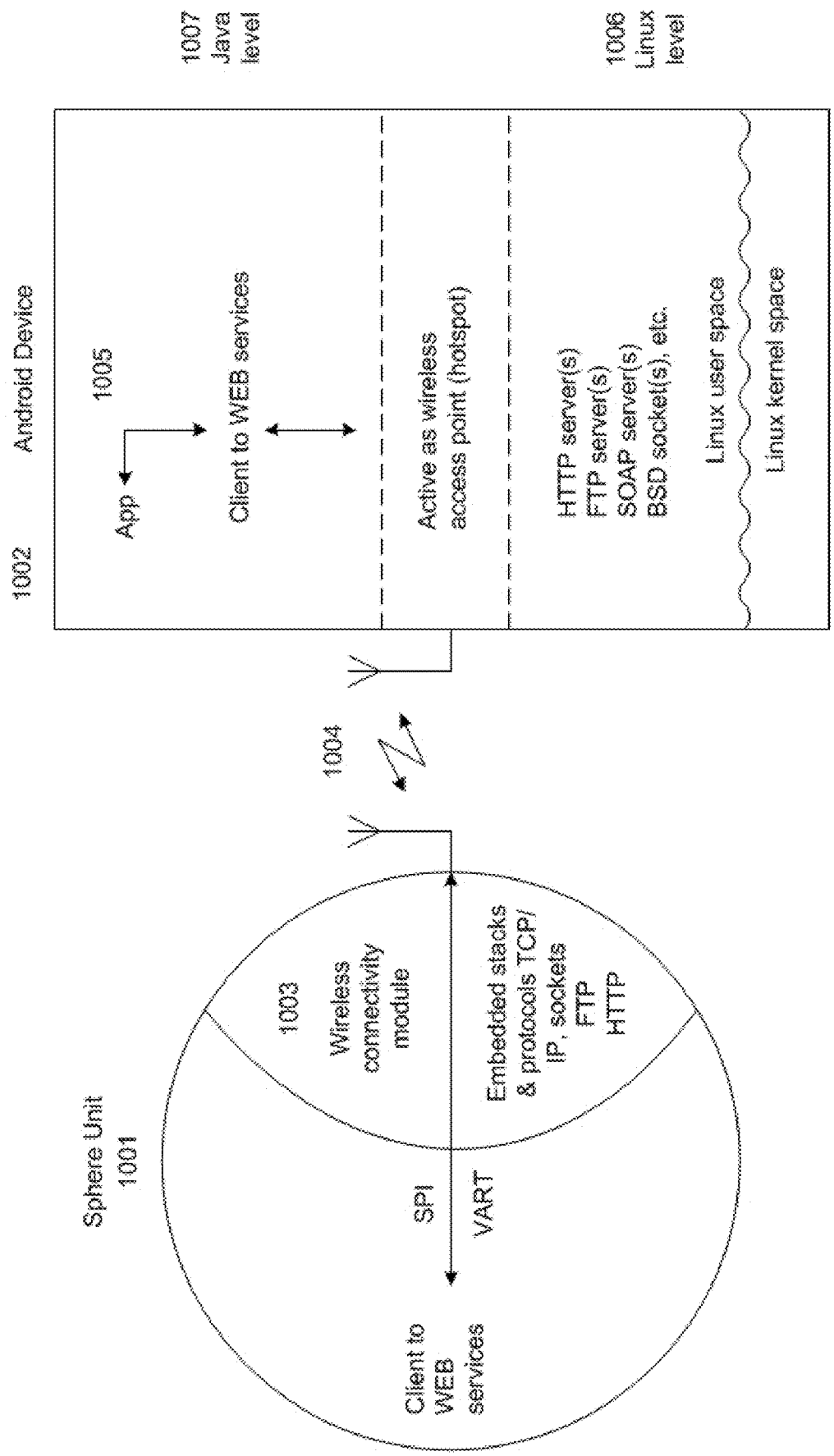
FIG. 10 is a network according to an embodiment of the invention.

FIG. 10 is a network according to an embodiment of the invention. FIG. 10 illustrates one of several possible architectures for communication between the sensor unit 1001 and the receiver unit 1002. In one embodiment, shown here, the sensor unit may act as WEB service client to the receiver unit, and sensor's wireless module 1003 may facilitate such behavior by providing embedded plain TCP/IP, BDS sockets, FTP, and HTTP protocols and stacks. In other embodiments, the sensor unit 1001 may act as a wireless hotspot and as a network server (TCP or UDP) that may be controlled by the receiver unit 1002. Microprocessor 701(901) may communicate with wireless module 1003(917) over UART and/or SPI connection and/or via a wired connection such as USB. In other embodiments, sensor unit 1001 may implement and act as a server to the receiver unit client with support from the wireless module. Data transmission may also occur in ad hoc fashion without a clear server-client arrangement established.

In the example embodiment shown, wireless module 1003 may connect as a client to a server on receiver unit 1002 via an 802.11b wireless link 1004. In some embodiments, the server on the receiver unit 1002 (in the embodiment shown, an Android tablet) may operate at the operating system level (in the embodiment shown, Android Linux). In other embodiments, the server or client on the receiver unit may be implemented at the application level (in the embodiment shown, at the Java level in an app). In the embodiment shown, the app 1005 may both configure the server properties of the receiver unit and process data from the sensor unit 1001.

Figure 11:
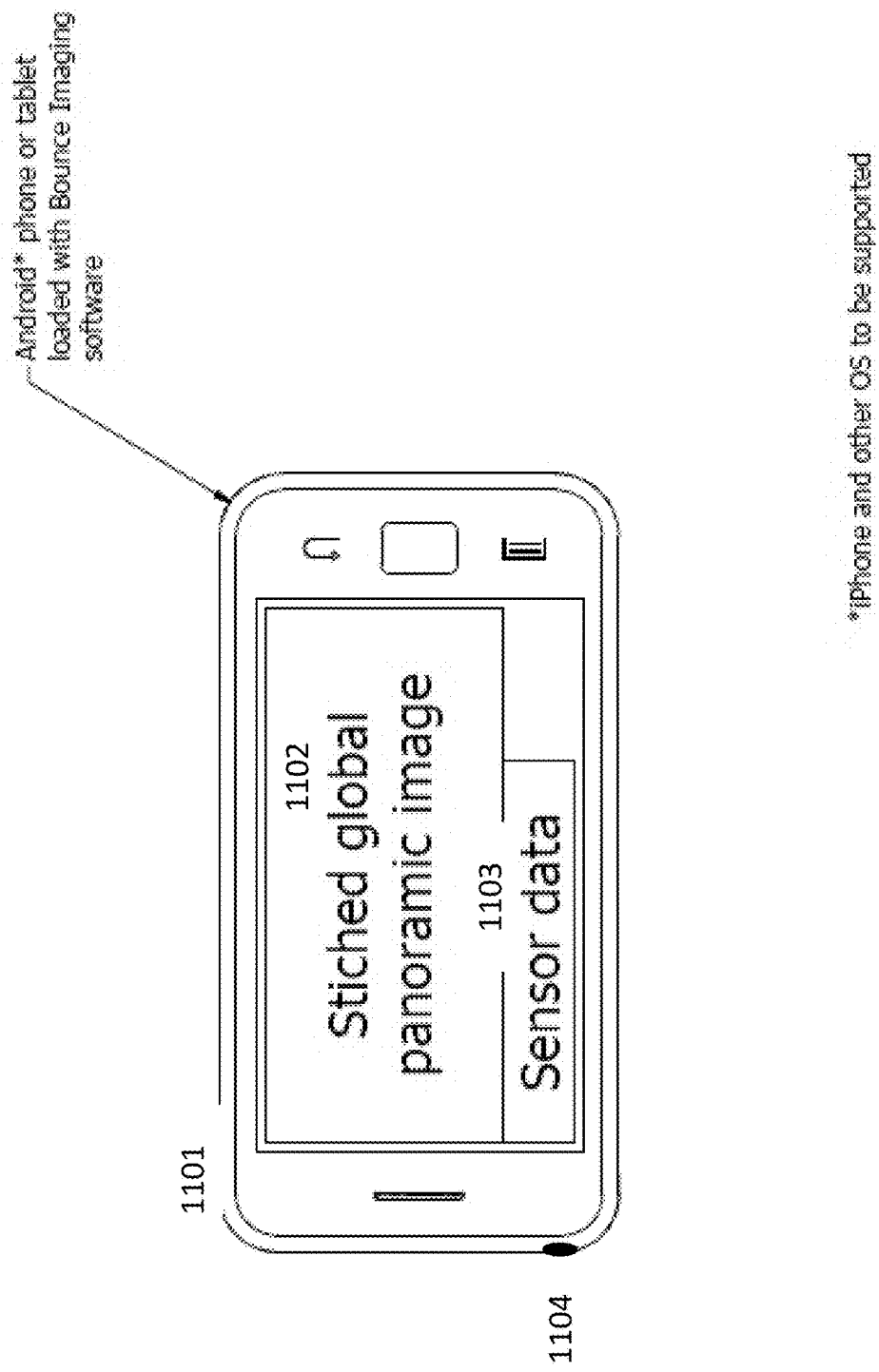
FIG. 11 is a user interface according to an embodiment of the invention.

FIG. 11 is a user interface according to an embodiment of the invention. FIG. 11 shows a simplified, example, high level diagram of the design of the display application on receiver unit 1101. This application may display a series of images 1102 of the space into which the sensor unit 101 is thrown. In some embodiments, the series of images 1102 may be frames in a video which may be played via the application, for example. The images 1102 may cycle automatically and/or be advanced manually, and the images 1102 may display the perspective of the sensor unit 1101 at different intervals over the course of its travel. Images 1102 may be oriented based on IMU information from the sensor unit 103 in such a way as to make the images intelligible to the user (e.g. right-side up and pointing in the direction that the sensor unit 101 was thrown). This may provide visual reference points which may be useful for making decisions about entering a space (e.g. "Is that object to the right or left relative to where the ball was thrown?") and/or provide a stabilized view of the path of travel of the sensor unit 101.

Sensor data overlay 1103 may display additional sensor data in some embodiments. In the embodiment shown, data 1103 about temperature and gas levels may be provided at the bottom of the screen. In other embodiments, data may be overlaid directly over the image where relevant.

Headphone jack 1104 on the receiver unit 1101 may allow the user or users to listen to audio data being transmitted from the sensor unit 101.

The application which displays information on receiver unit 1101 may take several forms. In the embodiment shown in FIG. 11, the application may be a Java-based Android app running on an Android tablet or smartphone. In other embodiments, the application may be an app on another operating system, such as iOS, Windows, or Blackberry. In other embodiments, the application may be a custom application for a different receiver unit. In each case, the application may include the following functions: configuring the communications protocols with one or many sensor units 101, processing image and sensor information received from the sensor unit 101, and/or displaying that information in a way that is useful to the end user. In some embodiments, the application may include further functions, such as triggering when an image or data point is taken, activating beepers, sirens, or diversionary devices, and/or controlling the motion of sensor units 101 when these are self-propelled.

Figure 12:
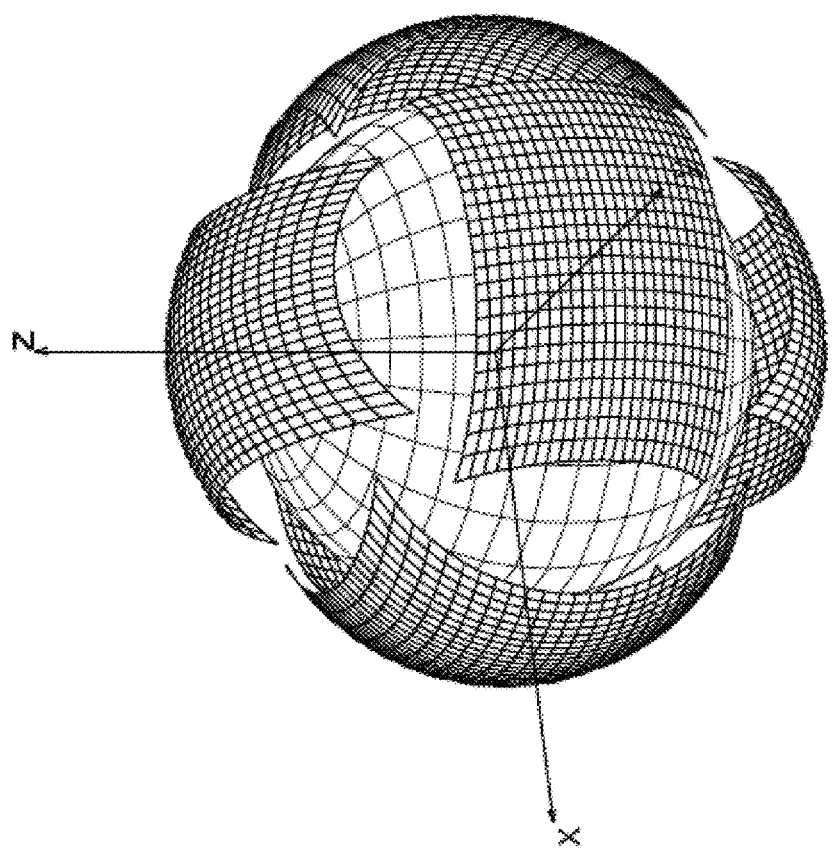
FIGS. 12-14 are an image processing method according to an embodiment of the invention.
Figure 13:
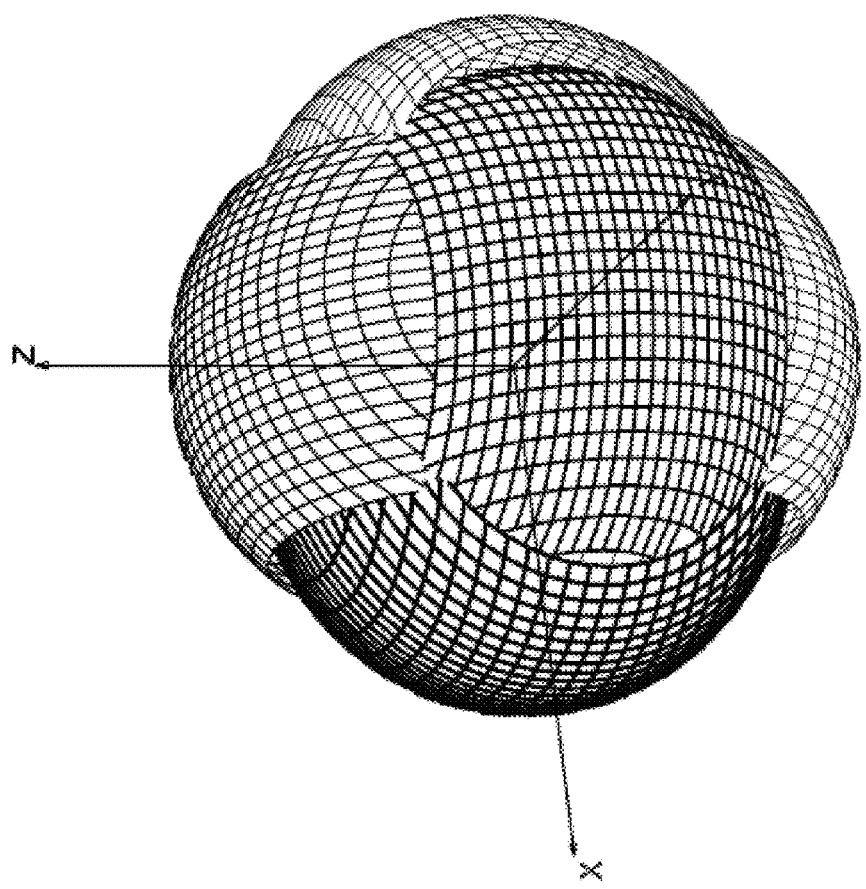
Figure 14:
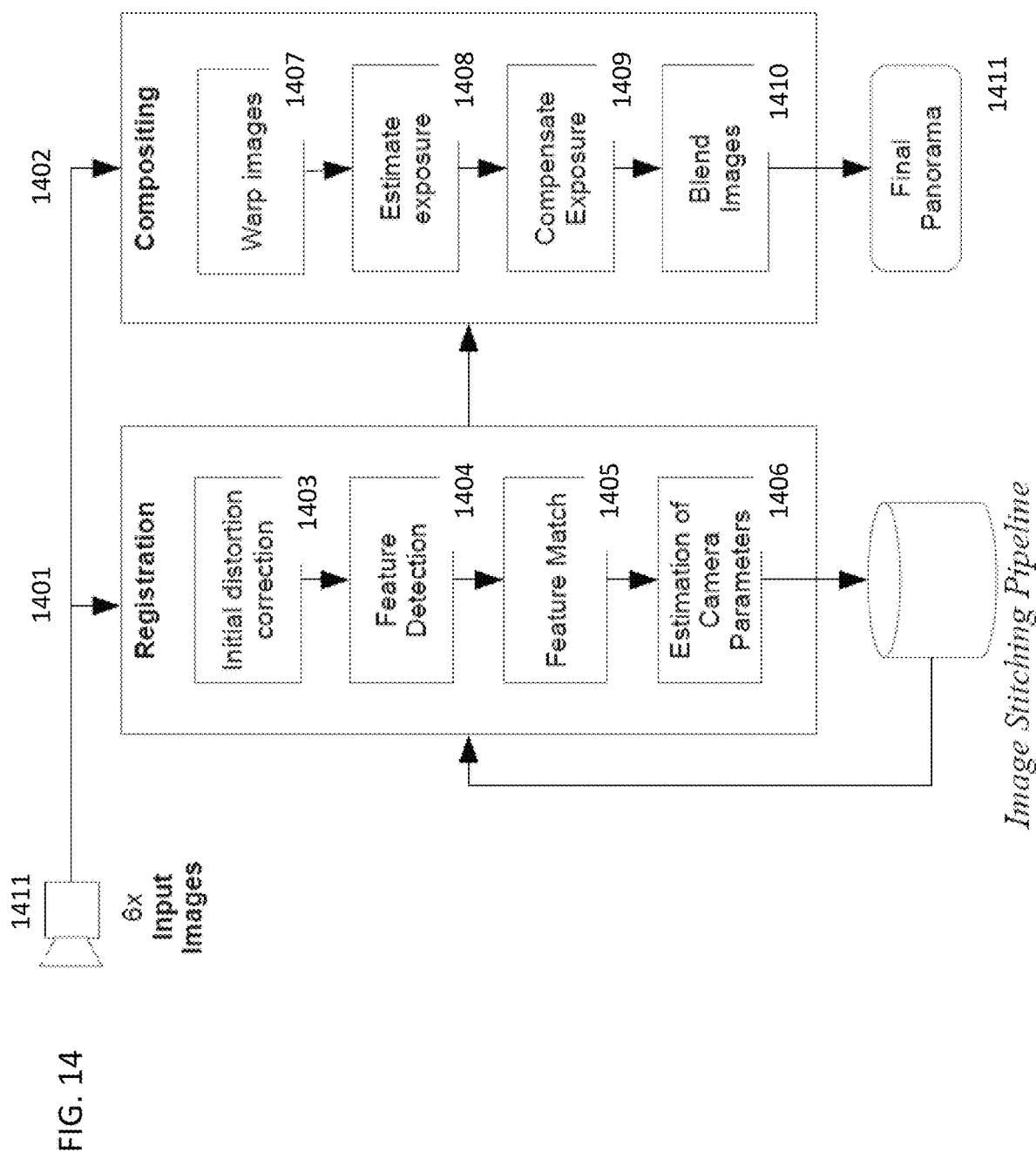

FIG. 12, FIG. 13, and FIG. 14 illustrate a process by which the application on receiver unit 1101 may process and display the images received from sensor unit 101 according to an embodiment of the invention. Creation of a panoramic image with the image data from the sensor unit 101 may assume the configuration shown in FIG. 12 of spherically projected images, for example. A wide-angle of 100° for the horizontal field of view (HFOV) and a 63° vertical field of view (VFOV) are shown in this example, although these angles may be lower than the real FOV achieved with wide-angle or fish-eye lenses in some embodiments. In this example, the image orientations may always rotate 90° between neighbors to increase the coverage of the spherical field of view. The aspect ratio shown is the same as in the image sensor chosen in one embodiment (in this example 480/752). FIG. 13 shows another sphere coverage example with an HFOV of 140° and a VFOV of 89°.

The spherical projection of each image may be computed from the sensor image, and due to the displacement of each camera in the physical sphere, the center of the spherical projection may be displaced with respect to the center of the reference sphere on which the panoramic image is created.

The panorama creation may follow the processing pipeline depicted in FIG. 14. Once the input images 1411 are received, the panorama creation process may be separated into two main steps: registration 1401 and compositing 1402.

Registration 1401 may begin with initial image distortion correction 1403. It then may proceed to feature detection 1404, which among other things may allow for control point matching across neighboring images. Feature match 1405 may follow and may be based on feature detection 1404. Next, camera parameters may be estimated 1406.

Compositing of images 1402 may also include a series of steps. Images may be warped 1407 to compensate both for fisheye effects and for how the images are to be displayed on a 2-dimensional screen. The exposure of the image may be estimated 1408 and compensated for 1409. The images may be blended 1410 into a single image. The resulting single image may form the final panorama 1411 displayed to the user on the receiver unit.

The entire process of image capture, registration, composition, and display of a final panorama (and sensor data overlay) may take only a few milliseconds when using the systems and methods described above. Such speed may be achieved because of a series of optimizations in the design of the processing software. One example optimization is the assumption, possible given the mechanical design of the sensor unit, that the cameras are at mostly fixed positions relative to each other. In addition, while prior research has included some mention of creating panoramas from fisheye/wide-angle lens images, these processes assume that images are taken from a single point in space. The stitching process used by the system may mathematically correct for the elimination of this center point assumption to allow the creation of panoramic images from the multiple cameras.

Image Processing

The following image processing systems and methods may be used to stitch images gathered by the imaging system of FIGS. 1-14 or any other multi-camera system. Stitching of images may be performed in a fraction of a second on a processing device (e.g., a smartphone or other mobile device and/or the imaging device itself) despite frequent noise and blur issues, no fixed center point, super-fisheye lenses, and limited processing power.

Figure 19:
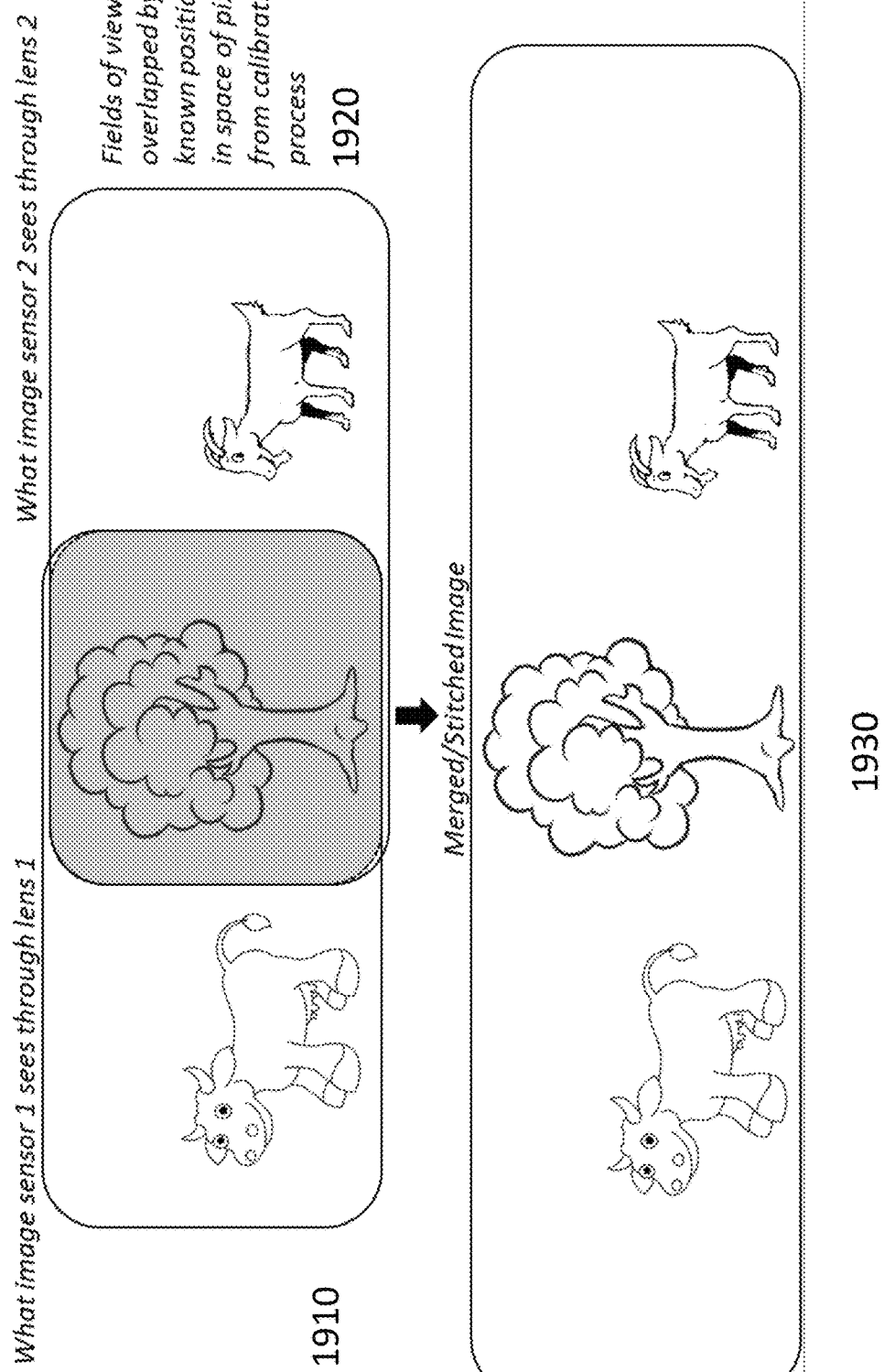
FIG. 19 is an image merging example according to an embodiment of the invention.

FIG. 19 is an image merging example according to an embodiment of the invention. Image merging may rely on a very precise calibration (described below) that allows the system to know precisely where pixels in images should lie in space and overlap these pixels across multiple images. For example, in a two camera system, image sensor 1 may capture first image 1910, and image sensor 2 may capture second image 1920. Both images 1910 and 1920 may contain pixels that overlap in space (e.g., the tree). The images 1910 and 1920 may be merged into a panoramic image 1930 based on these overlapping pixels. This method may require the positions of the cameras to be known precisely, as may be achieved through the calibration process described below. A mechanical understanding of camera/sensor positions is insufficient due to the non-linear nature of lens distortions (e.g., in fisheye lenses) in some embodiments. Thus, both an intrinsic and extrinsic calibration process may be performed and may deliver both precisely known camera/lens positions relative to each other and the specific characteristics of each lens being used. This data may allow the processor performing stitching/merging to know precisely where each pixel should lie in space. Thus, the disclosed systems and methods may precisely align the input images and merge/stitch them without feature matching.

Some embodiments are described herein in conjunction with the throwable platform comprising cameras in fixed positions described above. However, some embodiments may be extended to a range of platforms (e.g., telemetry from cameras on a drone). Moreover, the positions of the cameras may not need to be fixed if they can be precisely known. Thus, for example, six cameras on a person's clothing/helmet, each generating a small active signal (such as a Bluetooth signal) or a passive reply (such as an RFID), may use those signals to triangulate their precise position relative to the other cameras in space and do an "on-the-fly" calibration that may allow for cleanly-merged images and panoramas. Other techniques for determining the camera positions, such as mechanical links/cables or actuated arms moving them to known positions, may be similarly effective in allowing the use of the disclosed image processing even if the cameras/sensors are not in fixed positions relative to one another.

The image processing may rely on known relative positions of cameras (see extrinsic camera calibration as discussed below) in a system to pre-process camera calibration and other parameters on computers when the camera ball or other system is built or configured and store that information in lookup tables that may be accessed by the stitching application in a fraction of the time that it would take to re-calculate. The image processing may utilize a distortion model which, in contrast to standard models like Brown's lens model, may be readily able to handle fisheye lenses. Intrinsic and extrinsic calibration of a system of cameras may be performed by a calibration apparatus developed specifically for fisheye lenses. The image processing may utilize an automatic line-detection method that may provide automatic calibration of camera systems in mass-production. In some embodiments, manual calibration may be performed. The image processing may be performed wholly or in part by a mobile application that is highly optimized to process and display image data to the user in some embodiments. The image processing may provide a user interface designed to allow the user to quickly and easily navigate the panoramic image data provided by the system.

The system may pre-compute as much information as possible at the calibration stage when a new camera ball or other camera system is manufactured or re-calibrated. This may vastly reduce the amount of computational resources required when the imaging process is run, for example, on a mobile device (the process may also be run on a computer, server, embedded hardware, or other system/processor, but the mobile device is used as an example herein). Because users may navigate the image within a spherical context (e.g., due to spherical arrangement of cameras and naturally curved fisheye images), the processing may be performed in a spherical projection context, rather than transitioning to a planar projection (thereby saving a processing step of transitioning to a planar projection).

Pre-Processing the Intrinsic and Extrinsic Calibration

Figure 15:
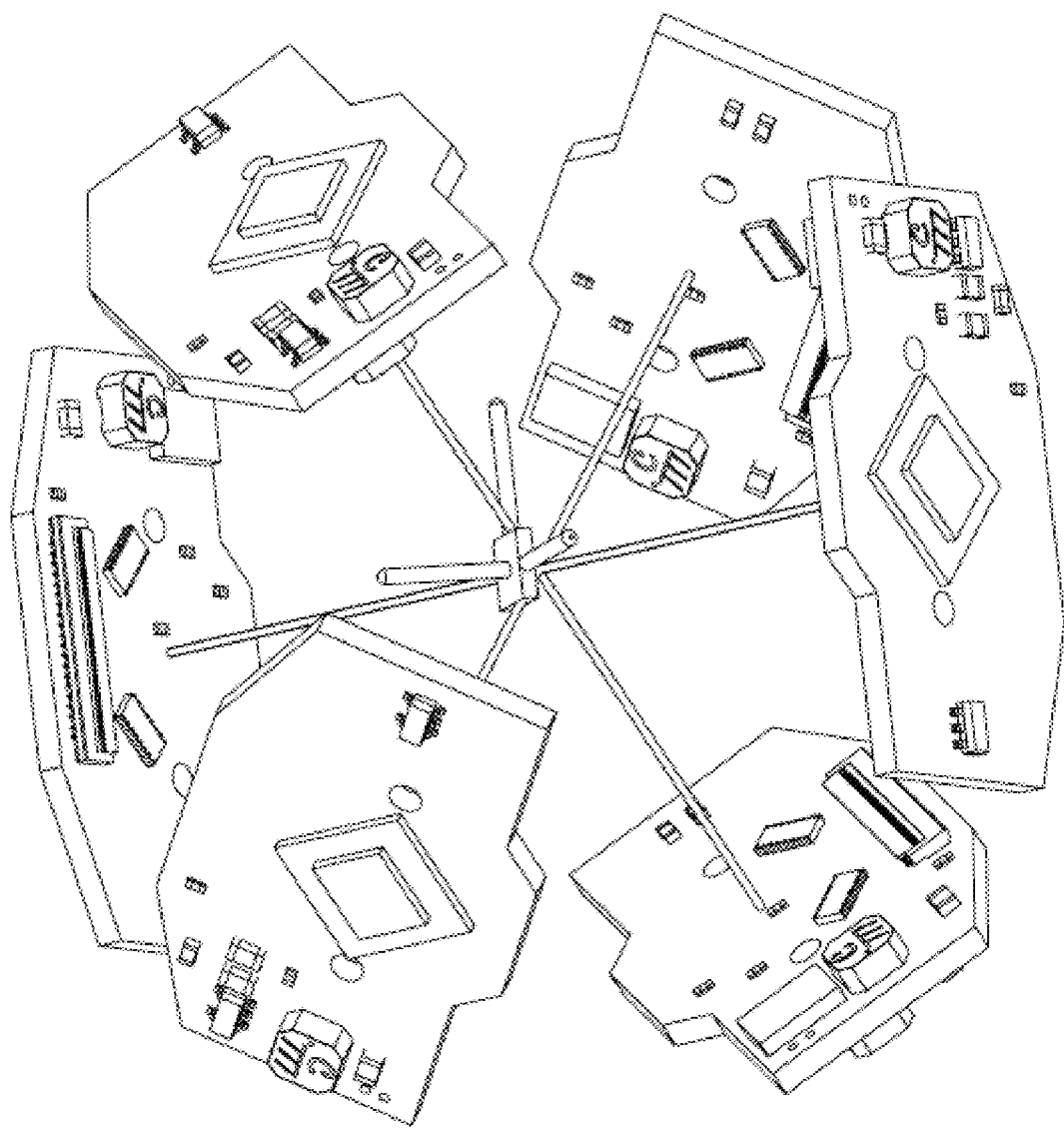
FIG. 15 is a camera system with a set of axes according to an embodiment of the invention.

In some camera systems with which the image processing is employed there may be no fixed center point (e.g., in the case of the camera ball). Thus, a virtual center point/origin may be created by mathematically mapping the images as if they were captured from the optical center—the point at which lines drawn through the center of each of the cameras would intersect. FIG. 15 is a six-camera system with a set of axes developed around the optical center (intersection point of lines drawn through each camera) according to an embodiment of the invention, though the number of cameras may vary. A spherical model may be developed via the projection of lines and planes cutting through the virtual origin of the camera system and as determined by the calibration described below.

Distortion and initialization parameters may be calculated via a genetic optimization framework. This recognizes that even the most precisely-built calibration apparatus may have some error and allows lenses (and their associated distortion and other characteristics) to be changed as needed. A genetic optimization framework may be hybridized with a classical optimization to find local minima around each genetic-produced individual (in other embodiments, other algorithms/methods may be used). This hybrid approach may find optima in a nonconvex error surface, may be faster than pure genetic optimization, and may avoid the use of the full gradient derivation of error functions. The framework may provide a precise estimation of the parameters for the intrinsic calibration, which may allow such data as the vertical and horizontal fields of view and the complete field of view to be measured, and may provide a warping model to project a fisheye image onto a sphere.

To allow the genetic algorithms to avoid over-optimizing to a particular set of images, the system may be provided with several sets of images taken from different perspectives.

Calculating distortion models for fisheye lenses may require the estimation for the inverse model for doing the image warping. The disclosed systems and methods may use a lookup table to make these computations feasible on a mobile device. In some embodiments the calculation may take milliseconds, with precisions measured in fractions of a pixel.

Figure 16:
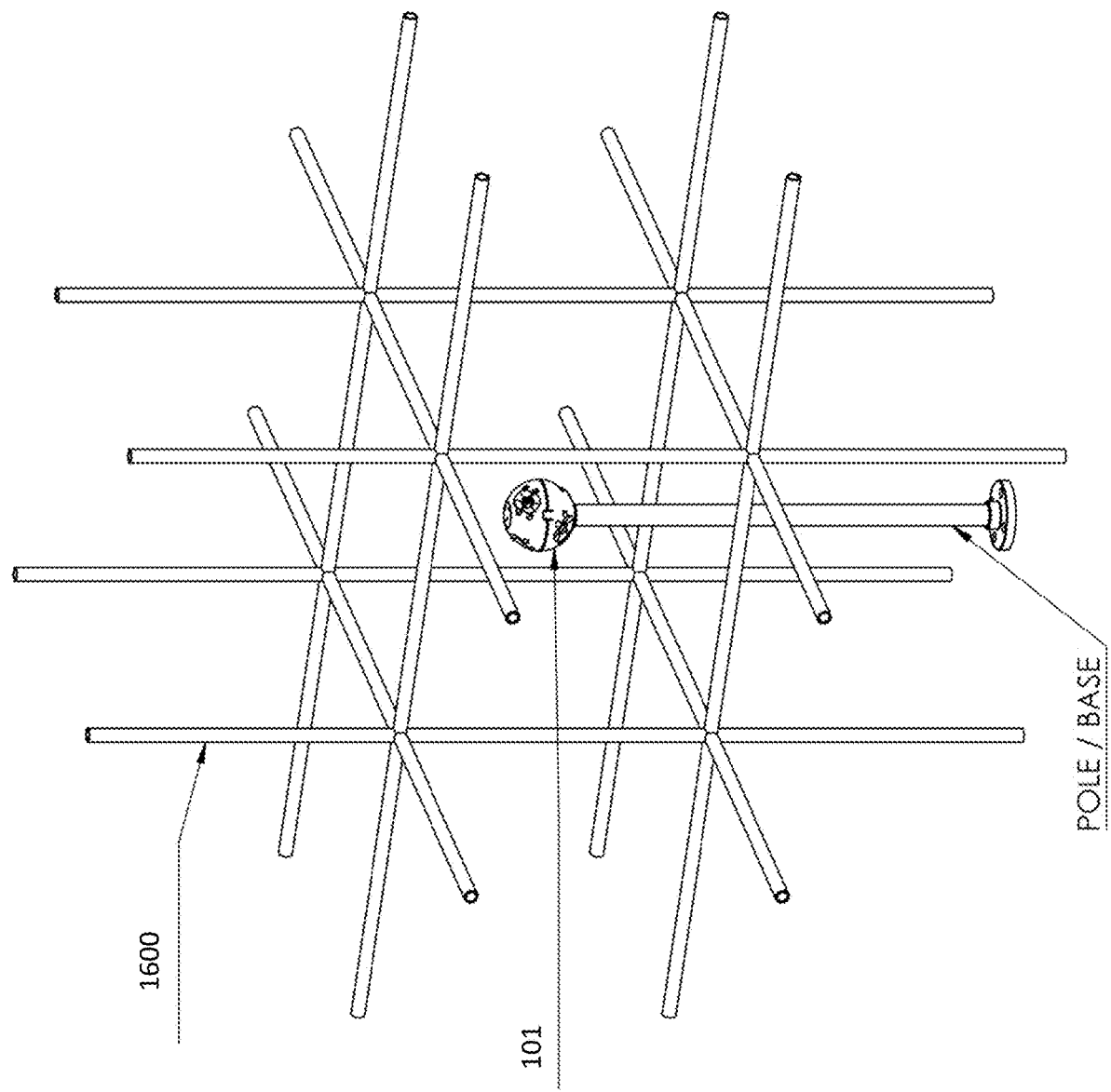
FIG. 16 is a calibration cage according to an embodiment of the invention.

Extrinsic camera calibration may be complicated by the high distortions of the fisheye lenses, especially when super-fisheyes are used, as in the throwable ball camera. To address this issue, a calibration cage apparatus that takes the form of an open cube with extended arms may be used in calibration. FIG. 16 is a calibration cage 1600 according to an embodiment of the invention. The camera system, in this example the camera ball 101, may be placed within the calibration cage 1600. The calibration cage 1600 may offer eight available coordinate systems to map the relative positions and perspectives of all cameras in the system. Each axis may have lines that indicate a 45-degree (or other) angle and markers which denote distance (e.g., 5 cm between vertical lines). Each axis may also have human-readable identifiers (such as "#" or "Z") and/or machine-readable indicators such as April tags. In some embodiments, axis identifiers may not be needed because the camera may be rotated via a mechanical arm to pre-determined positions within the calibration cage 1600. Additionally, some of the algorithms disclosed below may be used with a broad range of alternative calibration apparatuses (e.g., anything with very long, straight lines) in some embodiments. For automatic calibration, the contrast and clarity of the system may be enhanced via the application of electroluminescent tape or other electroluminescent materials which may fluoresce when a current is applied.

Some embodiments may utilize the calibration cage 1600 to provide a known set of axes and reference points for calibrations, especially during an initial calibration. In other embodiments, camera systems may self-calibrate in the field given known positions in space (such as lines of a known separation on a ceiling) or with projected lines (such as lasers included in the system projecting a grid).

Electroluminescent tape or other luminescent marking may be placed along the lines of the cage. In a dark environment, the camera unit may be placed inside the calibration structure. The camera unit may be automatically moved to various positions inside the structure and capture and save camera images at each position. Using the known approximate line positions, the detected lines may be identified.

The methods described for camera calibration may be extended to non-visual data, such as thermal infrared sensor data or ultraviolet-light images or radio or radar images. Any set of sensors in a known configuration receiving signals from the outside world may similarly be combined into a panorama given an understanding of the relative positions of the sensors and how the sensors receive information.

While some embodiments are described in conjunction with a camera in space or in the medium of air, other embodiments may be extended to media other than a vacuum or air, such as underwater. The calibration processes may be appropriately adapted to account for the different behavior of light (or other signal data, such as sonar) underwater, underground, or in another medium.

The relation between two cameras for the extrinsic calibration may be established using the plane-circle concepts already used in the intrinsic camera calibration. The extrinsic calibration may yield the exact geometrical configuration of all cameras in the system, which may be useful for warping the spherical projected images. With fisheye lenses there may be strong distortion of objects lying near the sphere and captured by several cameras. To simplify calculation, the system may assume that the spherical projections produced with the model of the intrinsic calibration come from rays originated at infinity. With this assumption, the spherical projections of the cameras may be warped into a global spherical projection.

Figure 17:
FIG. 17 is a panorama according to an embodiment of the invention.

Model parameters and extrinsic parameters may be adapted to force a perfect stitching, but the optimization of those parameters may be time consuming because it involves a bundle adjustment of all six camera models. In some embodiments, parameter optimization may be replaced with a blending framework since the images may already be properly warped. A variety of methods for the final blending of images may be used. For example, feathering may provide clean and nearly perfect images in milliseconds on almost any device. The degree of feathering may be modified to find an optimal image result. Multiband blending may be more precise, but sometimes may require more processing power to process at high speed. In some embodiments, these two warping processes may be computationally merged. FIG. 17 is an example panorama of a stitched image (flattened to fit on a 2D piece of paper) produced according to an embodiment of the invention.

An application on the mobile device may use the information from the intrinsic and extrinsic calibration to carry out the final steps of image processing and stitching. When images are processed on a mobile device (for example, Android or iOS), the received files that contain images may also include an XML with all the intrinsic and extrinsic parameters calculated as described above.

Image alignment and stitching may involve estimation of a mathematical model that relates the pixel coordinate systems between different images, estimation of the global alignment between pairs of images, detection of distinctive features in images and finding correspondences between them, computation of a globally consistent set of alignments for several images, selection of a final compositing surface and its parameterization where all other images will be warped and placed, and blending of the overlapping images.

Estimation of the models for alignment and the relationships between images may be performed by calibration, i.e., the estimation of the intrinsic and extrinsic parameters for all cameras involved. Intrinsic calibration may involve the estimation of the optical relationships between lenses and sensors, including the form factor and pixel skewness due to misalignments between sensor and lens, the optical distortion parameters, and/or the optical axis center in an image. Extrinsic calibration may relate the camera coordinate systems among themselves and to a global reference.

Note that while the sensor unit described above is a throwable unit housing a plurality of cameras, any device that receives image data from a plurality of cameras may be a sensor unit for the purposes of the image processing described herein. Thus, for example, a computer coupled to a plurality of cameras in any arrangement may be a sensor unit. Likewise, while the receiver unit described above is a smartphone or tablet in wireless communication with the throwable ball, any device that processes the image data into a combined (e.g., panoramic) image may be a receiver unit for the purposes of the image processing described herein. Thus, for example, any computer coupled to the sensor unit (e.g., via wired or wireless connection) may be a receiver unit. Also, the receiver unit may be another portion of the same computer that serves as the sensor unit in some embodiments (e.g., the sensor unit may be a first dedicated module, software element, processor, etc. of the computer and the receiver unit may be a second dedicated module, software element, processor, etc. of the computer).

Intrinsic Calibration

Intrinsic calibration may involve determining the parameters of individual cameras (intrinsic parameters). These parameters may describe how the lens distorts the light rays going through it and how the camera sensor is positioned relative to the lens, for example. Intrinsic calibration may be performed using a calibration object (e.g., the calibration cage described herein or some other object). A calibration object may be a 3 dimensional object with known properties and dimensions. Using the data of different views of the calibration object, the parameters may be derived.

The intrinsic parameters may be determined by an algorithm that varies the intrinsic parameters until an optimum is found. The different parameter values may be evaluated using a number of criteria. For example, criteria may include the measure of how straight the lines of the calibration object are in the panorama representation and/or how well camera position and orientation may be determined.

The algorithms that determine the optimal parameters may be executed by any device. For example, the determination may be made by the camera unit, the viewing device, or another device possibly in a remote location. For example, the calibration algorithms may be executed on a web server to which a calibration job can be dispatched.

The determined parameters may be stored on the camera unit, the viewing device, or on another device possibly in a remote location, for example, as long as the parameters are available together with the camera data (e.g., image data) when creating a panorama. For example, the calibration parameters may be stored in the camera unit and may be sent together with the camera and sensor data to the device that creates the panorama.

Fisheye Projection Model

In order to readily accommodate fisheye lenses having fields-of-view (FOV) near 180°, a spherical projection surface may be used. For example, a lens with an FOV near 180° may need only one spherical surface to be projected instead of two planar surfaces. Additionally, the final result of the stitching process may be a spherical mapping of the image captured by all cameras, thus the use of a spherical projection surface may reduce calculations in later steps of the process. In some embodiments, the spherical projection of each camera and the final spherical projection may have a displacement, but both representations may be relatively close.

The projection of a point $p_w=(x_w, y_w, z_w)$ in the world coordinate system into a point $m'=(u, v)$ on the two-dimensional fisheye image may be modeled in four steps. The notation for a point may be given as $p=(x, y, z)$ to represent the equivalent column vector notation $p=[x, y, z]^T$. The steps may proceed as follows:

1. From world coordinate system to camera coordinate system $$p_w=(x_w,y_w,z_w) \to p_c=(x_c,y_c,z_c)$$

2. Projection on the unit sphere $$p_c=(x_c,y_c,z_c) \to p=\langle \gamma,\theta,\varnothing \rangle \text{ with } \gamma=1$$

3. Lens distortion to produce the ideal fisheye coordinates $$p = \frac{p_c}{\|p_c\|} \to m = (x, y)$$

where m is on the image plane

4. Affine transformation to produce the actual fisheye image $$m=(x,y) \to m'=(u,v)$$

Step 1: The transformation between the world coordinate system and the camera reference may be modeled with rotation matrix R and a translation vector t such that $$p_c=R_{p_w}+t$$

All elements of R and t may constitute the extrinsic parameters.

Step 2: The three dimensional point $p_c$ may be projected onto the unit sphere on a ray going through the origin of the camera coordinate system as follows:

$$p(x, y, z) = \frac{p_c}{\|p_c\|} = (\sin\Phi\cos\theta, \sin\Phi\sin\theta, \cos\Phi)$$

That ray may be fully described by the two angular components of the spherical coordinate system $\langle \theta, \Phi \rangle$. The angles may be computed as $$\theta = \arctan\left(\frac{y}{x}\right)$$

$$\Phi = \arccos(z)$$

The angle θ may represent the longitude angle with respect to the x axis, and the angle Φ may represent the latitude with respect to the polar axis z.

Step 3: The fisheye distortion model D may describe the optical projection occurring in the real camera, but under idealized circumstances such as perfect parallelism between the image projection plane and the xy-plane, and the principal axis crossing the origin of the xy-plane.

$$m=(x,y)=(\gamma \angle \theta)=D(p)=D(\langle \theta, \Phi \rangle)$$

Figure 20:
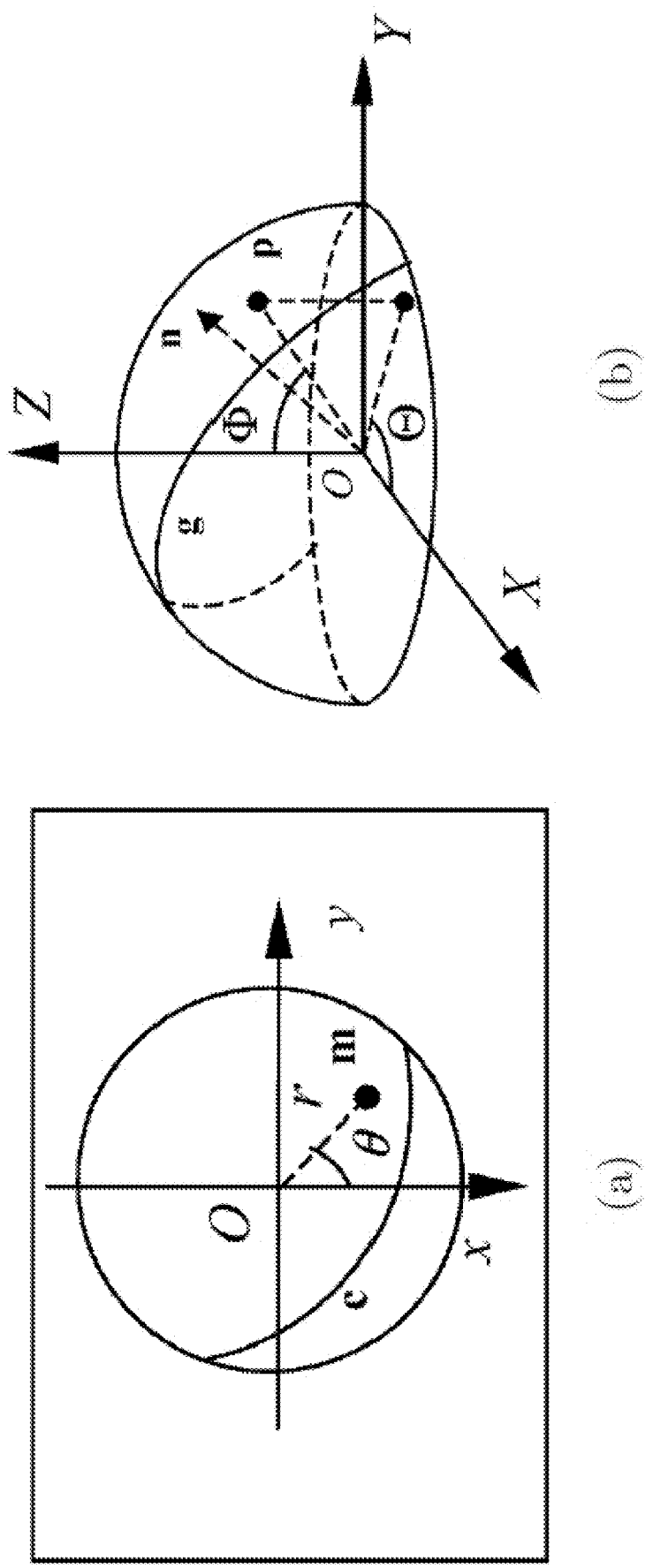
FIG. 20 is an ideal fisheye projection and a corresponding spherical perspective image according to an embodiment of the invention.

FIG. 20(a) shows an ideal fisheye projection (top view of the spherical coordinate system), and FIG. 20(b) shows a corresponding spherical perspective image, according to an embodiment of the invention. Here $r=\sqrt{x^2+y^2}$ and $\theta=\arctan(y/x)$. The current distortion model may treat the tangential $D_T$ and radial $D_R$ components separately as polynomials with no offset term as follows:

$$r=D_R(\Phi)=\Sigma_{i=1}^{5} d_i \Phi^i$$

$$\theta=D_T(\theta)=\Sigma_{i=1}^{5} b_i \theta^i$$

where $d_i$ are the radial and $b_i$ the tangential distortion parameters.

In some embodiments the radius of the fisheye may be unknown, since the complete surface of the sensor may be covered by the projection and hence the fisheye circle is not visible. Furthermore, the field of view of the lens may not be precisely known. Therefore, the calibration may not restrict the coefficients $d_i$ of the radial distortion and may estimate all five coefficients.

For the tangential distortion, continuity of the distortion $D_T$ and its derivative $D'_T$ may be assumed, that is:

$$D_T(0)=0$$

$$D_T(2\pi)=2\pi$$

$$D'_T(0)=D'_T(2\pi)$$

which may be used to obtain:

$$b_4 = \frac{5(1-b_1)-3(2\pi)b_2-2(2\pi)^2 b_3}{(2\pi)^3}$$

$$b_5 = \frac{b_1+b_2\pi+b_3\pi^2-1}{(4\pi)^4}$$

Three parameters for the tangential distortion may remain.

Step 4: By using homogeneous coordinates, the last step may be expressed in terms of a linear transformation as follows:

$$\hat{m}'=K_A \hat{m}$$

where the homogeneous points $\hat{m}'=(u, v, 1)$ and $\hat{m}=(x, y, 1)$ are extensions on an additional unitary component of the Euclidean points $m'=(u, v)$ and $m=(x, y)$, as may be customary in the projective geometry. Additionally, the affine transformation matrix $K_A$ may be defined as follows:

$$K_A = \begin{bmatrix} a & s & u_0 \\ 0 & 1 & v_0 \\ 0 & 0 & 1 \end{bmatrix}$$

The skew s, pixel aspect ratio a, and image center $(u_0, v_0)$ may be among the intrinsic parameters to be estimated during the calibration process.

The calibration process may determine twelve extended intrinsic parameters: five for radial distortion ($d_i$, i=1 ... 5), three for the tangential distortion ($b_j$, j=1 ... 3), and four for the affine transformation a, s, $u_0$, $v_0$.

Inverse Model

The previous model may transform a point in space into a point on the fisheye image. For the calibration process, the opposite process may be performed. Given a point on the fisheye image, the ray originating at the coordinate system of the camera that contains the corresponding space point may be determined. This may involve the following steps:

1. Map m' to m by mapping their homogeneous versions as follows:

$$K_A^{-1} = \begin{bmatrix} \frac{1}{a} & -\frac{s}{a} & \frac{sv_0-u_0}{a} \\ 0 & 1 & -v_0 \\ 0 & 0 & 1 \end{bmatrix}$$

2. Reverse the lens distortion using the following:

$$\Phi=D_R^{-1}(r)$$

$$\Theta=D_T^{-1}(\theta)$$

Since the polynomials $D_R(\Phi)$ and $D_T(\Theta)$ have no closed-form inverses, look-up tables (LUT) may be pre-computed to approximate them. There may be one LUT for $D_R^{-1}(\Phi)$ and another for $D_T^{-1}(\Theta)$, and one pair for each camera. All LUTs may be computed for each camera in the mobile device, because the camera parameters may vary between cameras and spheres. To enable rapid computation, an approximation method may be used.

Great Circle Fitting

In order to find the intrinsic model, it may be necessary to define an objective function to be minimized. This may be done based on sampled points of several image curves depicting space lines on the fisheye image. Every straight line in space and the point at the origin of the camera coordinate system may span one single plane, which may always cut the spherical projection surface in a circle. The normal of a plane may be found that, projected back to the fisheye image, produces the smallest error on the set of markers of the corresponding line. This process is known as great circle fitting.

Let $<\alpha, \beta>$ be the directional angles of the normal of the plane containing both the great circle and the origin of the camera coordinate system (e.g., FIG. 20(b)). The normal may thus be $n=(\sin\alpha\cos\beta, \sin\alpha\sin\beta, \cos\alpha)$. The distance d from a spherical point p and the plane $<\alpha, \beta>$ may therefore be $$d=|p^T n|$$

The problem of great circle fitting may reduce to the minimization of the sum of squares of distances between N known spherical points pi and the plane.

$$F(n) = \sum_{i=1}^{N} (p_i^T n)^2$$

Each spherical point $p_i$ may be generated from a landmark $l_i$ depicted on the fisheye image, using the inverse projection model described in the previous section.

The solution of the fitting problem may be found noticing that for a matrix A containing all spherical points $A=[p_1, p_2, \ldots, p_N]^T$, if all those points belong to the great circle then $An=0$. Hence, $$F(n) = \sum_{i=1}^{N} (p_i^T n)^2$$

may be rewritten as $$F(n)=(An)^tAn=n^T(A^TA)n=n^TBn$$

The solution n may be the eigenvector of B corresponding to the smallest eigenvalue.

Objective Function

The previous section described a way to compute the normal of the plane closest to all sphere points corresponding to the set of landmarks of the image of a space straight line depicted on the fisheye image.

Let now L be the number of image curves on the fisheye image, depicting space straight lines, and let $N_j(j=1, \ldots, L)$ be the number of landmarks on the j-th image curve. Let $m'_{i,j}$ represent the i-th landmark on the j-th image curve. Those landmarks may be projected into the sphere with:

$$p_{i,j}=D^{-1}(K_A^{-1}(m'_{i,j}))$$

where the functional notation $K_A^{-1}(.)$ may denote the transformations to and from homogeneous coordinates.

The objective function may be defined as $$E(\rho) = \sum_{j=1}^{L} F(n_j) = \sum_{j=1}^{L}\left[\sum_{i=1}^{N_j}(p_{i,j}^T n_j)^2\right]$$

with $n_j=(\sin \alpha_j \cos \beta_j, \sin \alpha_j \sin \beta_j, \cos \alpha_j)$ the normal vector for the plane containing the best t great circle of the j-th line, and $$\rho=[a,s,u_0,v_0,d_1,d_2,d_3,d_4,d_5,b_1,b_2,b_3]^T$$

Optimization Process

The optimization process may use a multi-objective hybrid optimization approach, which may avoid issues arising from a lack of knowledge of the radius of the fisheye image and field of view of the lenses and/or from difficulty of computation of an algebraic derivation of the gradient of the error function or a numerical approximation thereof.

The disclosed systems and methods may use a genetic optimization process, in which through mutation and crossover of the previously best initialization points, new possible better solutions may be generated. Each point so generated may be used as seed of a deterministic downhill-simplex optimization. Even though this method may have a slow convergence, it may provide a low risk of stopping at saddle points or local maxima due to its reliance on the function value only (i.e., no gradient required).

The method may be multi-objective, which means not only the error function E is optimized, but other criteria such as the achievable field of view of the lens, the skewness, or aspect ratio of the pixels may be inserted in the optimization process.

Evaluation may be performed using the Pareto front. The aggregate fitness function F for a model A with the parameterization ρ, evaluated using as reference the ground truth data g may be defined as $$\mathcal{F}(A_\rho,\mathcal{G})=\psi(f_1(A_\rho,\mathcal{G}), \ldots, f_n(A_\rho,\mathcal{G}))$$

with the individual fitness functions $f_i(A_\rho, \mathcal{G})$ defined to increase monotonically with the fitness of some particular aspect of the model's behavior. All components $f_i$ may span a multidimensional fitness space, where each point may represent the performance of the model $\mathcal{A}_\rho$, parameterized with one point p in a parameter space.

Figure 21:
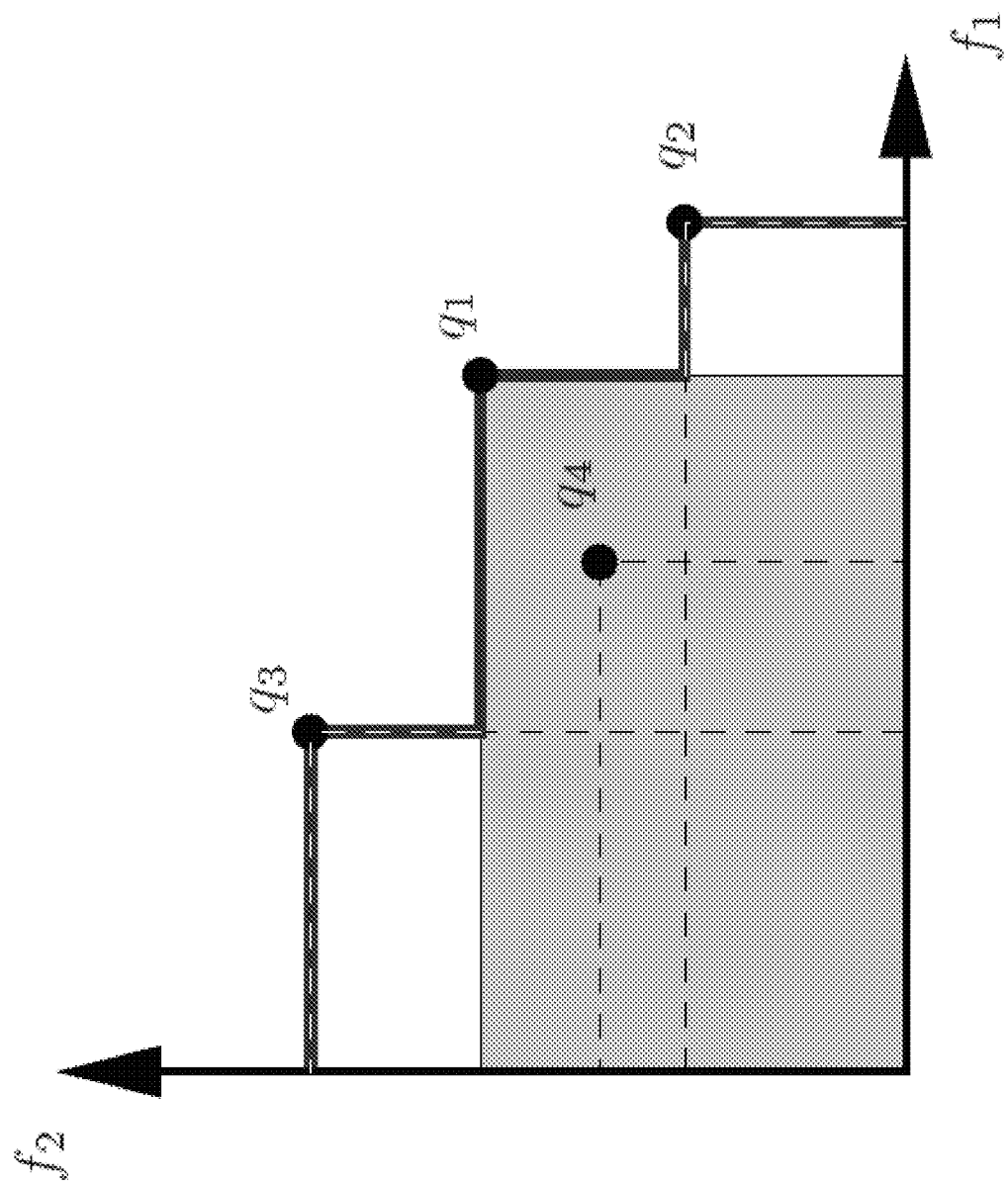
FIG. 21 is a Pareto front according to an embodiment of the invention.

The general form of ψ may be assumed unknown, but it may be known to increase monotonically with increasing values of all fitness functions $f_i$. This condition may ensure that a point in the fitness space may be considered fitter than all other points with smaller values in all dimensions. FIG. 21 is a Pareto front according to an embodiment of the invention. The point $q_1$ dominates the region highlighted with a gray rectangle. Dashed lines delimit the dominated regions of the points $q_2$, $q_3$, and $q_4$. The thick solid line represents the Pareto front for the four points. In FIG. 21, for example, the point $q_1$ may be fitter than the point $q_4$ and all other elements within the rectangle. In this context, the point $q_1$ may be said to dominate $q_4$. All non-dominated points in a set may define the Pareto front of that set. In the example of FIG. 21 this front may be defined by the points $q_1$, $q_2$, and $q_3$. Choosing a parameterization that is not in the Pareto front may be a bad choice since there is another point on the front with a better aggregate fitness.

The previous concepts may be expressed mathematically using the following equation:

$$\hat{p}=\{\{\langle \rho\in \mathbb{P}_A, f(A_\rho,g)\rangle\}|\nexists v\in \mathbb{P}_A : f(A_v,\mathcal{G}) > f(A_\rho,g)\}$$

where $\hat{p}$ is the Pareto front, f is the vector of fitness functions $[f_1, \ldots, f_n]^T$, and $\mathbb{P}_A$ is the parameter space of the model $\mathcal{A}$. The partial ordering relation ">" on f may describe the domination property and may be defined as:

$$f(\mathcal{A}_v,g) > f(A_\rho,g) \Leftrightarrow \forall i : f_i(A_v,g) \geq f_i(A_\rho,g) \wedge \exists i : f_i(A_v,g) > f_i(A_\rho,g)$$

Any algorithm that finds the Pareto front for a set of fitness points may implement the two preceding equations. In one example, the algorithm/model is the fisheye projection model. The parameter spaced may be spanned by the twelve parameters of the model ρ. The five dimensional fitness space may be spanned by the inverse of the error function $E(\rho)=\Sigma_{j=1}^{L}F(n_j)=\Sigma_{j-1}^{L}[\Sigma_{i=1}^{N_j}(p_{i,j}^T n_j)^2]$, the skewness and squaredness of a pixel, and the vertical and horizontal fields of view, which are described in detail in the next section.

Since the parameter space $\mathbb{P}_A$ may contain an infinite number of parameterizations, the next problem may involve choosing a representative set of samples from $\mathbb{P}_A$ such that their Pareto front can be assumed to be a reliable approximation of the exact front extracted for the complete space.

One approach may be to regularly sample the values of each parameter, since the number of necessary evaluations may increase exponentially with the number of parameters. For example, an algorithm with 12 parameters, each sampled five times, would require $5^{12}$ evaluations. Since a single evaluation may comprise computations for a complete data set, the time requirements for this approach may be great, even for a coarse sampling of the parameter space.

In another approach, the multi-objective evolutionary algorithm PESA (Pareto Envelope-based Selection Algorithm) may be used with modifications for the estimation of the population density. Furthermore, a decaying mutation rate may ensure a large coverage of the parameter space during the first generations of the genetic algorithm (decaying mutation rates), which may be similar to the simulated annealing optimization process.

The genetic algorithm may be used to find initial points in the parameter space to start a downhill-simplex optimization process. The parameters stored in the Pareto front may be those resulting after the deterministic optimization, instead of the initial points generated by mutation or crossover. This approach may avoid computation of useless parameterizations and may concentrate the analysis on those regions of the parameter space that provide promising results. The deterministic optimization step may ensure that local minima are considered in the search.

Even if this algorithm also samples the parameter space, the resolution used for each parameter may be high (e.g., 232 samples per parameter). The number of evaluations required may be proportional to the number of bits used to represent the complete parameterization.

Multi-objective optimization algorithms (including PESA) may try to find the front containing parameterizations best optimized for the reference (golden) data set $\mathcal{G}$, which in this case may comprise all landmarks in the fisheye images, corresponding to straight lines in space. Hence, the evaluation may use representative data taken from the application context.

Since some systems (e.g., the throwable ball) may use several cameras, the optimization model may employ one further step. Three example options are provided:

1. Estimation of the parameters of each camera, independently of the others.
2. Joint estimation of the parameters for all cameras.
3. Joint estimation of the parameters for all cameras, except the principal points of each camera $i(u_0, v_0)_i$.

Fitness functions may be used in the genetic approach. Some of the previous definitions are error functions, which may be mapped into fitness functions. A main fitness function may be related to the error of the lines defined above. The line fitness may be defined as $$f_l = e^{-E(\rho)}$$

which may constrain the fitness between 0.0 and 1.0.

Figure 22:
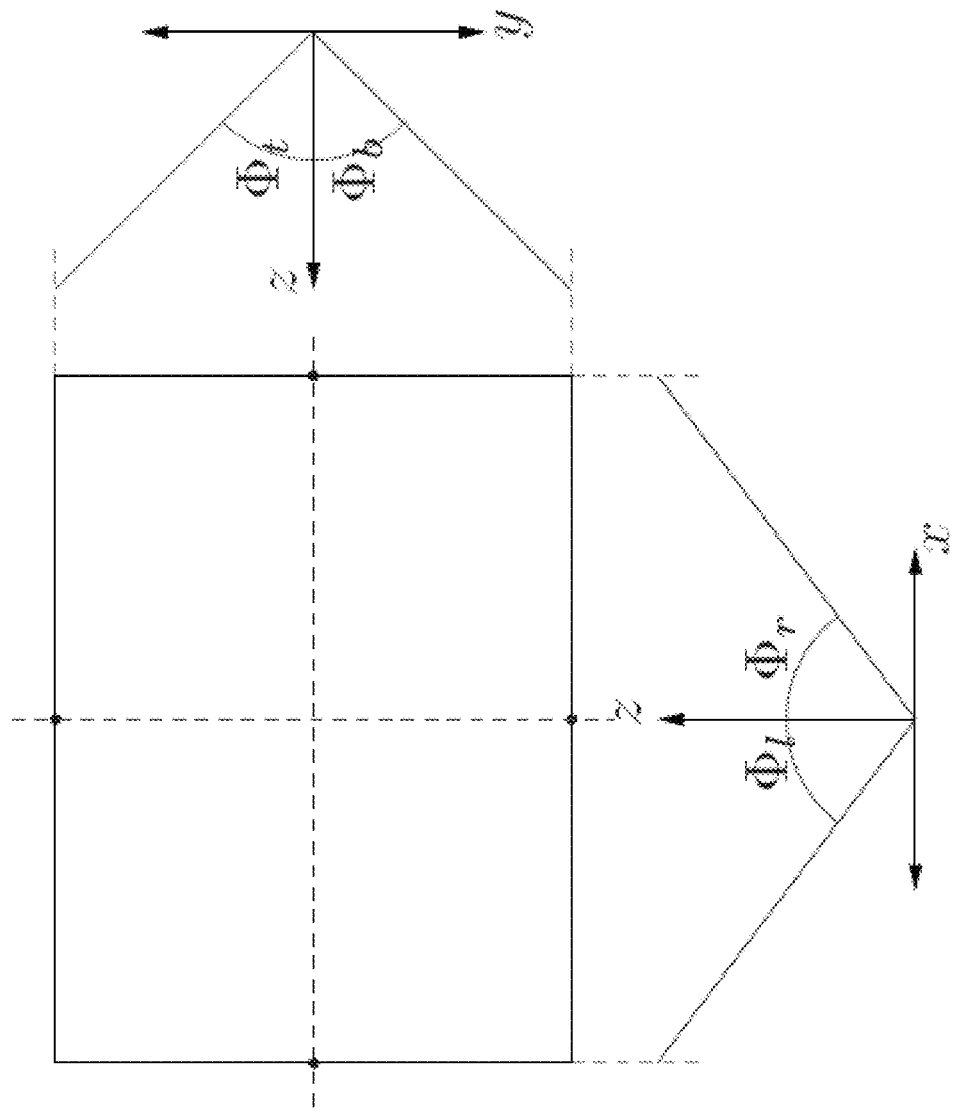
FIG. 22 is a field-of-view computation according to an embodiment of the invention.

FIG. 22 is a computation of the effective HFOV and VFOV from inversely mapped points at the top, bottom, left, and right sides of the fisheye image according to an embodiment of the invention. Genetic evolution may achieve a reduction of the line error by reduction of the vertical and horizontal fields of view. Hence, the horizontal (HFOV) and vertical (VFOV) fields of view may be used directly as fitness measures in the multi-objective optimization approach. The fields of view may be computed using the inverse mapping discussed above, taking for the VFOV the $\Phi$ angles of the upper and lower horizontally centered points and for HFOV the $\Phi$ angles of the right and left vertically centered points of the fisheye image, as shown in FIG. 22, for example. Hence, $$\text{VFOV} = |\Phi_b| + |\Phi_t|$$

$$\text{HFOV} = |\Phi_l| + |\Phi_r|$$

Even though an exact computation may require the computation of those angles for all the border pixels, this approximation may be faster to compute.

The skew and aspect ratio may also achieve a reduction of the line error. Therefore, two additional fitness measures may be used to force the squareness and skewless-ness of the pixels. These measures may be directly related to the coefficients a and s of the matrix $K_A$ as described above.

The factor a may be related to the squareness of the pixels. The closer a is to 1.0, the closer is the shape to a square. Otherwise, the shape may be distorted in rectangles.

$$f_{sq} = \exp\left(-\frac{\max(a, 1)}{\min(a, 1)}\right)$$

The skewlessness fitness may be defined as:

$$f_{sk} = \exp(-s^2)$$

The optimization may fix whether a=1 and s=0 (perfectly squared pixels) and may optimize HFOV and VFOV, or may only optimize a and s, restricting them to values close to one and zero, respectively.

Extrinsic Calibration

Extrinsic calibration may find the rotation and translation between each camera coordinate system and a reference coordinate system. Like intrinsic calibration, extrinsic calibration may be performed using a calibration object. Using the data of different views of the calibration object, the parameters may be derived.

The extrinsic parameters may be determined by identifying the intersections of lines in the calibration object. The position of these intersections in the calibration object may be known. If two or more of these crossings are visible in a camera image, the position and orientation of the camera may be calculated. When this is done for all cameras using the same view of the calibration object, the camera positions and orientations relative to each other may be derived.

The algorithms that determine the optimal parameters may be executed by any device. For example, the determination may be made by the camera unit, the viewing device, or another device possibly in a remote location. For example, the calibration algorithms may be executed on a web server to which a calibration job can be dispatched.

The determined parameters may be stored on the camera unit, the viewing device, or on another device possibly in a remote location, for example, as long as the parameters are available together with the camera data (e.g., image data) when creating a panorama. For example, the calibration parameters may be stored in the camera unit and may be sent together with the camera and sensor data to the device that creates the panorama.

Ideal Calibration

Let $p_i$ be a point in the i-th camera coordinate system and $p_s$ be the same point in the reference coordinate system of the sphere. The mapping may be $$p_s = R_{is} p_i + t_{is}$$

where $R_{is}$ is the rotation matrix and $t_{is}$ is the translation vector between the origins of both coordinate systems.

Figure 23:
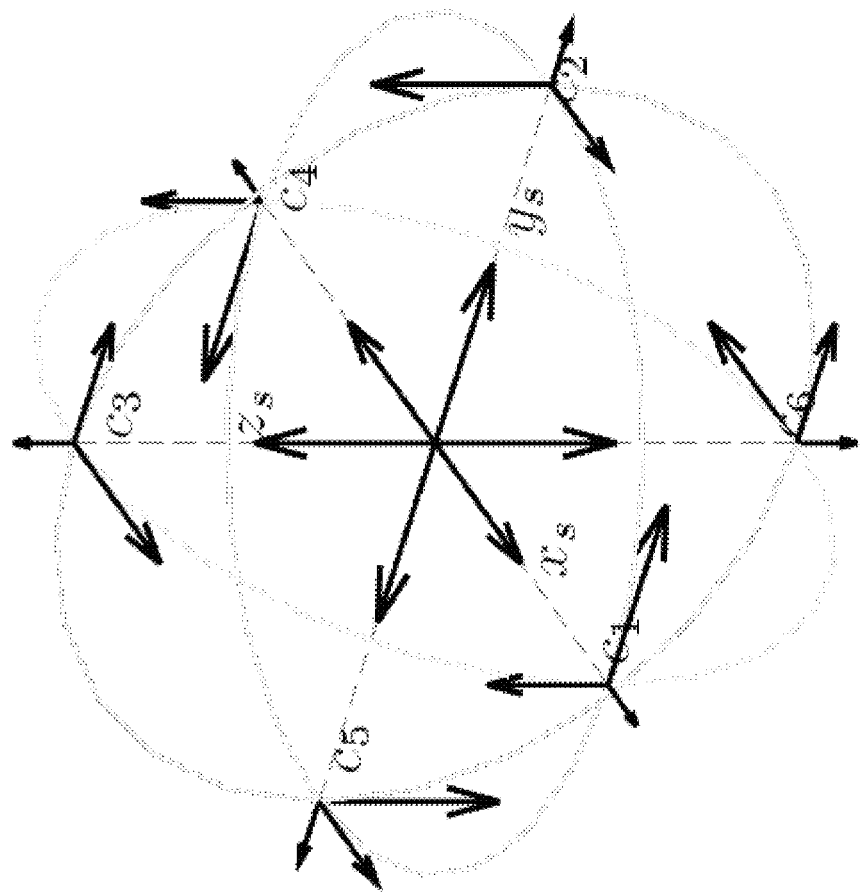
FIG. 23 is a configuration of six cameras on a sphere according to an embodiment of the invention.

FIG. 23 is a configuration of six cameras on a sphere according to an embodiment of the invention. The shortest axis may represent the z axis of the camera coordinate system, which may always be perpendicular to the sphere centered at the reference coordinate system. The largest vector on each camera center may represent the x axis. Note the alternation between adjacent cameras of the x axis. Camera $i \in \{1, 2, 3\}$ may be opposite to camera i+3. The reference coordinate system may be $(x_s, y_s, z_s)$. The z-axes of the cameras may always point out of the center of the reference system. The x-axes may be denoted in the figure with longer vectors. The directions of the x-axis vectors may alternate between adjacent cameras, i.e., the x-axes between adjacent cameras may always be perpendicular to each other. Similarly, the directions of the y-axis vectors may alternate between adjacent cameras, i.e., the y-axes between adjacent cameras may always be perpendicular to each other.

Assuming perfect alignment of the six cameras, the transformations between the six coordinate systems may be as follows:

$$R_{1s} = \begin{bmatrix} 0 & 0 & +1 \\ +1 & 0 & 0 \\ 0 & +1 & 0 \end{bmatrix} \quad R_{2s} = \begin{bmatrix} 0 & +1 & 0 \\ 0 & 0 & +1 \\ +1 & 0 & 0 \end{bmatrix}$$

$$R_{3s} = \begin{bmatrix} +1 & 0 & 0 \\ 0 & +1 & 0 \\ 0 & 0 & +1 \end{bmatrix}$$

$$t_{1s} = [r\ 0\ 0]^T \quad t_{2s} = [0\ r\ 0]^T \quad t_{3s} = [0\ 0\ r]^T$$

$$R_{4s} = \begin{bmatrix} 0 & 0 & -1 \\ -1 & 0 & 0 \\ 0 & +1 & 0 \end{bmatrix} \quad R_{5s} = \begin{bmatrix} 0 & +1 & 0 \\ 0 & 0 & -1 \\ -1 & 0 & 0 \end{bmatrix}$$

$$R_{6s} = \begin{bmatrix} -1 & 0 & 0 \\ 0 & +1 & 0 \\ 0 & 0 & -1 \end{bmatrix}$$

$$t_{4s} = [-r\ 0\ 0]^T \quad t_{5s} = [0\ -r\ 0]^T \quad t_{6s} = [0\ 0\ -r]^T$$

Calibration Cage

In the embodiments described herein, the detection of lines may simplify the calibration processes due to the great circle fitting described above. The fixed structure of the calibration cage may allow calibration to relate the transformations between the camera systems and may allow calibration of fisheye lenses (which may have difficulty detecting chessboard patterns used for calibration of lenses for which the pinhole camera or thick-lens model are sufficient).

Figure 24:
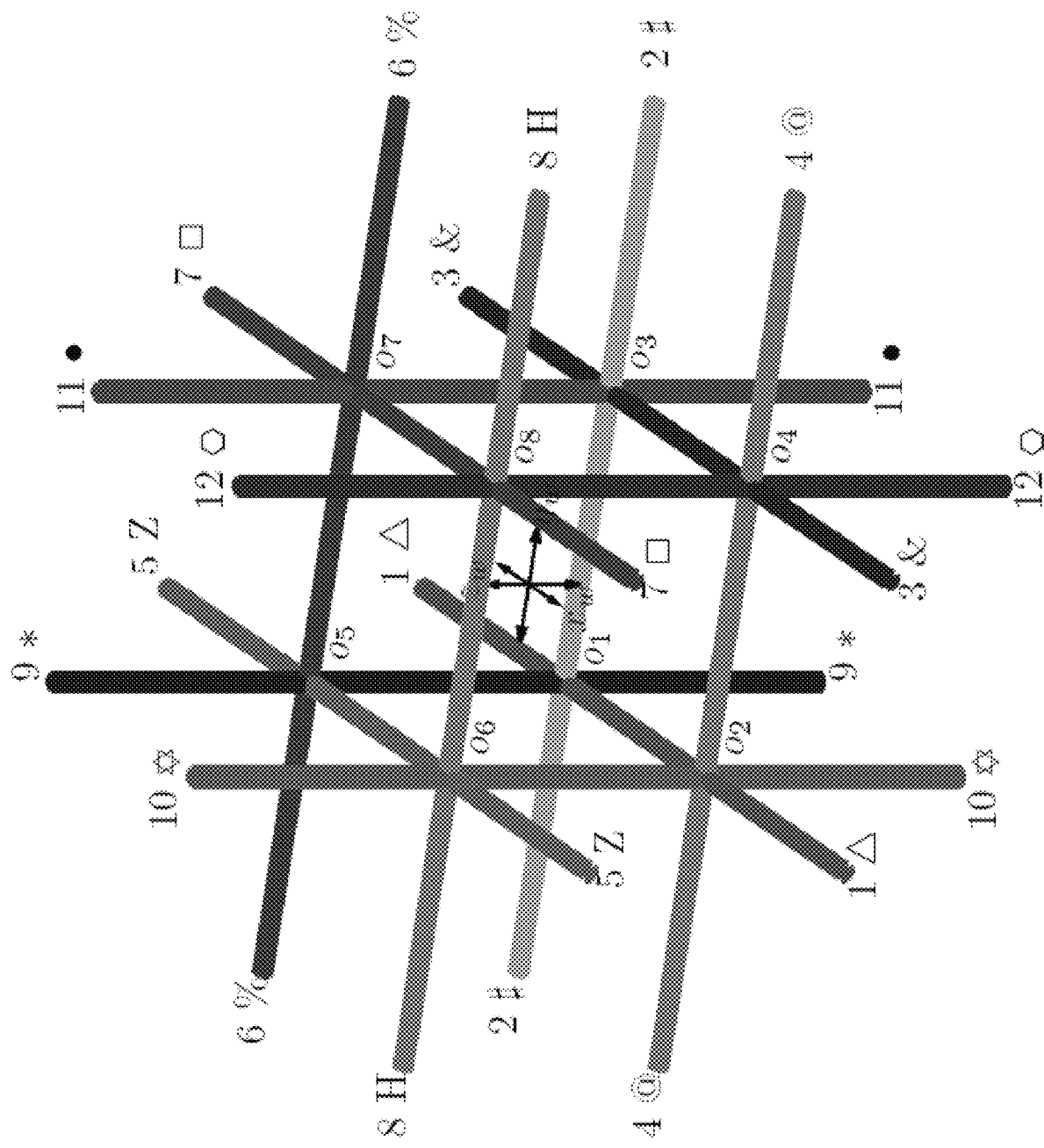
FIG. 24 is a calibration cage according to an embodiment of the invention.

The basic structure of the calibration cage according to some embodiments is shown in FIG. 24. The calibration cage may include twelve tubes (numbered from 1 to 12 in the figure), giving origin to eight coordinate systems (labeled as $o_i$, with $i=1 \ldots 8$. The length of the tubes may be 1.5 m, for example, which may be long enough to cover large areas on the image. If the sphere is placed on the inner cube, then all six cameras may capture lines. Small rotations and translations of the sphere may shift and rotate the projected lines in the images, which may aid in the process of calibration of the intrinsic parameters. If the global coordinate system is placed on the center of the calibration cage, then the position of all twelve axes is known, as well as the positions of the eight coordinate systems. This knowledge may suffice for the proper extrinsic calibration.

Method for Extrinsic Calibration of One Camera

Let $p_{wi}$ be a point on the i-th coordinate system of the cage. That point may be mapped into the c-th camera coordinate system with $$p_c = R_{wic} p_{wi} + t_{wic}$$

The three axes of the cage coordinate system may be generated parametrically with $\lambda \in \mathbb{R}$ as $$p_x = \begin{bmatrix} \lambda \\ 0 \\ 0 \end{bmatrix} \quad p_y = \begin{bmatrix} 0 \\ \lambda \\ 0 \end{bmatrix} \quad p_z = \begin{bmatrix} 0 \\ 0 \\ \lambda \end{bmatrix}$$

The origin of the coordinate system may be mapped into the spherical projection surface at a direction $$s_0 = \frac{t_{wic}}{\|t_{wic}\|}$$

Figure 25:
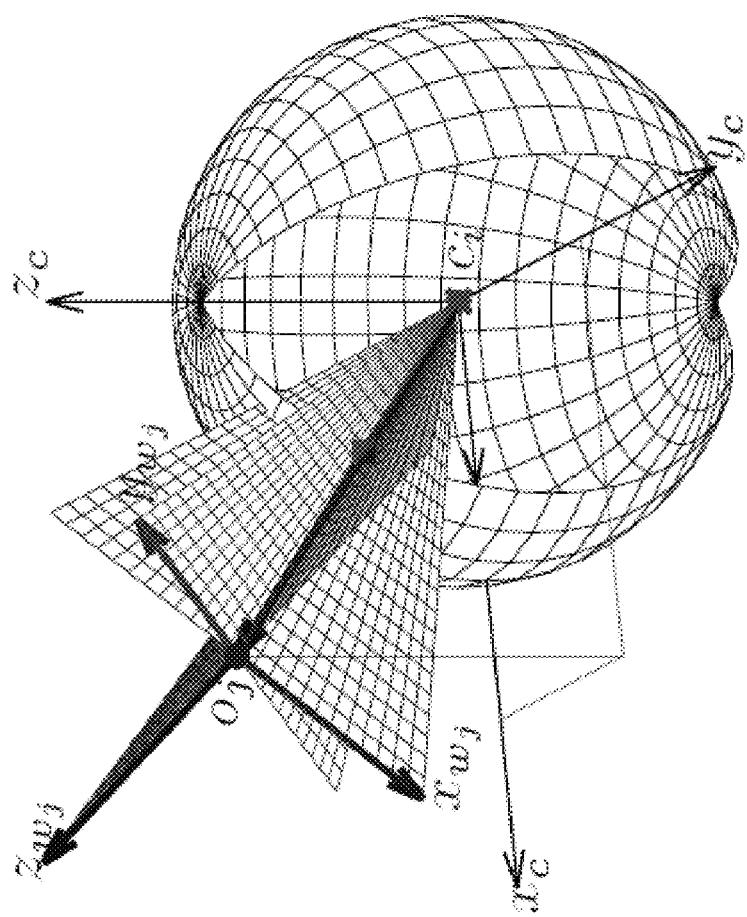
FIG. 25 is a set of intersections of planes passing through axes of one cage coordinate system and the origin of the camera coordinate system according to an embodiment of the invention.

FIG. 25 is a set of intersections of planes passing through axes of one cage coordinate system and the origin of the camera coordinate system according to an embodiment of the invention. As described previously, since each cage axis is a straight line in space, it may be projected as a big circle onto the ideal fisheye image, generated as the intersection of the spherical projection surface and the plane containing that axis of the cage coordinate system and the origin of the camera coordinate system. The line going through the origin of both the coordinate system of the camera and the i-th coordinate system of the cage (e.g., FIG. 25 where i is the camera number and j is the coordinate system number) may be parallel to the vector $t_{wit}$. That line may be contained on all three planes, each containing one of the three axes of the i-th cage coordinate system and the camera's origin. Therefore, the normals to those planes may also be perpendicular to $t_{wic}$. Let $n_x$, $n_y$, and $n_z$ represent the normals of the planes containing the x, y, and z-axes of the cage coordinate system, respectively. It may follow $$n_x^T t_{wic} = n_y^T t_{wic} n_z^T t_{wic} = 0$$

Additionally, due to the properties of the cross product it may follow $$s_0 = \frac{t_{wic}}{\|t_{wic}\|} = \gamma_x \frac{n_x \times n_y}{\|n_x \times n_y\|} = \gamma_y \frac{n_x \times n_z}{\|n_x \times n_z\|} = \gamma_z \frac{n_y \times n_z}{\|n_y \times n_z\|}$$

where $\lambda_j = \pm 1$ ($j \in \{x, y, z\}$) is chosen such that the z component of $s_0$ is positive. This factor may be useful since each plane has two valid normals, one on each side, and it may not be known which normal is computed from the image data.

Let the rotation matrix be expressed in terms of its column vectors $r_i$:

$$R_{wic} = [r_1 r_2 r_3]$$

Since all rotation matrices may be orthonormal, it may follow that $R_{wic}^T R_{wic} = 1$, or for the column vectors $$r_i^T r_j = \begin{cases} 0 & \text{for } i \neq j \\ 1 & \text{for } i = j \end{cases}$$

Using $p_c = R_{wic} p_{wi} + t_{wic}$, each axis of the i-th cage coordinate system may be projected into the camera coordinate system as $$p_{cx} = \lambda r_1 + t_{wic}$$

$$p_{cy} = \lambda r_2 + t_{wic}$$

$$p_{cz} = \lambda r_3 + t_{wic}$$

Since $n_x$ is the normal of the plane passing through the x-axis of the i-th cage coordinate system and the origin of the camera coordinate system, then it may follow $$n_x^T p_{cx} = n_x^T (\lambda r_1 + t_{wic}) = 0$$

$$\lambda n_x^T r_1 + n_x^T t_{wic} = 0$$

Considering $n_x^T t_{wic} = n_y^T t_{wic} = n_z^T t_{wic} = 0$, the second term may be zero, therefore $$\lambda n_x^T r_1 = 0$$

Similarly, for the y and z axes of the i-th cage coordinate system $$\lambda n_y^T r_2 = 0$$

$$\lambda n_z^T r_3 = 0$$

These observations may allow the optimization function for the rotation matrix to be stated as $$E(R_{wic})=(n_x^T r_1)^2+(n_y^T r_2)^2+(n_z^T r_3)^2$$

under the constraints $$\|r_1\|=\|r_2\|=\|r_3\|=1$$

The normals may be known, since they can be computed from the markers representing the axis by $F(n)=(An)^t An=n^T(A^T A)n=n^T Bn$. However, since there may be an intrinsic duality in the estimation of the direction of each axis, further consideration may be given.

The optimization process may ensure the orthonormality of $R_{wic}$ and the proper chirality, since the mapped coordinate system may still be a right-handed one. Both conditions may be fulfilled if the rotation matrix is parameterized by the Rodrigues formula in terms of a rotation axis $k=[k_x, k_y, k_z]^T$, $\|k\|=1$ and a rotation angle $\theta$:

$$R_{wic}(k, \theta) = I + \sin\theta [k]_X + (1-\cos\theta)(kk^T - I)$$
$$= I + \sin\theta [k]_X + (1-\cos\theta)k_x^2$$

where I is the 3×3 identity matrix, $kk^T$ is the outer product of k with itself and $[k]_x$ is the matrix representation of the cross product with k on the left side:

$$[k]_X = \begin{bmatrix} 0 & -k_z & k_y \\ k_z & 0 & -k_x \\ -k_y & k_x & 0 \end{bmatrix}$$

The magnitude of the rotation axis k may be irrelevant, so two angles ($\alpha$, $\beta$) may suffice for its description:

$$k=[k_x,k_y,k_z]^T=[\sin\alpha\cos\beta,\sin\alpha\sin\beta,\cos\alpha]^T$$

Hence, the rotation matrix may have three degrees of freedom ($\alpha$, $\beta$, $\theta$).

The previous observations estimate a rotation matrix $R_{wic}$ and $s_0$; however, these estimations may be ambiguous. It may be possible to rotate on any of the plane normals using an angle that aligns the other axes on the opposite planes (this is related to the ambiguity of the 2D dimensional projection of a 3D cube). In other words, the proposed optimization function that uses only one coordinate system of the cage may be under-determined, and the optimization may have several possible global minima. Additional constrains may be used to reduce this ambiguity, and the chosen structure of the cage may be useful for this task. If two coordinate systems of the cage are visible simultaneously, and the parallel corresponding axes are known, then 5 axes may be available for the optimization function. 5 axes may provide enough constraints to force a unique global minimum of the optimization function.

Let $p_{wj}$ be the a point in the j-th cage coordinate system, adjacent to the i-th one. If both coordinate systems are aligned, then $$p_{wi}=p_{wj}+t_{ji}$$

where $t_{ji}$ is the displacement vector between both coordinate systems. Then, mapping a point in the j-th cage coordinate system onto the camera coordinate system may be given by $$p_c = R_{wic}p_{wi} + t_{wic}$$
$$= R_{wic}(p_{wj} + \delta_{ji}) + t_{wic}$$
$$= R_{wic}p_{wj} + (R_{wic}\delta_{ji} + t_{wic})$$

where it is clear that the rotation matrix may be the same for both projections.

Following the previous steps, the optimization function may be restated as $$E(R_{wic})=(n_{ix}^T r_1)^2+(n_{iy}^T r_2)^2+(n_{iz}^T r_3)^2+(n_{jx}^T r_1)^2+(n_{jy}^T r_2)^2+(n_{jz}^T r_3)^2$$

where $n_{i\xi}$ are the normals of the planes including the axes $\xi \in \{x, y, z\}$ of the i-th cage coordinate system, and equivalently $n_{j\xi}$ are the normals of the planes including the axes of the j-th coordinate system of the cage. Since one of the axes may be shared between both coordinate systems, it may appear just once in the optimization function without changing the result.

Another ambiguity may be solved. It may be possible to minimize the same function by rotating on 180° on any of the axis. This may keep the chirality of the system and the axes may keep laying on their original planes. Again, the cage structure may be used to solve this ambiguity. Assuming that the sphere is capturing the cage coordinate system within the internal cube, the directional vector so may be on particular octants.

Figure 26:
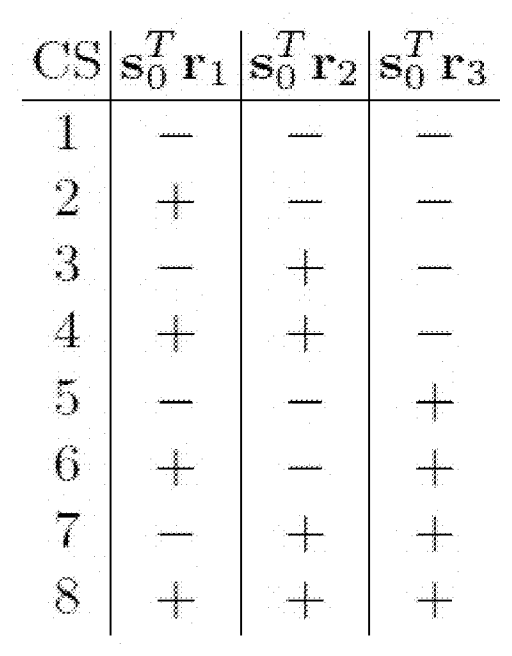

FIG. 26 is a table of signs of projections of the direction vector on the axes of the cage coordinate systems according to an embodiment of the invention. If $r_1$, $r_2$, and $r_3$ are the first, second, and third columns of the rotation matrix, respectively, then for the coordinate systems labeled in FIG. 25, the scalar products of so with those columns may be as shown in FIG. 26. If these signs are not fulfilled by the columns of the rotation matrix, then their directions may be negated according to the table of FIG. 26.

Find Translation Vector

The translation vector $t_{wic}$ is still only partially determined, as the direction so may already be known as described above.

The estimation of the axis normals may not be perfectly accurate due to inaccuracies in the marker positioning, the quantization of the pixel positions, image noise, etc. It may possible to reduce the estimation error by averaging the terms in the solution to so:

$$s_0 = \frac{1}{3}\left(\gamma_{ix}\frac{n_{ix}\times n_{iy}}{\|n_{ix}\times n_{iy}\|} + \gamma_{iy}\frac{n_{ix}\times n_{iz}}{\|n_{ix}\times n_{iz}\|} + \gamma_{iz}\frac{n_{iy}\times n_{iz}}{\|n_{iy}\times n_{iz}\|}\right)$$

with the same values of $\gamma_j=\pm1(j\in\{x, y, z\})$ chosen such that the z component of $s_0$ is positive. Note the use of the i-th coordinate in the previous equation.

Equivalently, the direction towards the j-th coordinate system may be computed as $$s_1 = \frac{1}{3}\left(\gamma_{jx}\frac{n_{jx}\times n_{jy}}{\|n_{jx}\times n_{jy}\|} + \gamma_{jy}\frac{n_{jx}\times n_{jz}}{\|n_{jx}\times n_{jz}\|} + \gamma_{jz}\frac{n_{jy}\times n_{jz}}{\|n_{jy}\times n_{jz}\|}\right)$$

Figure 27:
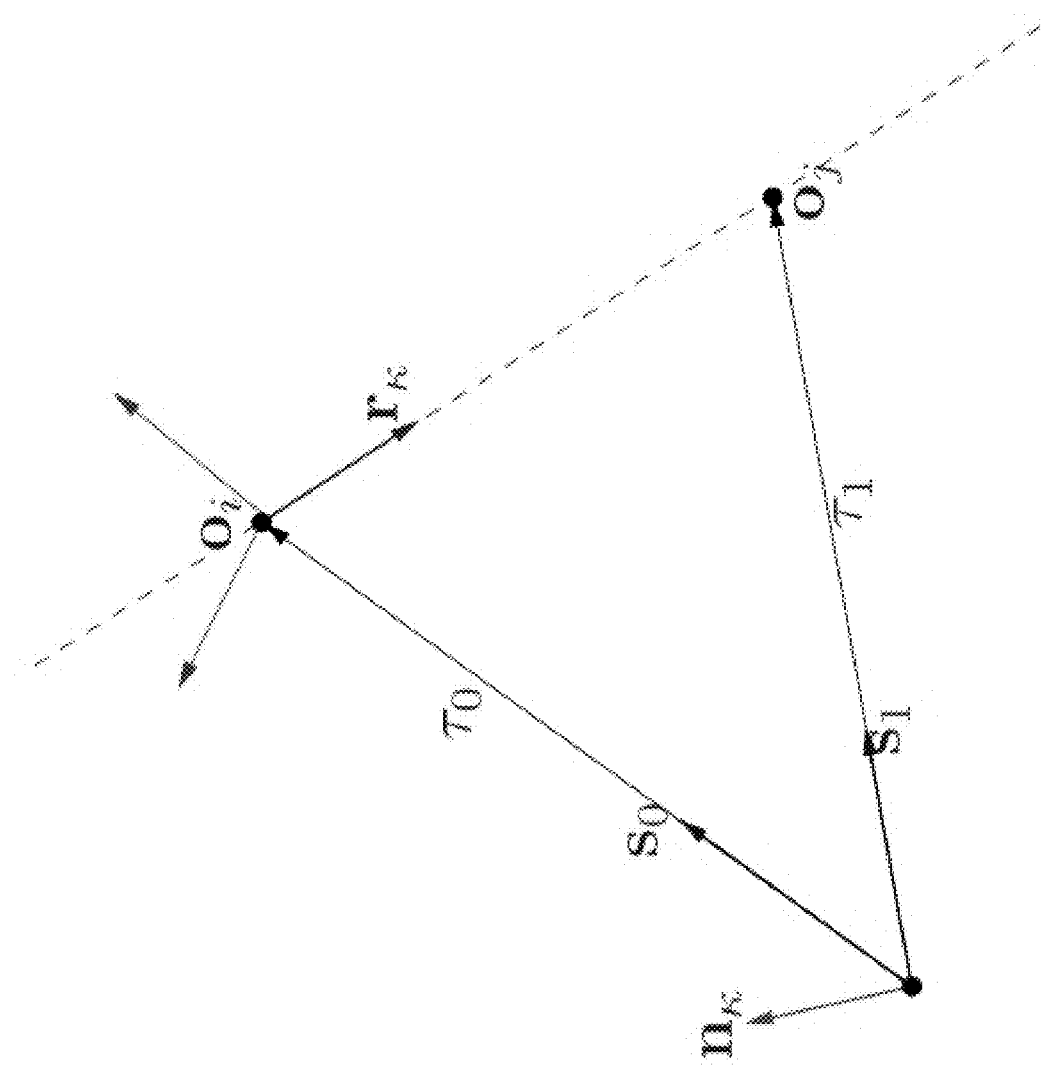
FIG. 27 is a rotation matrix estimation according to an embodiment of the invention.

The distance between the two origins of the cage coordinate systems may be known. The rotation matrix between both cage coordinate systems and the camera coordinate system may be estimated as described above. FIG. 27 is a rotation matrix estimation according to an embodiment of the invention. If the common axis between both cameras is known, then the direction vector of that axis in the camera coordinate system may be given by the corresponding column vector of that rotation matrix. Let $k \in \{x, y, z\}$ represent the common axis between both cage coordinate systems, $r_k$ the corresponding column vector of the rotation matrix, and $n_k$ the normal to the plane corresponding to that axis, which at the same time may include the vectors so and $s_1$ (e.g., FIG. 27).

To reduce the effects of the estimation error, let $\tilde{r}_k$ be the normalized projection of $r_k$ on the plane containing $s_0$ and $S_1$:

$$\tilde{r}_k = \frac{r_k - r_k^T n_k}{\|r_k - r_k^T n_k\|}$$

Let A be the distance between the origins of both coordinate systems $o_i$ and $o_j$. Hence $$o_j - o_i = A\tilde{r}_k$$

Since $o_i = \tau_0 s_0$ and $o_j = \tau_1 s_1$, which can be written in matrix form as $$[-s_0 s_1]\begin{bmatrix} T_0 \\ T_1 \end{bmatrix} = A\tilde{r}_k$$

which may be an overdetermined system that may be solved under error minimization with SVD.

Relating All Cameras

Each camera may be related to one coordinate system of the cage. Since the relative positions of all coordinate systems of the cage may be known, it may be possible to find the relationships among the cameras of the sphere, which is the final goal of the extrinsic calibration.

Let all eight coordinate systems of the cage be identically oriented, as shown in FIG. 24, for example. Parallel to $x_w$ are the axes 1, 3, 5, and 7; parallel to $y_w$ are the axes 2, 4, 6, and 8; parallel to $z_w$ are the axes 9, 10, 11, and 12. With these restrictions, all camera coordinate systems may be related to the common cage reference system by a translation vector. If $p_{wi}$ represents a point in the i-th coordinate system of the cage, then the same point in the cage reference coordinate system may be given by $$p_w = I p_{wi} - \delta_i$$

Let $\delta_x$, $\delta_y$, $\delta_z$ be the distances between origins of the coordinate systems in the x, y, and z directions respectively. So, the translation vectors may be given by $$\delta_1 = \begin{bmatrix} -\delta_x/2 \\ -\delta_y/2 \\ -\delta_z/2 \end{bmatrix} \quad \delta_2 = \begin{bmatrix} +\delta_x/2 \\ -\delta_y/2 \\ -\delta_z/2 \end{bmatrix} \quad \delta_3 = \begin{bmatrix} -\delta_x/2 \\ +\delta_y/2 \\ -\delta_z/2 \end{bmatrix} \quad \delta_4 = \begin{bmatrix} +\delta_x/2 \\ +\delta_y/2 \\ -\delta_z/2 \end{bmatrix}$$

$$\delta_5 = \begin{bmatrix} -\delta_x/2 \\ -\delta_y/2 \\ +\delta_z/2 \end{bmatrix} \quad \delta_6 = \begin{bmatrix} +\delta_x/2 \\ -\delta_y/2 \\ +\delta_z/2 \end{bmatrix} \quad \delta_7 = \begin{bmatrix} -\delta_x/2 \\ +\delta_y/2 \\ +\delta_z/2 \end{bmatrix} \quad \delta_8 = \begin{bmatrix} +\delta_x/2 \\ +\delta_y/2 \\ +\delta_z/2 \end{bmatrix}$$

and the inverse transformation from the reference system to one particular cage system may be given by $$p_{wi} = p_w - \delta_i$$

The relationship of a cage coordinate system and the c-th camera was given above as $$p_c = R_{wic} p_{wi} + t_{wic}$$

Combining the previous results:

$$\begin{aligned} p_c &= R_{wic}(p_w - \delta_i) + t_{wic} \\ &= R_{wic} p_w + (t_{wic} + R_{xic}\delta_i) + t_{wic} \\ &= R_{wic} p_w + t_{wc} \end{aligned}$$

with $t_{wc} = t_{wic} - R_{wic}\delta_i$. Let $t_{cw} = -R_{wic}^{-1} t_{wc} = \delta_i - R_{wic}^{-1} t_{wic}$. Inverting the previous relationship:

$$\begin{aligned} p_w &= R_{wic}^{-1} p_c - R_{wic}^{-1} t_{wc} \\ &= R_{wic}^{-1} p_c + t_{cw} \end{aligned}$$

Hence, two known points in the cage reference system $p_w^{(1)}$ and $p_w^{(2)} = p_w^{(1)} + D$ may be transformed into two different camera systems. Assume that $p_w^{(1)}$ is visible from camera $c_\alpha$ and $p_w^{(2)}$ is visible from camera $c_\beta$. From the previous relations:

$$p_{c\alpha}^{(1)} = R_{wic\alpha} p_w^{(1)} + t_{wc\alpha}$$

$$p_{c\beta}^{(2)} = R_{wic\beta} p_w^{(2)} + t_{wc\beta}$$

Taking the last equation may yield $$p_{c\beta}^{(2)} = R_{wic\beta}[p_w^{(1)} + D] + t_{wc\beta}$$

$$p_w^{(1)} = R_{wic\beta}^{-1} p_{c\beta}^{(2)} - R_{wic\beta}^{-1} t_{wc\beta} - D$$

and inserting this into $p_{c\alpha}^{(1)} = R_{wic\alpha} p_w^{(1)} + t_{wc\alpha}$ may yield $$\begin{aligned} p_{c\alpha}^{(1)} &= R_{wic\alpha}[R_{wic\beta}^{-1} p_{c\beta}^{(2)} - R_{wic\beta}^{-1} t_{wc\beta} - D] + t_{wc\beta} \\ &= (R_{wic\alpha} R_{wic\beta}^{-1}) p_{c\beta} + (t_{wc\alpha} - R_{wic\alpha} R_{wic\beta}^{-1} t_{wc\beta} - R_{wic\alpha} D) \end{aligned}$$

For the particular case D=0, both points $p_w^{(1)}$ and $p_w^{(2)}$ may be the same, and $$p_{c\alpha} = (R_{wic\alpha} R_{wic\beta}^{-1}) p_{c\beta} + (t_{wc\alpha} + R_{wic\alpha} R_{wic\beta}^{-1} t_{wc\beta})$$

may relate two camera systems.

The previous equation may enable the relation of all camera systems to a common one; for instance, $\alpha=3$, which may be chosen as it is aligned with the sphere system (see FIG. 23, for example).

To obtain the final sphere coordinate system, only a displacement may be missing between the previous, which may be computed using the average of all origins of the six camera coordinate systems as the center of the sphere.

Panorama Creation

A panorama may be created by merging the camera data given the parameters of the cameras. It may be possible to create either a whole panorama (using all available camera data) or only a portion thereof.

The panorama that is created may have multiple representations (e.g., spherical, cubic, cylindrical, etc.). Any of these representations may use raster data in which pixels values are stored. When creating a panorama, these pixel values may be determined. For every pixel in the panorama image, one or multiple source pixel positions in the camera data may be calculated using the parameters of the cameras.

These source positions may be calculated when needed or may be pre-calculated for extra performance.

When multiple source positions are available for one target pixel, the pixel values in the source images may be merged by giving each source position a certain weight. The weighting of the pixels may be done in multiple ways. For example, a function based on the distance to the center of a camera may be used to create weight values that "feather" the different images together.

The calculations to create the panorama may be done by any device, for example by the camera unit, the viewing device, and/or a separate device that is possibly on a remote location, as long as the camera data and the parameters of the camera are available.

For example, the panorama may be created on a mobile device. The camera data and parameters may be sent together with sensor data from the camera unit to the mobile device using a WiFi connection. When new data is received, a new panorama may be created and displayed to the user. In the mobile device full panoramas of all camera images may be created using an algorithm implemented in the C++ programming language or some other language, for example.

As different cameras may have different optical centers, parallax issues may arise (e.g., different cameras may have different views on the same object). This may happen more frequently with objects very near to the cameras. Parallax issues may also increase if cameras are not very near to each other. In order to handle the parallax, a virtual sphere (with a center and a radius) may be defined on which parallax issues may be minimized. When a view of an object very near to the cameras is requested, the radius may be adjusted to minimize parallax.

Partial display of the panorama may be handled in a variety of ways. For example, the system may create a complete panorama in memory and only display a portion of it. When a new view is requested, only the displayed portion may be generated. This means the original camera data doesn't need to be merged. Only a new view on the panorama in memory may be made. In another example, the system may create only the portion of the panorama displayed to the user. When a new view is requested, the original camera data may be merged to form the portion of the panorama that is requested. In the former approach, the creation of the whole panorama in memory may take more time and/or processing power than creating only the requested portion. However, a new view on a panorama in memory may be created very quickly. A combination of the two approaches may also be possible.

Panorama creation may be implemented using 3D rendering hardware and software. For example, the hardware and software may use OpenGL or some other rendering protocol, in which the whole panorama may be projected on the inner side of an object. Requesting a new view on the panorama may be delegated to the OpenGL pipeline, which may use hardware accelerated rendering of the view when available. The IMU orientation data may be represented as a quaternion and used to create a rotation matrix which in turn may be added to the OpenGL transformation pipeline to correct the changes in orientation during camera unit movement. For example, an MPU9150 IMU may be used, but any other IMU that supplies orientation information may be used as well. The current view on the panorama may also be outputted using some video signal (for example VGA) for viewing on a separate monitor.

The blending of the several stitched images may be performed by weighting every pixel. In addition to the look up table (LUT) for the distortion, a LUT for the weights of the pixels may be provided. The weight LUT may include information defining how heavily a camera (source) pixel influences the value of the corresponding panorama (destination) pixel. There may be multiple ways to calculate the blending weights. For example, an exponential function based on the distance to the camera image edge may be used. A wider or narrower blending zone between camera images may be achieved by varying the value of the exponent. After all weight LUTs have been initialized, they may be normalized so that every pixel in the panorama has a summed weight of 1. To summarize, the calibration data for each camera may be correlated with image data for an image captured by that camera. Thus, an understanding of each pixel's location may be gained. The images from each camera may then be oriented relative to one another based on the calibration data.

Parallax Effects

Figure 28:
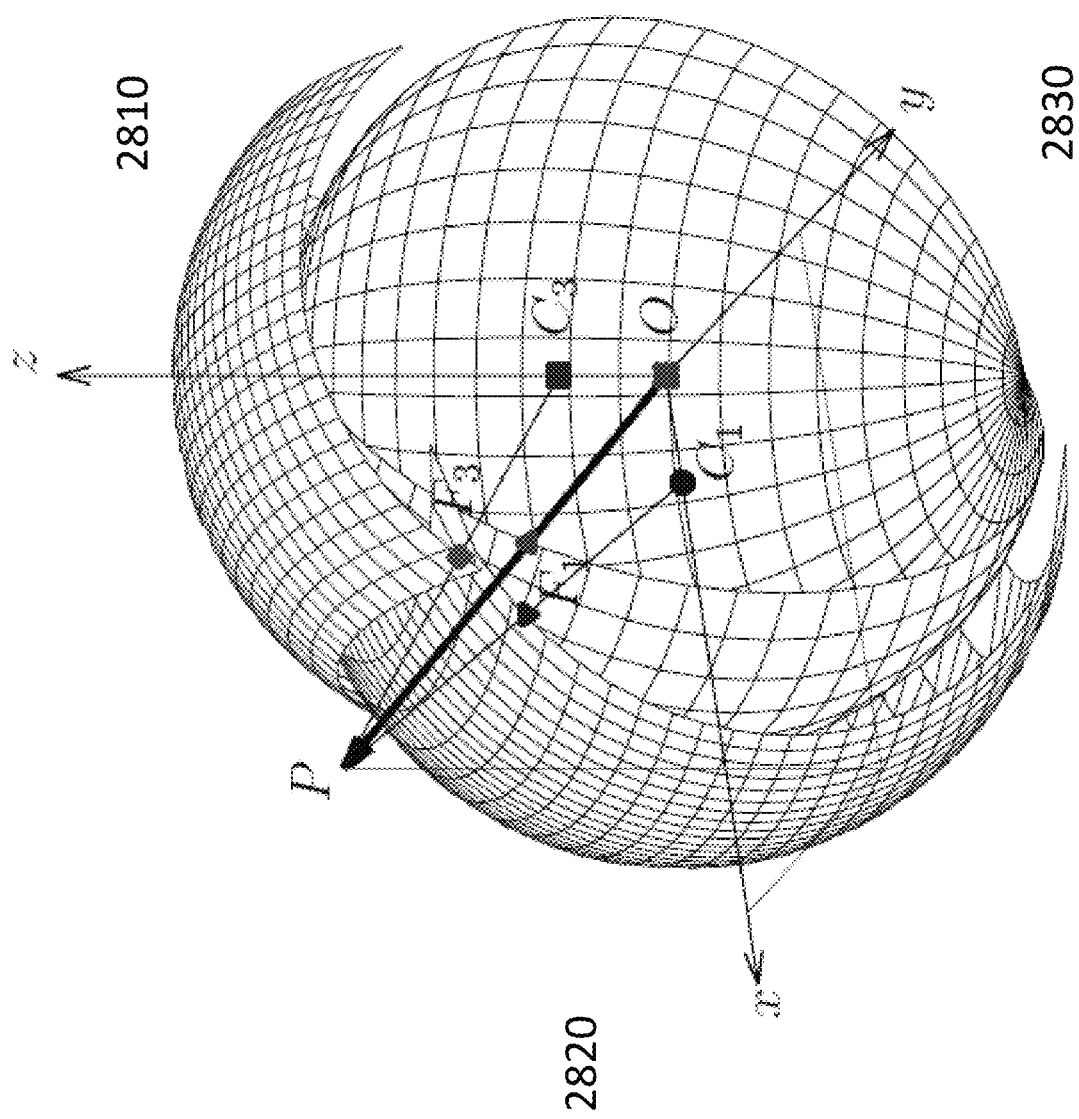
FIG. 28 is a set of landmarks for two fisheye spherical projections on the reference sphere according to an embodiment of the invention.

FIG. 28 shows landmarks for two fisheye spherical projections on the reference sphere. The top surface 2810 may represent the spherical projection of one camera centered on a point $C_3$ in the z axis. The left surface 2820 may represent the spherical projection of another camera centered at $C_1$ on the x axis. The inner surface 2830 may represent the global projection onto which the images captured by both cameras may be mapped (reference sphere centered on O). All spheres have been cut to simplify the visualization of the landmarks.

The creation of panoramas using the example configuration of six cameras on the sphere may allow presupposition of orthogonality on the optical axes. The parallax effect may be studied using only two cameras as shown in FIG. 28, where some landmarks have been placed to be used as reference in the algebraic derivations.

In general, a point $p_i$ on the i-th camera coordinate system may be expressed in spherical coordinates as $p_i=(r_i, \theta_i, \emptyset_i)$, where the directional vector $(\theta_i, \emptyset_i)$ may suffice to describe a point on the fisheye image. The points on the i-th coordinate system may be mapped to a global spherical reference with a rotation $R_{is}$ and a translation $t_{is}$:

$$p_s = R_{is}p_{is} + t_{is}$$

Hence, a point P described in the spherical reference may appear in the fisheye camera.

The general problem may be stated as follows: given a calibrated two-camera configuration, estimate the projection of a point P onto a reference sphere, given the projections of that point in the two fisheye projections. Let $p_1$ be the projection of the point P in the fisheye projection of the camera 1 and $p_2$ be the projection of the same point P in the fisheye projection of the camera 2.

An example solution may be illustrated for the case where the coordinate system of one camera is aligned to the reference coordinate system, but displaced in exactly one axis, and the second camera is orthogonally rotated and displaced. Given the centers $C_3$ and $C_1$ of two fisheye spherical projections with respect to a reference coordinate system centered in O=(0, 0, 0), and given the projections $F_3=(x_3, y_3, z_3)$ and $F_1=(x_1, y_1, z_1)$ of a point P=(x, y, z), a solution may compute point P and its projection onto the reference sphere.

Figure 29:
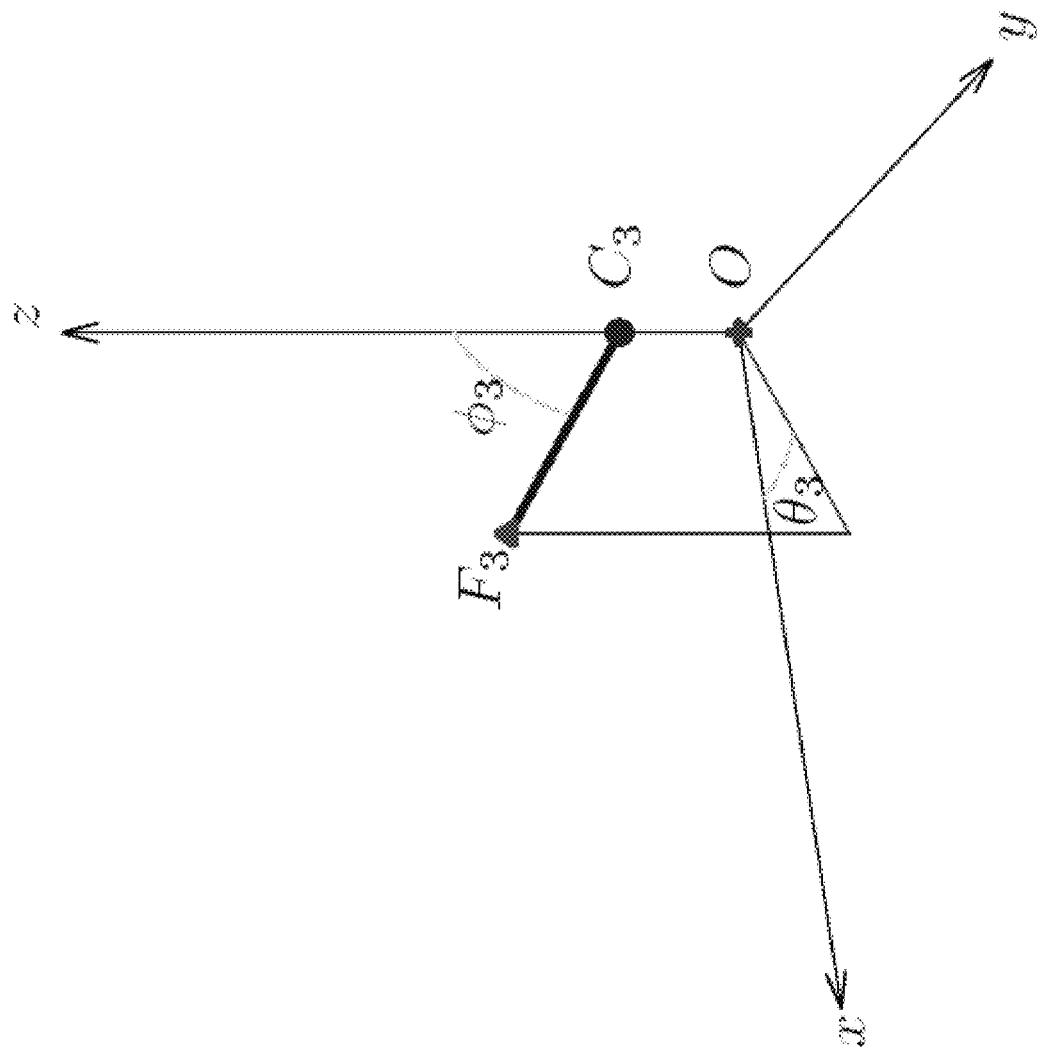
FIG. 29 is a spherical coordinate system according to an embodiment of the invention.

FIG. 29 is a spherical coordinate system centered on S according to an embodiment of the invention. Let O be the center of the reference sphere, $C_3$ the center of the top fisheye spherical projection 2810, and $F_3$ the projection of the point P onto that spherical projection. Using the z-axis as reference of the spherical coordinate system, as shown in FIG. 29 it may follow $$O=(0,0,0)$$

$$C_3=(0,0,d_3)$$

$$F_3=(x_3,y_3,z_3)=(r_3 \sin \emptyset_3 \cos \theta_3, r_3 \sin \emptyset_3 \sin \theta_3, r_3 \cos \emptyset_3 + d_3)$$

where $r_3 = \|\overrightarrow{C_3 F_3}\|$ is the radio of the fisheye spherical projection, $d_3$ is the distance between the center $C_3$ of that sphere and the origin O of the reference coordinate system, $\emptyset_3$ is the latitude coordinate, and $\theta_3$ the longitude for the fisheye projection sphere.

Figure 30:
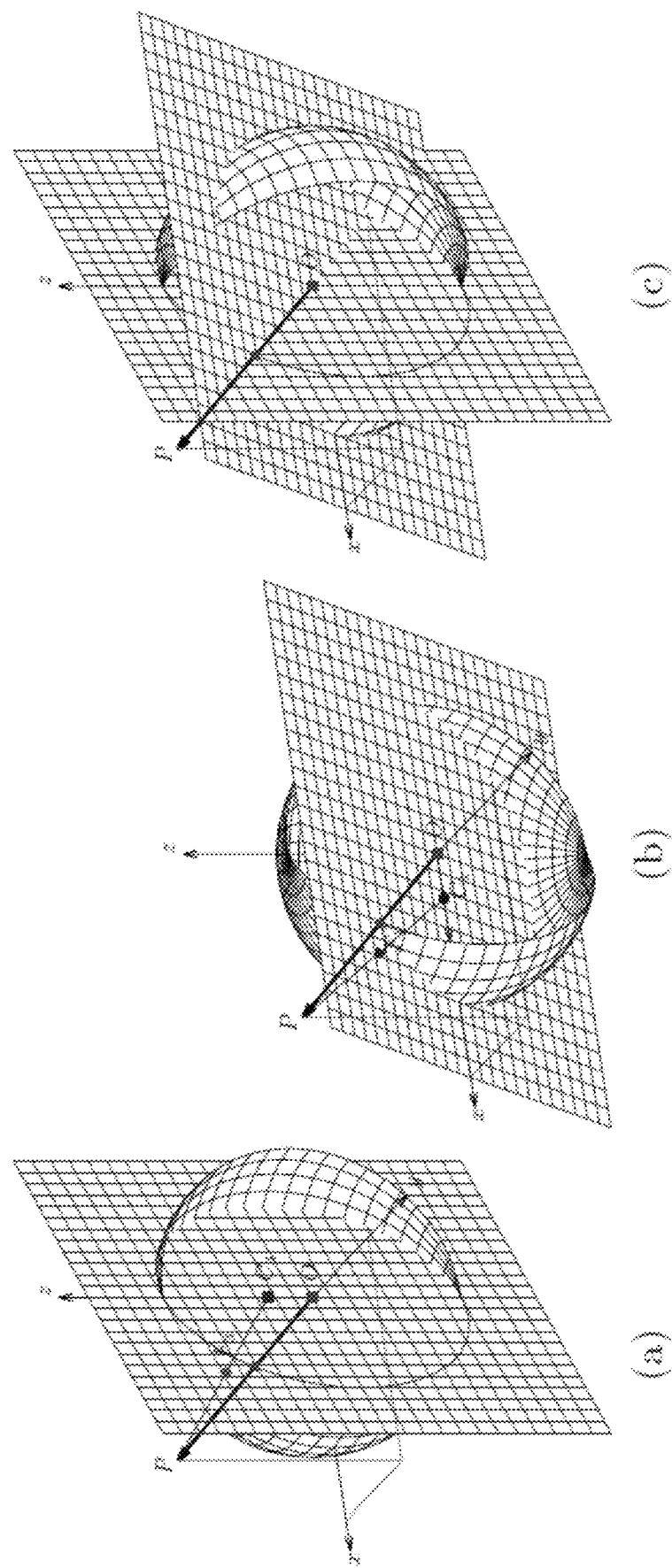
FIG. 30 is a series of planes according to an embodiment of the invention.

FIG. 30 is a series of planes according to an embodiment of the invention. FIG. 30(a) is plane $\Pi_3$, FIG. 30(b) is plane $\Pi_1$, and FIG. 30(c) is both planes intersecting along the ray between O and P. A vector $n_3$ normal to the plane $\Pi_3$ and containing the three points O, $C_3$, and $F_3$ may be given by $$n_3 = \overrightarrow{OC_3} \times \overrightarrow{C_3 F_3}$$

$$= \begin{bmatrix} \hat{i} & \hat{j} & \hat{k} \\ 0 & 0 & d_3 \\ x_3 & y_3 & z_3 \end{bmatrix}$$

$$n_3 = (-d_3 y_3, d_3 x_3, 0)$$

which may lie on the xy plane. Since the term $d_3$ may not change the direction of the normal, it may be factored out, and the normal may be expressed as $$n_3=(-y_3,x_3,0)$$

Thus, any point p on the plane $\Pi_3$ may satisfy $$n_3 \cdot p = (-y_3, x_3, 0) \cdot (x,y,z) = 0$$

$$-y_3 x + x_3 y = 0$$

An example of this plane is shown in FIG. 30(a).

Similarly, for the plane $\Pi_1$ containing the points O, $C_1$ (center of the left projection), and $F_1$ (the projection of point P onto the left fisheye sphere), under alignment of the spherical polar axis to the x axis of the reference coordinate system, it may hold $$C_1=(d_1,0,0)$$

$$F_1=(x_1,y_1,z_1)=(r_1 \cos \emptyset_1 + d_1, r_1 \sin \emptyset_1 \cos \theta_1, r_1 \sin \emptyset_1 + \sin \theta_1)$$

A vector $n_1$ normal to $\Pi_1$ may be computed from the cross product of the x axis and the ray $\overrightarrow{C_1 F_1}$ as $$n_1=(0,z_1,y_1)$$

and therefore the equation for the plane $\Pi_1$ may be $$-z_1 y + y_1 = 0$$

An example of this plane is shown in FIG. 30(b).

Due the fact that both planes include both the point O and the ray to the point P, the normal vectors $n_1$ and $n_3$ may also be perpendicular to that ray $\overrightarrow{OP}$, whose direction v may be aligned to the cross product of the normal as follows:

$$v = n_3 \times n_1$$

$$= \begin{vmatrix} \hat{i} & \hat{j} & \hat{k} \\ -y_3 & x_3 & 0 \\ 0 & -z_1 & y_1 \end{vmatrix}$$

$$= (x_3 y_1, y_3 y_1, y_3 z_1)$$

where $$x_3 = r_3 \sin\emptyset_3 \cos\theta_3 \quad y_3 = r_3 \sin\emptyset_3 \sin\theta_3$$

$$x_1 = r_1 \sin\emptyset_1 \cos\theta_1 \quad y_1 = r_1 \sin\emptyset_1 \sin\theta_1$$

Thus, considering the direction only, and discarding the factors $r_1 r_2$, $$v=(v_x,v_y,v_z)=(\sin \emptyset_3 \cos \theta_3 \sin \emptyset_1 \cos \theta_1, \sin \emptyset_3 \sin \theta_3 \sin \emptyset_1 \cos \theta_1, \sin \emptyset_3 \cos \theta_3 \sin \emptyset_1 \sin \theta_1)$$

The final projection of P onto the reference sphere may require the polar representation of v, which may be given by:

$$\theta_s = \arctan\left(\frac{v_y}{v_x}\right) = \arctan\left(\frac{\sin\theta_y}{\cos\theta_x}\right) = \theta_3$$

$$\emptyset_s = \arctan\left(\frac{\sqrt{v_x^2+v_y^2}}{v_z}\right) = \arctan\left(\frac{\cot\theta_1}{\sin\emptyset_3}\right)$$

which describes how to project into the reference sphere a point in space depicted in two fisheye images if the correspondence of that point is known.

Finding τ Using Distance Markers

Let τ be a scaling factor such that $$t_{w_i c} = \tau s_0$$

An alternative method to the translation vector finding method discussed above may use the distance markers in the calibration cage to find the value of τ based on the known distance between the distance markers.

Deriving the value of τ may start from the images of the markers on the projection sphere, which may be derived with the intrinsic distortion model introduced above and the distance markers. The distance markers may be entered manually by a user or may be automatically detected. The distance between them is assumed to be known in this example.

One axis of the cage coordinate system may be described on the camera coordinate system with:

$$a(s)=a_0+sr_n$$

where the unitary vector $r_n$ may correspond to one of the columns of the rotation matrix $R_{w_i c}$ and may be parallel to that axis. The point $a_0$ may represent the origin of the coordinate system, and therefore $$a_0=\tau s_0$$

Each marker on the fisheye image may represent all points on a ray starting at the origin of the camera system and passing through the real i-th marker in the cage. That ray may be parameterized as follows:

$$m_i(t)=tv_i$$

where $v_i$ is a directional unitary vector that may be estimated from the markers in the image with the fisheye projection model introduced above.

Here it may be assumed that the coordinates of the marker in 3D coordinate system of the camera can be estimated as the closest point on the axis to the corresponding ray. The closest points in the ray and in the axis may be generated with the parameters:

$$s_c = \frac{(r_n^T v_i)(\tau s_0^T v_i) - \tau r_n^T s_0}{1 - (r_n^T v_i)^2}$$

$$t_c = \frac{\tau s_0^T v_i - (r_n^T v_i)(\tau r_n^T s_0)}{1 - (r_n^T v_i)^2}$$

The parameter $s_c$ may be of particular interest. If $\Delta$ is the distance between two consecutive markers, since $\|r_n\|_2 = 1$, $$s_c = i\Delta$$

where $i \in \mathbb{Z}$. Combining the previous results may yield $$s_c = i\Delta = \tau \frac{(r_n^T v_i)(\tau s_0^T v_i) - r_n^T s_0}{1 - (r_n^T v_i)^2} = \tau \varsigma_i$$

with $$\varsigma_i = \frac{(r_n^T v_i)(s_0^T v_i) - r_n^T s_0}{1 - (r_n^T v_i)^2}$$

and $$\tau = \frac{i\Delta}{\varsigma}$$

Another way to compute i may make use of the information of two consecutive markers. Since $$(i+1)\Delta = \tau \varsigma_{i+1}$$

$$i\Delta = \tau \varsigma_i$$

by subtracting both expressions $$\Delta = \tau(\varsigma_{i+1} - \varsigma_i)$$

and $$\tau = \frac{\Delta}{\varsigma_{i+1} - \varsigma_i}$$

Performing the above-described calibration processing during an initial setup of a multi-camera system and/or after changes to the multi-camera system may enable the above-described panorama generation processing to be performed quickly and with minimal processing power. Accordingly, the disclosed systems and methods may provide a substantial improvement in image processing hardware operation.

Additional Features

In some embodiments, the applications may use the open-source OpenCV and OpenGL libraries to translate much of the process developed in C and C++ to mobile-friendly and optimized algorithms. Such methods may allow for extremely fast stitching—on Android devices measured at under 0.05 seconds or better per panorama, for example.

Figure 18:
FIG. 18 is a screenshot according to an embodiment of the invention.

The application may allow the user to interact with the image and other data smoothly via a user interface. FIG. 18 is an example screenshot of a user interface according to an embodiment of the invention.

In some embodiments, an inertia measurement unit (IMU) may provide an up orientation to right the images relative to gravity. The IMU may also be used to point the images in the direction the cameras are pointed at initialization. This may be particularly useful when images and/or video are viewed via a virtual-reality headset such as Google Cardboard. Data from the IMU may be used to calculate the trajectory along which a camera was thrown or moved and match that trajectory in the user interface. In some embodiments, a compass or magnetometer in the IMU or separate from the IMU may be used to overlay directional information. Other sensor data relevant to the image, such as GPS coordinates, may also be overlaid.

In some embodiments, motion and object detection algorithms may be applied to identify, and in the application highlight, points of interest. For example, humans or weapons may be identified and marked (e.g., highlighted in red). In some embodiments, an auto-pan function may rotate the images for the user to point at relevant information.

In some embodiments, the 3-D information contained within the images, given their overlapping fields of view, may be used to create three dimensional reconstructions of a space. In some embodiments, projection of light or lasers may allow for the use of structured light in 3-D reconstructions of spaces.

In some embodiments, dashed lines may be used to highlight which camera contributed a portion of an image to allow a user to request more detail from that camera's image or to initiate a video stream from that camera.

In some embodiments, non-visual data may be overlaid above the visual data presented to provide greater context to the scene being explored.

In some embodiments, optical flow methods may be applied to improve stitching quality.

In some embodiments, multiple stitched panoramas may be blended into a single fly-through projection that allows a user to navigate and investigate a space. A simpler version of this may be used in some embodiments, allowing the user to switch between images via an arrow and step through a scene. In some embodiments, simply replaying omnidirectional video at high frame rate stabilized via the IMU may provide the same effect without requiring a special fly-through projection.

In some embodiments, the stitching method described above may be used to merge data other than visual image data. Examples may include the merging of radar images from multiple directions/dishes, the merging of thermal IR images, the merging of sonar images, etc.

In some embodiments, the cameras may be significantly displaced from each other. One example is a system mounted on multiple points around a truck to enable perimeter security via a single stitched image or set of images.

In some embodiments, the processing may not be done on a mobile device but rather on a processor tied to the camera (e.g., the processor inside the throwable camera ball) or on a computer or on dedicated hardware such as an ASIC or FPGA.

In some embodiments, the method may be used for creating only a partial spherical projection, such as when applied to a roof-mounted security camera.

In some embodiments, the method may be used to allow several users to view several parts of an area at the same time without interfering with each other (for example, guards viewing different areas monitored by security cameras without having to pan cameras or switch views).

In some embodiments the method may be used to create a panoramic video in real time or near-real time with a high frame rate for viewing, storage, and/or sharing via a network.

In some embodiments, the method may be used to reconstruct a scene from multiple cameras in multiple positions.

In some embodiments, using a sufficiently powerful processor on a mobile device or computer, or optimizing processing through the use of multi-threading or parallel processing, methods described herein may be applied for omnidirectional real-time video at 200 fps or faster. For example, running an OpenCV library on a Tegra processor contained in many smartphones may increase speed of that library 40×.

The method by which parallax issues are addressed may also provide information about depth in the images which may be applied to 3D reconstruction of a space (e.g., for virtual reality) or to light-field imaging techniques which allow for re-focusing in post-processing.

The sensor data that is gathered together with the camera data may be presented to the user using visual, acoustic, and tactile feedback. For example, the sound recorded by the microphone may be played back on the viewing device. The data from a compass sensor may be aligned and overlaid on the panorama in order to indicate the current viewing direction. Other data like temperature may be displayed always or just in case a certain threshold is reached, for example.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures that highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims, and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A system for creating at least one combined image from a plurality of images captured by a plurality of cameras, comprising:
   a memory configured to store predetermined calibration data for each of the plurality of cameras, the calibration data for each camera being derived from an image of a known training environment and compensating for:
      a camera position relative to each other camera of the plurality of cameras independent of the location of the camera in an environment, and
      a camera characteristic based on an intrinsic parameter of the camera,
   the calibration data comprising data for mapping pixels imaged by the camera inside a projection geometry and positioned about a virtual center point;
   a sensor unit configured to receive the plurality of images from the plurality of cameras; and
   at least one processor in communication with the sensor unit and the memory, the at least one processor configured to:
      correlate image data from each received image with the predetermined calibration data for the camera from which the image was received; and
      combine the image data from at least one of the cameras into the at least one combined image by:
         positioning pixels of the image data from the at least one of the cameras based on the data for mapping pixels; and
         merging the positioned pixels of the image data from the at least one of the cameras into the at least one combined image.

2. The system of claim 1, wherein the sensor unit comprises a throwable ball.

3. The system of claim 1, wherein at least one of the cameras comprises a fisheye lens.

4. The system of claim 1, wherein at least one of the cameras comprises a sensor and a lens.

5. The system of claim 1, wherein the camera characteristic for each camera is based on optical characteristics of the camera.

6. The system of claim 1, further comprising a receiver unit in communication with the processor and configured to display the at least one combined image.

7. The system of claim 6, wherein the receiver unit comprises a smartphone, a tablet, a personal computer, a server, or a combination thereof.

8. The system of claim 6, wherein the receiver unit is wirelessly coupled to the sensor unit.

9. The system of claim 1, wherein the processor is wirelessly coupled to the sensor unit.

10. The system of claim 1, wherein the at least one combined image is a video frame.

11. The system of claim 1, wherein positioning the pixels of the image data from the at least one of the cameras comprises correcting for a parallax effect in at least one of the images, determining a transformation factor for portions of the image data, relating pixel coordinate systems between the portions of the image data, estimating a global alignment between the portions of the image data, detecting a common distinctive feature in the portions of the image data, computing a globally consistent set of alignments for the portions of the image data, selecting a final compositing surface and a parameterization for the portions of the image data, or a combination thereof.

12. The system of claim 11, wherein the transformation factor comprises a scaling factor.

13. The system of claim 1, wherein the at least one processor is further configured to generate the calibration data.

14. The system of claim 13, wherein generating the calibration data comprises:
   performing an intrinsic calibration for each of the plurality of cameras; and
   performing an extrinsic calibration for the plurality of cameras.

15. The system of claim 14, wherein the at least one processor is configured to perform the intrinsic calibration for each of the plurality of cameras by:
   positioning the camera in a plurality of locations relative to a calibration object;
   receiving an image generated by the camera at each of the plurality of locations; and
   varying at least one intrinsic parameter based on the images generated by the camera at each of the plurality of locations until an optimum is found.

16. The system of claim 14, wherein the at least one processor is configured to perform the intrinsic calibration for each of the plurality of cameras by:
creating a projection model for the camera;
determining a ray originating at a coordinate system of the camera that contains a corresponding point in space;
performing a great circle fitting;
defining an objective function for the camera;
performing an optimization; or
a combination thereof.

17. The system of claim 14, wherein the at least one processor is configured to perform the extrinsic calibration for the plurality of cameras by:
positioning each camera in a plurality of locations relative to a calibration object;
receiving an image generated by each camera at each of the plurality of locations;
for each camera, finding a rotation and translation between a coordinate system of the camera and a reference coordinate system based on the images generated by the camera at each of the plurality of locations; and
deriving camera positions and orientations relative to each other based on the rotations and translations.

18. The system of claim 14, wherein the at least one processor is configured to perform the extrinsic calibration for each of the plurality of cameras by:
performing an optimization;
calibrating the camera using a plurality of images of a calibration object;
creating a translation vector for the camera;
relating the camera to each of the other cameras; or
a combination thereof.

19. The system of claim 1, wherein the calibration data is generated prior to the sensor unit receiving the plurality of images.

20. The system of claim 1, wherein:
the known training environment comprises a three-dimensional calibration object that expresses a known set of lines in space with precisely measured coordinates in substantially all directions around the plurality of cameras; and
the known set of lines in space establish the projection geometry about the virtual center point.

21. The system of claim 1, wherein the projection geometry comprises a sphere.

22. The system of claim 1, further comprising at least one orientation sensor, wherein the at least one processor is configured to orient the at least one combined image to an upright position based on orientation data determined by the at least one orientation sensor.

23. The system of claim 1, wherein at least one of the plurality of cameras is a thermal camera.

24. A method for creating at least one combined image from a plurality of images captured by a plurality of cameras, comprising:
receiving, at a sensor unit, the plurality of images from the plurality of cameras;
correlating, with at least one processor in communication with the sensor unit, image data from each received image with predetermined calibration data for the camera from which the image was received, the calibration data for each camera being derived from an image of a known training environment and compensating for:
a camera position relative to each other camera of the plurality of cameras independent of the location of the camera in an environment, and
a camera characteristic based on an intrinsic parameter of the camera,
the calibration data comprising data for mapping pixels imaged by the camera inside a projection geometry and positioned about a virtual center point; and
combining, with the at least one processor, the image data from at least one of the cameras into the at least one combined image by:
positioning pixels of the image data from the at least one of the cameras based on the data for mapping pixels; and
merging the positioned pixels of the image data from the at least one of the cameras into the at least one combined image.

25. The method of claim 24, wherein the sensor unit comprises a throwable ball.

26. The method of claim 24, wherein at least one of the cameras comprises a fisheye lens.

27. The method of claim 24, wherein at least one of the cameras comprises a sensor and a lens.

28. The method of claim 24, wherein the camera characteristic for each camera is based on optical characteristics of the camera.

29. The method of claim 24, further comprising displaying, with a receiver unit in communication with the processor, the at least one combined image.

30. The method of claim 29, wherein the receiver unit comprises a smartphone, a tablet, a personal computer, a server, or a combination thereof.

31. The method of claim 29, wherein the receiver unit is wirelessly coupled to the sensor unit.

32. The method of claim 24, wherein the processor is wirelessly coupled to the sensor unit.

33. The method of claim 24, wherein the at least one combined image is a video frame.

34. The method of claim 24, wherein positioning the pixels of the image data from the at least one of the cameras comprises correcting for a parallax effect in at least one of the images, determining a transformation factor for portions of the image data, relating pixel coordinate systems between the portions of the image data, estimating a global alignment between the portions of the image data, detecting a common distinctive feature in the portions of the image data, computing a globally consistent set of alignments for the portions of the image data, selecting a final compositing surface and a parameterization for the portions of the image data, or a combination thereof.

35. The method of claim 34, wherein the transformation factor comprises a scaling factor.

36. The method of claim 24, further comprising generating, with the at least one processor, the calibration data.

37. The method of claim 36, wherein generating the calibration data comprises:
performing an intrinsic calibration for each of the plurality of cameras; and
performing an extrinsic calibration for the plurality of cameras.

38. The method of claim 37, wherein performing the intrinsic calibration for each of the plurality of cameras comprises:
positioning the camera in a plurality of locations relative to a calibration object;
receiving an image generated by the camera at each of the plurality of locations; and
varying at least one intrinsic parameter based on the images generated by the camera at each of the plurality of locations until an optimum is found.

39. The method of claim 37, wherein performing the intrinsic calibration for each of the plurality of cameras comprises:
- creating a projection model for the camera;
- determining a ray originating at a coordinate system of the camera that contains a corresponding point in space;
- performing a great circle fitting;
- defining an objective function for the camera;
- performing an optimization; or
- a combination thereof.

40. The method of claim 37, wherein performing the extrinsic calibration for the plurality of cameras comprises:
- positioning each camera in a plurality of locations relative to a calibration object;
- receiving an image generated by each camera at each of the plurality of locations;
- for each camera, finding a rotation and translation between a coordinate system of the camera and a reference coordinate system based on the images generated by the camera at each of the plurality of locations; and
- deriving camera positions and orientations relative to each other based on the rotations and translations.

41. The method of claim 37, wherein performing the extrinsic calibration for the plurality of cameras comprises:
- performing an optimization;
- calibrating the camera using a plurality of images of a calibration object;
- creating a translation vector for the camera;
- relating the camera to each of the other cameras; or
- a combination thereof.

42. The method of claim 24, wherein the calibration data is generated prior to the sensor unit receiving the plurality of images.

43. The method of claim 24, wherein:
- the known training environment comprises a three-dimensional calibration object that expresses a known set of lines in space with precisely measured coordinates in substantially all directions around the plurality of cameras; and
- the known set of lines in space establish the projection geometry about the virtual center point.

44. The method of claim 24, wherein the projection geometry comprises a sphere.

45. The method of claim 24, further comprising:
- determining, with at least one orientation sensor, orientation data; and
- orienting, with the at least one processor, the at least one combined image to an upright position based on the orientation data.

46. The method of claim 24, wherein at least one of the plurality of cameras is a thermal camera.

* * * * *